US012745271B2

(12) United States Patent
Li et al.

(10) Patent No.: US 12,745,271 B2
(45) Date of Patent: Sep. 22, 2026

(54) CHANNEL PROCESSING METHOD AND APPARATUS

(71) Applicant: HUAWEI TECHNOLOGIES CO., LTD., Shenzhen (CN)

(72) Inventors: Ruijie Li, Beijing (CN); Lei Guan, Beijing (CN); Shengyu Li, Beijing (CN); Yang Ding, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 305 days.

(21) Appl. No.: 18/432,717

(22) Filed: Feb. 5, 2024

(65) Prior Publication Data

US 2024/0179731 A1 May 30, 2024

Related U.S. Application Data

(63) Continuation of application No. PCT/CN2022/108313, filed on Jul. 27, 2022.

(30) Foreign Application Priority Data

Aug. 6, 2021 (CN) ......................... 202110904557.8
Sep. 30, 2021 (CN) ......................... 202111163712.1

(51) Int. Cl.
*H04W 72/51* (2023.01)
*H04W 72/1268* (2023.01)
*H04W 72/566* (2023.01)

(52) U.S. Cl.
CPC ....... *H04W 72/51* (2023.01); *H04W 72/1268* (2013.01); *H04W 72/566* (2023.01)

(58) Field of Classification Search
None
See application file for complete search history.

(56) References Cited

U.S. PATENT DOCUMENTS 12,531,670 B2 * 1/2026 Islam .................... H04L 1/1887
2015/0341865 A1 * 11/2015 Yang ................. H04W 72/0453 455/522
2017/0273056 A1 * 9/2017 Papasakellariou .... H04W 52/44
2020/0100239 A1 * 3/2020 Jassal .................... H04L 5/0094

(Continued)

FOREIGN PATENT DOCUMENTS

WO 2021093190 A1 5/2021
WO 2021137554 A1 7/2021

OTHER PUBLICATIONS

ETSI TS 138 306 V17.0.0 (May 2022), 5G; NR; User Equipment (UE) radio access capabilities (3GPP TS 38.306 version 17.0.0 Release 17 (Year: 2022).*

(Continued)

*Primary Examiner* — Hassan A Phillips
*Assistant Examiner* — Gautam Sharma
(74) *Attorney, Agent, or Firm* — Fish & Richardson P.C.

(57) ABSTRACT

This application relates to capability reporting methods and apparatuses. An example method includes determining target capability information. The target capability information includes third capability information. The third capability information indicates that a terminal device can perform multiplexing between overlapping uplink channels with different priorities. The example method further including reporting the target capability information.

20 Claims, 17 Drawing Sheets

(56) References Cited

U.S. PATENT DOCUMENTS

| | | | | |
|---|---|---|---|---|
| 2020/0313793 | A1* | 10/2020 | Jung | H04L 1/0013 |
| 2020/0322972 | A1* | 10/2020 | Hosseini | H04W 72/23 |
| 2021/0168848 | A1* | 6/2021 | Chatterjee | H04W 8/24 |
| 2021/0258981 | A1* | 8/2021 | Hosseini | H04W 72/566 |
| 2021/0259010 | A1* | 8/2021 | Yang | H04W 72/21 |
| 2022/0312427 | A1* | 9/2022 | Park | H04L 1/08 |
| 2022/0377750 | A1* | 11/2022 | Yin | H04W 72/56 |
| 2022/0385381 | A1* | 12/2022 | MolavianJazi | H04W 52/48 |
| 2023/0105294 | A1* | 4/2023 | Park | H04L 1/1819 370/329 |
| 2024/0179731 | A1* | 5/2024 | Li | H04L 5/0053 |

OTHER PUBLICATIONS

International Search Report and Written Opinion in International Appln. No. PCT/CN2022/108313, mailed on Oct. 24, 2022, 17 pages (with English translation).

Ericsson, "Intra-UE Multiplexing/Prioritization Enhancements for IIoT/URLLC" 3GPP TSG-RAN WG1 Meeting# 103-e, R1-2007710, Oct. 26-Nov. 13, 2020, 12 pages.

Media Tek Inc., "Methods for Intra-UE Multiplexing and Prioritization" 3GPP TSG RAN WG1 Meeting# 104-e, e-Meeting, R1-2100577, Jan. 25-Feb. 5, 2020, 10 pages.

Extended European Search Report in European Appln. No. 22852004.5, mailed on Oct. 14, 2024, 13 pages.

* cited by examiner

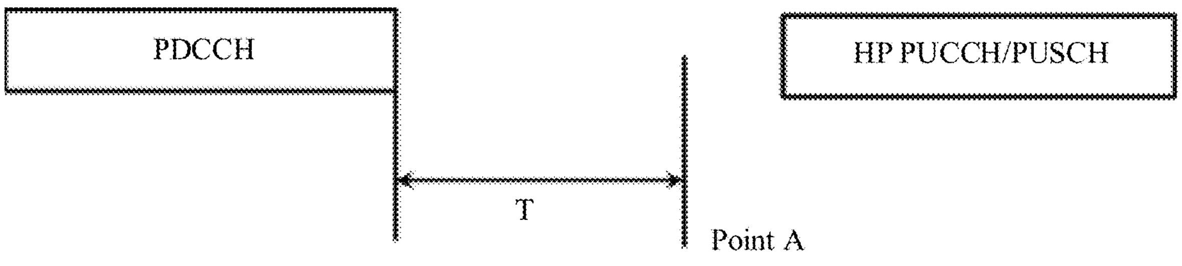

FIG. 6

Terminal device

Network device

201: Determine first capability report information, where the first capability report information includes at least two types of the following capability information: first capability information, where the first capability information indicates that the terminal device can perform multiplexing between overlapping uplink channels with a same priority; second capability information, where the second capability information indicates that the terminal device can cancel sending of one of overlapping uplink channels with different priorities and retain sending of the other uplink channel; and third capability information, where the third capability information indicates that the terminal device can perform multiplexing between overlapping uplink channels with different priorities 202: Send the first capability report information 203: Send first indication information, where the first indication information includes a subset of the first capability report information, and indicates the terminal device to process overlapping uplink channels by using the capability information

FIG. 7A

A terminal device determines a first uplink channel set, where the first uplink channel set includes a first uplink channel and at least one other uplink channel overlapping the first uplink channel, and an uplink channel in the first uplink channel set is a PUCCH corresponding to a first priority — 401

The terminal device multiplexes a first multiplexed uplink channel and an overlapping low-priority PUSCH to obtain a new first multiplexed uplink channel, where the first multiplexed uplink channel is an uplink channel obtained by multiplexing the uplink channel in the first uplink channel set — 404

The terminal device determines a second uplink channel, where the second uplink channel is for carrying some or all information carried on the uplink channel in the first channel set, or carries information on the low-priority PUSCH — 402

When a third uplink channel overlapping the second uplink channel is included, determine a fourth uplink channel, where the fourth uplink channel is for carrying information carried on the second uplink channel and the third uplink channel, or the fourth uplink channel is for carrying some information carried on the second uplink channel and the third uplink channel — 403

FIG. 9D

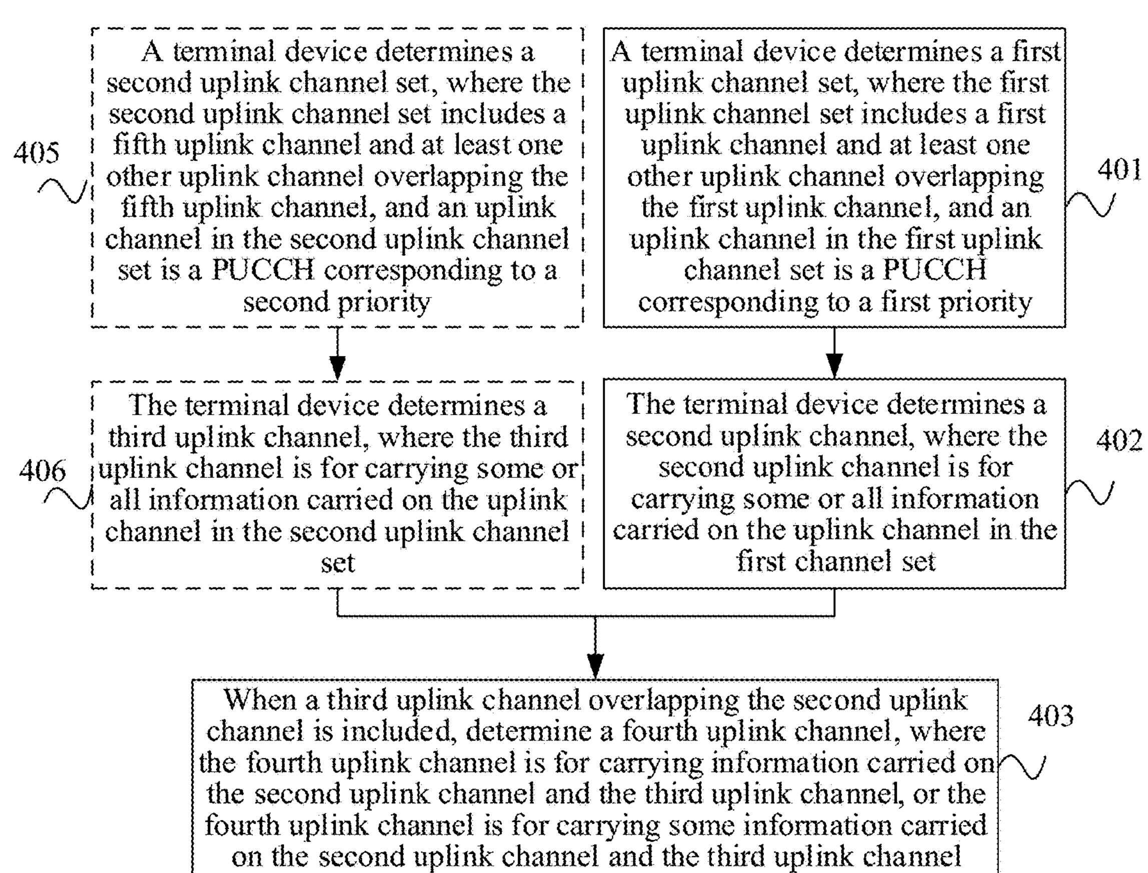

FIG. 9E

CHANNEL PROCESSING METHOD AND APPARATUS

CROSS-REFERENCE TO RELATED APPLICATIONS

This application is a continuation of International Application No. PCT/CN2022/108313, filed on Jul. 27, 2022, which claims priority to Chinese Patent Application No. 202111163712.1, filed on Sep. 30, 2021, and Chinese Patent Application No. 202110904557.8, filed on Aug. 6, 2021. All of the aforementioned patent applications are hereby incorporated by reference in their entireties.

TECHNICAL FIELD

This application relates to the field of communication technologies, and in particular, to a channel processing method and apparatus.

BACKGROUND

In a discussion process of the 3rd generation partnership project (3rd Generation Partnership Project, 3GPP) standard, when uplink channels overlap, a terminal device may multiplex the overlapping uplink channels. In the release R15, a channel multiplexing rule does not involve a channel priority. In the release R16, a "high eliminating low" rule is set for uplink channels with different priorities. To be specific, when the uplink channels with different priorities overlap, sending of a low-priority uplink channel is cancelled. In the two manners, corresponding processing manners for overlapping uplink channels are not flexible enough.

SUMMARY

Embodiments of this application provide a channel processing method and apparatus. A first uplink channel set is obtained through division, to process overlapping of low-priority uplink channels, and then process overlapping of a low-priority uplink channel and a high-priority uplink channel, including multiplexing processing of the channels. This improves efficiency of sending uplink control information and/or uplink data on the low-priority uplink channel, reduces a probability of cross-priority overlapping processing, and reduces processing complexity and time consumption.

According to a first aspect, a channel processing method is provided, applied to a terminal device. The method includes: determining a first uplink channel set, where the first uplink channel set includes a first uplink channel and another uplink channel overlapping the first uplink channel, each uplink channel other than the first uplink channel in the first uplink channel set overlaps the first uplink channel, and each uplink channel in the first uplink channel set corresponds to a first priority; determining a second uplink channel, where the second uplink channel is for carrying information to be carried on all or some uplink channels in the first uplink channel set; and if the second uplink channel overlaps a third uplink channel, when the second uplink channel and the third uplink channel meet a first multiplexing condition, or when the second uplink channel and the third uplink channel do not meet a first multiplexing condition, but a second priority corresponding to the third uplink channel is higher than the first priority, determining, based on the second uplink channel and the third uplink channel, a fourth uplink channel for carrying information to be carried on the second uplink channel and/or some or all information carried on the third uplink channel.

In this embodiment of this application, the first uplink channel set is obtained through division, to process overlapping of low-priority uplink channels, and then process overlapping of a low-priority uplink channel and a high-priority uplink channel, including multiplexing processing of the channels. This improves efficiency of sending uplink control information and/or uplink data on the low-priority uplink channel, reduces a probability of cross-priority overlapping processing, and reduces processing complexity and time consumption.

In an optional example, an uplink channel in the first uplink channel set is a physical uplink control channel PUCCH and/or a physical uplink shared channel PUSCH.

In an optional example, the second uplink channel overlaps a plurality of uplink channels, and the third uplink channel is an uplink channel that is earliest in time domain or an uplink channel that occupies a largest quantity of time-frequency resources in the plurality of uplink channels.

In an optional example, the third uplink channel is a PUCCH; or the third uplink channel is a PUSCH, and there is no PUCCH overlapping the second uplink channel.

In an optional example, when the second uplink channel and the third uplink channel meet the first multiplexing condition, the third uplink channel is a PUSCH, and there is a first PUCCH overlapping the second uplink channel, the fourth uplink channel is for carrying information to be carried on the first PUCCH and information to be carried on the second uplink channel.

In an optional example, when the second uplink channel and the third uplink channel do not meet the first multiplexing condition, but the second priority corresponding to the third uplink channel is higher than the first priority, the determining a fourth uplink channel includes: cancelling sending of the second uplink channel, and determining that the fourth uplink channel is the third uplink channel; cancelling sending of a non-PUSCH channel in the second uplink channel and the third uplink channel, and determining that the fourth uplink channel is a PUSCH in the second uplink channel and the third uplink channel; or cancelling sending of an uplink channel with a later time domain start symbol in the second uplink channel and the third uplink channel, and determining that the fourth uplink channel is an uplink channel with an earlier time domain start symbol in the second uplink channel and the third uplink channel.

In an optional example, the third uplink channel is a second multiplexed uplink channel, the second multiplexed uplink channel is for carrying information to be carried on all or some uplink channels in a second uplink channel set, the second uplink channel set includes a fifth uplink channel and at least one other uplink channel overlapping the fifth uplink channel, each uplink channel other than the fifth uplink channel in the second uplink channel set overlaps the fifth uplink channel, and each uplink channel in the second uplink channel set corresponds to the second priority.

In this embodiment of this application, the third uplink channel is an uplink channel obtained after the second uplink channel set is divided based on the high-priority uplink channel and overlapping processing is performed. In other words, when overlapping between a low-priority uplink channel and a high-priority uplink channel is processed, overlapping between uplink channels with a same priority is first processed. This further reduces a probability of cross-priority overlapping processing, and reduces processing complexity and time consumption.

In an optional example, an uplink channel in the second uplink channel set is a physical uplink control channel PUCCH and/or a physical uplink shared channel PUSCH.

In an optional example, when the fourth uplink channel overlaps a sixth uplink channel, and the fourth uplink channel and the sixth uplink channel meet the first multiplexing condition, the method further includes: determining a seventh uplink channel, where the seventh uplink channel is for carrying information on the fourth uplink channel and information carried on the sixth uplink channel.

In an optional example, the sixth uplink channel is a PUCCH; and/or the sixth uplink channel is a PUSCH, and there is no PUCCH overlapping the fourth uplink channel.

In an optional example, when the fourth uplink channel is for carrying first UCI with the first priority and second UCI with the second priority, the fourth uplink channel overlaps the sixth uplink channel, and the fourth uplink channel and the sixth uplink channel do not meet the first multiplexing condition, the method includes: cancelling sending of the first UCI on the fourth uplink channel; and determining a seventh uplink channel, where the seventh uplink channel is for carrying the second UCI and information to be carried on the sixth uplink channel, where the sixth uplink channel is a PUCCH, and/or the sixth uplink channel is a PUSCH, and there is no other PUCCH overlapping the fourth uplink channel; or determining a seventh uplink channel, where the seventh uplink channel is for carrying the second UCI and information to be carried on the sixth uplink channel; or when the sixth uplink channel is a PUSCH, and there is another PUCCH overlapping the fourth uplink channel, determining a seventh uplink channel, where the seventh uplink channel is for carrying the second UCI and information to be carried on the PUCCH, and does not include information to be carried on the sixth uplink channel.

In an optional example, when the fourth uplink channel is for carrying first UCI with the first priority and second UCI with the second priority, the fourth uplink channel overlaps the sixth uplink channel, and the fourth uplink channel and the sixth uplink channel do not meet the first multiplexing condition, and the method includes: when the fourth uplink channel and the sixth uplink channel meet a second multiplexing condition, cancelling sending of the first UCI on the fourth uplink channel, and determining a seventh uplink channel, where the seventh uplink channel is for carrying the second UCI on the fourth channel and the information on the sixth uplink channel; and/or when the fourth uplink channel and the sixth uplink channel meet a second multiplexing condition, cancelling sending of the fourth uplink channel.

According to a second aspect, a channel processing method is provided, applied to a network device. The method includes: determining a first uplink channel set, where the first uplink channel set includes a first uplink channel and another uplink channel overlapping the first uplink channel, each uplink channel other than the first uplink channel in the first uplink channel set overlaps the first uplink channel, and each uplink channel in the first uplink channel set corresponds to a first priority; determining a second uplink channel, where the second uplink channel is for carrying information to be carried on all or some uplink channels in the first uplink channel set; and if the second uplink channel overlaps a third uplink channel, when the second uplink channel and the third uplink channel meet a first multiplexing condition, or when the second uplink channel and the third uplink channel do not meet a first multiplexing condition, but a second priority corresponding to the third uplink channel is higher than the first priority, determining, based on the second uplink channel and the third uplink channel, a fourth uplink channel for carrying information carried on the second uplink channel and/or some or all information carried on the third uplink channel.

In an optional example, an uplink channel in the first uplink channel set is a physical uplink control channel PUCCH and/or a physical uplink shared channel PUSCH.

In an optional example, the second uplink channel overlaps a plurality of uplink channels, and the third uplink channel is an uplink channel that is earliest in time domain or an uplink channel that occupies a largest quantity of time-frequency resources in the plurality of uplink channels.

In an optional example, the third uplink channel is a PUCCH; or the third uplink channel is a PUSCH, and there is no PUCCH overlapping the second uplink channel.

In an optional example, when the second uplink channel and the third uplink channel meet the first multiplexing condition, the third uplink channel is a PUSCH, and there is a first PUCCH overlapping the second uplink channel, the fourth uplink channel is for carrying information to be carried on the first PUCCH and information to be carried on the second uplink channel.

In an optional example, when the second uplink channel and the third uplink channel do not meet the first multiplexing condition, but the second priority corresponding to the third uplink channel is higher than the first priority, the determining a fourth uplink channel includes: skipping receiving sending of the second uplink channel, and determining that the fourth uplink channel is the third uplink channel; skipping receiving sending of a non-PUSCH channel in the second uplink channel and the third uplink channel, and determining that the fourth uplink channel is a PUSCH in the second uplink channel and the third uplink channel; or skipping receiving sending of an uplink channel with a later time domain start symbol in the second uplink channel and the third uplink channel, and determining that the fourth uplink channel is an uplink channel with an earlier time domain start symbol in the second uplink channel and the third uplink channel.

In an optional example, the third uplink channel is a second multiplexed uplink channel, the second multiplexed uplink channel is for carrying information to be carried on all or some uplink channels in a second uplink channel set, the second uplink channel set includes a fifth uplink channel and at least one other uplink channel overlapping the fifth uplink channel, each uplink channel other than the fifth uplink channel in the second uplink channel set overlaps the fifth uplink channel, and each uplink channel in the second uplink channel set corresponds to the second priority.

In an optional example, an uplink channel in the second uplink channel set is a physical uplink control channel PUCCH and/or a physical uplink shared channel PUSCH.

In an optional example, when the fourth uplink channel overlaps a sixth uplink channel, and the fourth uplink channel and the sixth uplink channel meet the first multiplexing condition, the method further includes: determining a seventh uplink channel, where the seventh uplink channel is for carrying information on the fourth uplink channel and information carried on the sixth uplink channel.

In an optional example, the sixth uplink channel is a PUCCH; and/or the sixth uplink channel is a PUSCH, and there is no PUCCH overlapping the fourth uplink channel.

In an optional example, when the fourth uplink channel is for carrying first UCI with the first priority and second UCI with the second priority, the fourth uplink channel overlaps the sixth uplink channel, and the fourth uplink channel and the sixth uplink channel do not meet the first multiplexing condition, the method includes: skipping receiving sending of the first UCI on the fourth uplink channel; and determining a seventh uplink channel, where the seventh uplink channel is for carrying the second UCI and information to be carried on the sixth uplink channel, where the sixth uplink channel is a PUCCH, and/or the sixth uplink channel is a PUSCH, and there is no other PUCCH overlapping the fourth uplink channel; determining a seventh uplink channel, where the seventh uplink channel is for carrying the second UCI and information to be carried on the sixth uplink channel; or when the sixth uplink channel is a PUSCH, and there is another PUCCH overlapping the fourth uplink channel, determining a seventh uplink channel, where the seventh uplink channel is for carrying the second UCI and information to be carried on the PUCCH, and does not include information to be carried on the sixth uplink channel.

In an optional example, when the fourth uplink channel is for carrying first UCI with the first priority and second UCI with the second priority, the fourth uplink channel overlaps the sixth uplink channel, and the fourth uplink channel and the sixth uplink channel do not meet the first multiplexing condition, and the method includes: when the fourth uplink channel and the sixth uplink channel meet a second multiplexing condition, skipping receiving first UCI on the fourth uplink channel, and determining a seventh uplink channel, where the seventh uplink channel is for carrying the second UCI on the fourth channel and the information on the sixth uplink channel; and/or when the fourth uplink channel and the sixth uplink channel meet a second multiplexing condition, skipping receiving fourth uplink channel.

According to a third aspect, a channel processing method is provided, applied to a terminal device. The method includes: determining a first uplink channel set, where the first uplink channel set includes a first uplink channel and at least one other uplink channel overlapping the first uplink channel, each uplink channel in the first uplink channel set is a PUCCH, the uplink channel in the first uplink channel set corresponds to a first priority or a second priority, and the second priority is higher than the first priority; and determining a second uplink channel, where the second uplink channel is for carrying information carried on some uplink channels in the first uplink channel set, or the second uplink channel is for carrying information carried on all uplink channels in the first uplink channel set.

In an optional example, the method further includes: determining the first uplink channel, where the first uplink channel meets at least one of the following: The first uplink channel is an uplink channel that is earliest in time domain in a second uplink channel set, the first uplink channel is a channel that occupies a largest quantity of time domain resources in a second uplink channel set, or the first uplink channel is an uplink channel that corresponds to the second priority in a second uplink channel set. The first uplink channel set is a subset of the second uplink channel set, and uplink channels included in the second uplink channel set are all to-be-sent PUCCHs in one time unit.

In an optional example, the determining a second uplink channel includes: when the uplink channel in the first uplink channel set meets a first multiplexing condition, determining that the second uplink channel is for carrying information on the uplink channel in the first uplink channel set.

In an optional example, the determining a second uplink channel includes: when the uplink channel in the first uplink channel set does not meet a first multiplexing condition, determining that the second uplink channel is for carrying information on a fourth uplink channel, where a third uplink channel overlaps the fourth uplink channel, the third uplink channel corresponds to the first priority, and the fourth uplink channel corresponds to the second priority.

In an optional example, the second uplink channel and a fifth uplink channel overlap, and the method further includes:

when the second uplink channel and the fifth uplink channel meet the first multiplexing condition, determining that a sixth uplink channel is for carrying information on the second uplink channel and information on the fifth uplink channel.

In an optional example, when the second uplink channel and a fifth uplink channel overlap, and the second uplink channel and the fifth uplink channel do not meet the first multiplexing condition, the method further includes:

when the fifth uplink channel is a PUSCH with the second priority, and the second uplink channel is a PUCCH corresponding to the first priority, cancelling sending of the second uplink channel; or when the fifth uplink channel is a PUSCH with the second priority, and the second uplink channel is for carrying first UCI with the first priority and second UCI with the second priority, cancelling sending of the first UCI, and determining a sixth channel, where the sixth uplink channel is for carrying information on the fifth uplink channel and the second UCI. In an optional example, when the second uplink channel and the fifth uplink channel overlap, and the second uplink channel and the fifth uplink channel do not meet the first multiplexing condition, the method further includes: when the fifth uplink channel is a PUSCH with the second priority, the second uplink channel is for carrying first UCI with the first priority and second UCI with the second priority, and the fifth uplink channel and the second uplink channel meet a second multiplexing condition, cancelling sending of the first UCI, and determining a sixth channel, where the sixth uplink channel is for carrying information on the fifth uplink channel and the second UCI; or when the fifth uplink channel is a PUSCH with the second priority, the second uplink channel is for carrying first UCI with the first priority and second UCI with the second priority, and the fifth uplink channel and the second uplink channel do not meet a second multiplexing condition, cancelling sending of the second uplink channel.

In an optional example, the fifth uplink channel is a PUCCH; or the fifth uplink channel is a PUSCH, and there is no PUCCH overlapping the second uplink channel.

In an optional example, the second uplink channel and the fifth uplink channel overlap, and the method further includes: when the second uplink channel and the fifth uplink channel meet the first multiplexing condition, the fifth uplink channel is a PUSCH, and there is a PUCCH overlapping the second uplink channel, determining that the sixth uplink channel is for carrying information on the second uplink channel and/or information on the PUCCH overlapping the second uplink channel.

In an optional example, when the second uplink channel and the fifth uplink channel overlap, and the second uplink channel and the fifth uplink channel do not meet the first multiplexing condition, the method further includes: when the fifth uplink channel is a PUCCH with the second priority, and the second uplink channel is a PUCCH corresponding to the first priority, cancelling sending of the second uplink channel; or when the fifth uplink channel is a PUCCH with the second priority, and the second uplink channel is for carrying first UCI with the first priority and second UCI with the second priority, cancelling sending of one of the following channels or information: the second UCI or UCI carried on the fifth uplink channel that has a lower information priority, where the information priority meets: ACK>CSI>SR, where > indicates that the priority is higher; the second uplink channel or the fifth uplink channel that has later sending time; the fifth uplink channel; or the first UCI.

In an optional example, when the second uplink channel and the fifth uplink channel overlap, and the second uplink channel and the fifth uplink channel do not meet the first multiplexing condition, the method further includes: when the fifth uplink channel is a PUSCH with the second priority, and the second uplink channel is a PUCCH corresponding to the first priority, cancelling sending of the second uplink channel; or when the fifth uplink channel is a PUCCH with the second priority, and the second uplink channel is for carrying first UCI with the first priority and second UCI with the second priority, cancelling sending of the first UCI, and determining a sixth channel, where the sixth uplink channel is for carrying information on the fifth uplink channel and the second UCI. In an optional example, when the second uplink channel and the fifth uplink channel overlap, and the second uplink channel and the fifth uplink channel do not meet the first multiplexing condition, the method further includes: when the fifth uplink channel is a PUCCH with the second priority, the second uplink channel is for carrying first UCI with the first priority and second UCI with the second priority, and the fifth uplink channel and the second uplink channel meet a second multiplexing condition, cancelling sending of the first UCI, and determining a sixth channel, where the sixth uplink channel is for carrying information on the fifth uplink channel and the second UCI; or when the fifth uplink channel is a PUCCH with the second priority, the second uplink channel is for carrying first UCI with the first priority and second UCI with the second priority, and the fifth uplink channel and the second uplink channel do not meet a second multiplexing condition, cancelling sending of the second uplink channel.

In an optional example, when the second uplink channel and the fifth uplink channel overlap, and the second uplink channel and the fifth uplink channel do not meet the multiplexing condition, the fifth uplink channel corresponds to the first priority, and the second uplink channel includes first UCI corresponding to the first priority and second UCI corresponding to the second priority. The method further includes: cancelling sending of the fifth uplink channel.

According to a fourth aspect, a channel processing method is provided, applied to a network device. The method includes: determining a first uplink channel set, where the first uplink channel set includes a first uplink channel and at least one other uplink channel overlapping the first uplink channel, each uplink channel in the first uplink channel set is a PUCCH, the uplink channel in the first uplink channel set corresponds to a first priority or a second priority, and the second priority is higher than the first priority; and determining a second uplink channel, where the second uplink channel is for carrying information carried on some uplink channels in the first uplink channel set, or the second uplink channel is for carrying information carried on all uplink channels in the first uplink channel set.

In an optional example, the method further includes: determining the first uplink channel, where the first uplink channel meets at least one of the following: The first uplink channel is an uplink channel that is earliest in time domain in a second uplink channel set, the first uplink channel is a channel that occupies a largest quantity of time domain resources in a second uplink channel set, or the first uplink channel is an uplink channel that corresponds to the second priority in a second uplink channel set. The first uplink channel set is a subset of the second uplink channel set, and uplink channels included in the second uplink channel set are all to-be-sent PUCCHs in one time unit.

In an optional example, the determining a second uplink channel includes: when the uplink channel in the first uplink channel set meets a first multiplexing condition, determining that the second uplink channel is for carrying information on the uplink channel in the first uplink channel set.

In an optional example, the determining a second uplink channel includes: when the uplink channel in the first uplink channel set does not meet a first multiplexing condition, determining that the second uplink channel is for carrying information on a fourth uplink channel, where a third uplink channel overlaps the fourth uplink channel, the third uplink channel corresponds to the first priority, and the fourth uplink channel corresponds to the second priority.

In an optional example, the second uplink channel and a fifth uplink channel overlap, and the method further includes:

when the second uplink channel and the fifth uplink channel meet the first multiplexing condition, determining that a sixth uplink channel is for carrying information on the second uplink channel and information on the fifth uplink channel.

In an optional example, when the second uplink channel and a fifth uplink channel overlap, and the second uplink channel and the fifth uplink channel do not meet the first multiplexing condition, the method further includes:

when the fifth uplink channel is a PUSCH with the second priority, and the second uplink channel is a PUCCH corresponding to the first priority, skipping receiving sending of the second uplink channel; or when the fifth uplink channel is a PUSCH with the second priority, and the second uplink channel is for carrying first UCI with the first priority and second UCI with the second priority, skipping receiving sending of the first UCI, and determining a sixth channel, where the sixth uplink channel is for carrying information on the fifth uplink channel and the second UCI. In an optional example, when the second uplink channel and the fifth uplink channel overlap, and the second uplink channel and the fifth uplink channel do not meet the first multiplexing condition, the method further includes: when the fifth uplink channel is a PUSCH with the second priority, the second uplink channel is for carrying first UCI with the first priority and second UCI with the second priority, and the fifth uplink channel and the second uplink channel meet a second multiplexing condition, skipping receiving sending of the first UCI, and determining a sixth channel, where the sixth uplink channel is for carrying information on the fifth uplink channel and the second UCI; or when the fifth uplink channel is a PUSCH with the second priority, the second uplink channel is for carrying first UCI with the first priority and second UCI with the second priority, and the fifth uplink channel and the second uplink channel do not meet a second multiplexing condition, skipping receiving sending of the second uplink channel.

In an optional example, the fifth uplink channel is a PUCCH; or the fifth uplink channel is a PUSCH, and there is no PUCCH overlapping the second uplink channel.

In an optional example, the second uplink channel and the fifth uplink channel overlap, and the method further includes: when the second uplink channel and the fifth uplink channel meet the first multiplexing condition, the fifth uplink channel is a PUSCH, and there is a PUCCH overlapping the second uplink channel, determining that the sixth uplink channel is for carrying information on the second uplink channel and/or information on the PUCCH overlapping the second uplink channel.

In an optional example, when the second uplink channel and the fifth uplink channel overlap, and the second uplink channel and the fifth uplink channel do not meet the first multiplexing condition, the method further includes: when the fifth uplink channel is a PUCCH with the second priority, and the second uplink channel is a PUCCH corresponding to the first priority, skipping receiving sending of the second uplink channel; or when the fifth uplink channel is a PUCCH with the second priority, and the second uplink channel is for carrying first UCI with the first priority and second UCI with the second priority, skipping receiving sending of one of the following channels or information: the second UCI or UCI carried on the fifth uplink channel that has a lower information priority, where the information priority meets: ACK>CSI>SR, where > indicates that the priority is higher; the second uplink channel or the fifth uplink channel that has later sending time; the fifth uplink channel; or the first UCI.

In an optional example, when the second uplink channel and the fifth uplink channel overlap, and the second uplink channel and the fifth uplink channel do not meet the first multiplexing condition, the method further includes: when the fifth uplink channel is a PUSCH with the second priority, and the second uplink channel is a PUCCH corresponding to the first priority, skipping receiving sending of the second uplink channel; or when the fifth uplink channel is a PUCCH with the second priority, and the second uplink channel is for carrying first UCI with the first priority and second UCI with the second priority, skipping receiving sending of the first UCI, and determining a sixth channel, where the sixth uplink channel is for carrying information on the fifth uplink channel and the second UCI. In an optional example, when the second uplink channel and the fifth uplink channel overlap, and the second uplink channel and the fifth uplink channel do not meet the first multiplexing condition, the method further includes: when the fifth uplink channel is a PUCCH with the second priority, the second uplink channel is for carrying first UCI with the first priority and second UCI with the second priority, and the fifth uplink channel and the second uplink channel meet a second multiplexing condition, skipping receiving sending of the first UCI, and determining a sixth channel, where the sixth uplink channel is for carrying information on the fifth uplink channel and the second UCI; or when the fifth uplink channel is a PUCCH with the second priority, the second uplink channel is for carrying first UCI with the first priority and second UCI with the second priority, and the fifth uplink channel and the second uplink channel do not meet a second multiplexing condition, skipping receiving sending of the second uplink channel.

In an optional example, when the second uplink channel and the fifth uplink channel overlap, and the second uplink channel and the fifth uplink channel do not meet the multiplexing condition, the fifth uplink channel corresponds to the first priority, and the second uplink channel includes first UCI corresponding to the first priority and second UCI corresponding to the second priority. The method further includes: skipping receiving sending of the fifth uplink channel.

According to a fifth aspect, a communication apparatus is provided. The apparatus includes:

a processing module, configured to determine a first uplink channel set, where the first uplink channel set includes a first uplink channel and another uplink channel overlapping the first uplink channel, each uplink channel other than the first uplink channel in the first uplink channel set overlaps the first uplink channel, and each uplink channel in the first uplink channel set corresponds to a first priority.

The processing module is configured to determine a second uplink channel, where the second uplink channel is for carrying information to be carried on all or some uplink channels in the first uplink channel set.

The processing module is further configured to: if the second uplink channel overlaps a third uplink channel, when the second uplink channel and the third uplink channel meet a first multiplexing condition, or when the second uplink channel and the third uplink channel do not meet a first multiplexing condition, but a second priority corresponding to the third uplink channel is higher than the first priority, determine, based on the second uplink channel and the third uplink channel, a fourth uplink channel for carrying information to be carried on the second uplink channel and/or some or all information carried on the third uplink channel.

In this embodiment of this application, the first uplink channel set is obtained through division, to process overlapping of low-priority uplink channels, and then process overlapping of a low-priority uplink channel and a high-priority uplink channel, including multiplexing processing of the channels. This improves efficiency of sending uplink control information and/or uplink data on the low-priority uplink channel, reduces a probability of cross-priority overlapping processing, and reduces processing complexity and time consumption.

In an optional example, an uplink channel in the first uplink channel set is a physical uplink control channel PUCCH and/or a physical uplink shared channel PUSCH.

In an optional example, the second uplink channel overlaps a plurality of uplink channels, and the third uplink channel is an uplink channel that is earliest in time domain or an uplink channel that occupies a largest quantity of time-frequency resources in the plurality of uplink channels.

In an optional example, the third uplink channel is a PUCCH; or the third uplink channel is a PUSCH, and there is no PUCCH overlapping the second uplink channel.

In an optional example, when the second uplink channel and the third uplink channel meet the first multiplexing condition, the third uplink channel is a PUSCH, and there is a first PUCCH overlapping the second uplink channel, the fourth uplink channel is for carrying information to be carried on the first PUCCH and information to be carried on the second uplink channel.

In an optional example, when the second uplink channel and the third uplink channel do not meet the first multiplexing condition, but the second priority corresponding to the third uplink channel is higher than the first priority, the determining a fourth uplink channel includes: cancelling sending of the second uplink channel, and determining that the fourth uplink channel is the third uplink channel; cancelling sending of a non-PUSCH channel in the second uplink channel and the third uplink channel, and determining that the fourth uplink channel is a PUSCH in the second uplink channel and the third uplink channel; or cancelling sending of an uplink channel with a later time domain start symbol in the second uplink channel and the third uplink channel, and determining that the fourth uplink channel is an uplink channel with an earlier time domain start symbol in the second uplink channel and the third uplink channel.

In an optional example, the third uplink channel is a second multiplexed uplink channel, the second multiplexed uplink channel is for carrying information to be carried on all or some uplink channels in a second uplink channel set, the second uplink channel set includes a fifth uplink channel and at least one other uplink channel overlapping the fifth uplink channel, each uplink channel other than the fifth uplink channel in the second uplink channel set overlaps the fifth uplink channel, and each uplink channel in the second uplink channel set corresponds to the second priority.

In this embodiment of this application, the third uplink channel is an uplink channel obtained after the second uplink channel set is divided based on the high-priority uplink channel and overlapping processing is performed. In other words, when overlapping between a low-priority uplink channel and a high-priority uplink channel is processed, overlapping between uplink channels with a same priority is first processed. This further reduces a probability of cross-priority overlapping processing, and reduces processing complexity and time consumption.

In an optional example, an uplink channel in the second uplink channel set is a physical uplink control channel PUCCH and/or a physical uplink shared channel PUSCH.

In an optional example, when the fourth uplink channel overlaps a sixth uplink channel, and the fourth uplink channel and the sixth uplink channel meet the first multiplexing condition, the processing module is further configured to determine a seventh uplink channel, where the seventh uplink channel is for carrying information on the fourth uplink channel and information carried on the sixth uplink channel.

In an optional example, the sixth uplink channel is a PUCCH; and/or the sixth uplink channel is a PUSCH, and there is no PUCCH overlapping the fourth uplink channel.

In an optional example, when the fourth uplink channel is for carrying first UCI with the first priority and second UCI with the second priority, the fourth uplink channel overlaps the sixth uplink channel, and the fourth uplink channel and the sixth uplink channel do not meet the first multiplexing condition, the processing module is configured to: cancel sending of the first UCI on the fourth uplink channel; and determine a seventh uplink channel, where the seventh uplink channel is for carrying the second UCI and information to be carried on the sixth uplink channel, where the sixth uplink channel is a PUCCH, and/or the sixth uplink channel is a PUSCH, and there is no other PUCCH overlapping the fourth uplink channel; determine a seventh uplink channel, where the seventh uplink channel is for carrying the second UCI and information to be carried on the sixth uplink channel; or when the sixth uplink channel is a PUSCH, and there is another PUCCH overlapping the fourth uplink channel, determine a seventh uplink channel, where the seventh uplink channel is for carrying the second UCI and information to be carried on the PUCCH, and does not include information to be carried on the sixth uplink channel.

In an optional example, when the fourth uplink channel is for carrying first UCI with the first priority and second UCI with the second priority, the fourth uplink channel overlaps the sixth uplink channel, and the fourth uplink channel and the sixth uplink channel do not meet the first multiplexing condition, and the processing module is configured to: when the fourth uplink channel and the sixth uplink channel meet a second multiplexing condition, cancel sending of the first UCI on the fourth uplink channel, and determine a seventh uplink channel, where the seventh uplink channel is for carrying the second UCI on the fourth channel and the information on the sixth uplink channel; and/or when the fourth uplink channel and the sixth uplink channel meet a second multiplexing condition, cancel sending of the fourth uplink channel.

According to a sixth aspect, a communication apparatus is provided. The apparatus includes:

- a processing module, configured to determine a first uplink channel set, where the first uplink channel set includes a first uplink channel and another uplink channel overlapping the first uplink channel, each uplink channel other than the first uplink channel in the first uplink channel set overlaps the first uplink channel, and each uplink channel in the first uplink channel set corresponds to a first priority.

The processing module is further configured to determine a second uplink channel, where the second uplink channel is for carrying information to be carried on all or some uplink channels in the first uplink channel set.

The processing module is further configured to: if the second uplink channel overlaps a third uplink channel, when the second uplink channel and the third uplink channel meet a first multiplexing condition, or when the second uplink channel and the third uplink channel do not meet a first multiplexing condition, but a second priority corresponding to the third uplink channel is higher than the first priority, determine, based on the second uplink channel and the third uplink channel, a fourth uplink channel for carrying information to be carried on the second uplink channel and/or some or all information carried on the third uplink channel.

In an optional example, an uplink channel in the first uplink channel set is a physical uplink control channel PUCCH and/or a physical uplink shared channel PUSCH.

In an optional example, the second uplink channel overlaps a plurality of uplink channels, and the third uplink channel is an uplink channel that is earliest in time domain or an uplink channel that occupies a largest quantity of time-frequency resources in the plurality of uplink channels.

In an optional example, the third uplink channel is a PUCCH; or the third uplink channel is a PUSCH, and there is no PUCCH overlapping the second uplink channel.

In an optional example, when the second uplink channel and the third uplink channel meet the first multiplexing condition, the third uplink channel is a PUSCH, and there is a first PUCCH overlapping the second uplink channel, the fourth uplink channel is for carrying information to be carried on the first PUCCH and information to be carried on the second uplink channel.

In an optional example, when the second uplink channel and the third uplink channel do not meet the first multiplexing condition, but the second priority corresponding to the third uplink channel is higher than the first priority, the determining a fourth uplink channel includes: skipping receiving sending of the second uplink channel, and determining that the fourth uplink channel is the third uplink channel; skipping receiving sending of a non-PUSCH channel in the second uplink channel and the third uplink channel, and determining that the fourth uplink channel is a PUSCH in the second uplink channel and the third uplink channel; or skipping receiving sending of an uplink channel with a later time domain start symbol in the second uplink channel and the third uplink channel, and determining that the fourth uplink channel is an uplink channel with an earlier time domain start symbol in the second uplink channel and the third uplink channel.

In an optional example, the third uplink channel is a second multiplexed uplink channel, the second multiplexed uplink channel is for carrying information to be carried on all or some uplink channels in a second uplink channel set, the second uplink channel set includes a fifth uplink channel and at least one other uplink channel overlapping the fifth uplink channel, each uplink channel other than the fifth uplink channel in the second uplink channel set overlaps the fifth uplink channel, and each uplink channel in the second uplink channel set corresponds to the second priority.

In an optional example, an uplink channel in the second uplink channel set is a physical uplink control channel PUCCH and/or a physical uplink shared channel PUSCH.

In an optional example, when the fourth uplink channel overlaps a sixth uplink channel, and the fourth uplink channel and the sixth uplink channel meet the first multiplexing condition, the processing module is further configured to determine a seventh uplink channel, where the seventh uplink channel is for carrying information on the fourth uplink channel and information carried on the sixth uplink channel.

In an optional example, the sixth uplink channel is a PUCCH; and/or the sixth uplink channel is a PUSCH, and there is no PUCCH overlapping the fourth uplink channel.

In an optional example, when the fourth uplink channel is for carrying first UCI with the first priority and second UCI with the second priority, the fourth uplink channel overlaps the sixth uplink channel, and the fourth uplink channel and the sixth uplink channel do not meet the first multiplexing condition, the processing module is configured to: skip receiving sending of the first UCI on the fourth uplink channel; and determine a seventh uplink channel, where the seventh uplink channel is for carrying the second UCI and information to be carried on the sixth uplink channel, where the sixth uplink channel is a PUCCH, and/or the sixth uplink channel is a PUSCH, and there is no other PUCCH overlapping the fourth uplink channel; determine a seventh uplink channel, where the seventh uplink channel is for carrying the second UCI and information to be carried on the sixth uplink channel; or when the sixth uplink channel is a PUSCH, and there is another PUCCH overlapping the fourth uplink channel, determine a seventh uplink channel, where the seventh uplink channel is for carrying the second UCI and information to be carried on the PUCCH, and does not include information to be carried on the sixth uplink channel.

In an optional example, when the fourth uplink channel is for carrying first UCI with the first priority and second UCI with the second priority, the fourth uplink channel overlaps the sixth uplink channel, and the fourth uplink channel and the sixth uplink channel do not meet the first multiplexing condition, and the processing module is configured to: when the fourth uplink channel and the sixth uplink channel meet a second multiplexing condition, cancel sending of the first UCI on the fourth uplink channel, and determine a seventh uplink channel, where the seventh uplink channel is for carrying the second UCI on the fourth channel and the information on the sixth uplink channel; and/or when the fourth uplink channel and the sixth uplink channel meet a second multiplexing condition, cancel sending of the fourth uplink channel.

According to a seventh aspect, an embodiment of this application provides a communication apparatus. The apparatus includes a communication interface and at least one processor, and the communication interface is used by the apparatus to communicate with another device. For example, the communication interface may be a transceiver, a circuit, a bus, a module, or a communication interface of another type, and the another device may be a network device. The at least one processor is configured to invoke a group of programs, instructions, or data, to perform the method described in the first aspect, the second aspect, the third aspect, or the fourth aspect. The apparatus may further include a memory, configured to store the program, the instructions, or the data invoked by the processor. The memory is coupled to the at least one processor. When executing the instructions or data stored in the memory, the at least one processor may implement the method described in the first aspect, the second aspect, the third aspect, or the fourth aspect.

According to an eighth aspect, an embodiment of this application further provides a computer-readable storage medium. The computer-readable storage medium stores instructions. When the instructions are run on a computer, the computer is enabled to perform the method according to any one of the first aspect or the possible implementations of the first aspect, or the computer is enabled to perform the method according to any one of the second aspect or the possible implementations of the second aspect, or the computer is enabled to perform the method according to any one of the third aspect or the possible implementations of the third aspect, or the computer is enabled to perform the method according to any one of the fourth aspect or the possible implementations of the fourth aspect.

According to a ninth aspect, an embodiment of this application provides a chip system. The chip system includes a processor, and may further include a memory, configured to implement the method in any one of the first aspect or the possible implementations of the first aspect, or configured to implement the method in any one of the second aspect or the possible implementations of the second aspect, or configured to implement the method in any one of the third aspect or the possible implementations of the third aspect, or configured to implement the method in any one of the fourth aspect or the possible implementations of the fourth aspect. The chip system may include a chip, or may include a chip and another discrete device.

In a possible example, the chip system further includes a transceiver.

According to a tenth aspect, an embodiment of this application further provides a computer program product, including instructions. When the instructions are run on a computer, the computer is enabled to perform the method according to any one of the first aspect or the possible implementations of the first aspect, or the computer is enabled to perform the method according to any one of the second aspect or the possible implementations of the second aspect, or the computer is enabled to perform the method according to any one of the third aspect or the possible implementations of the third aspect, or the computer is enabled to perform the method according to any one of the fourth aspect or the possible implementations of the fourth aspect.

According to an eleventh aspect, an embodiment of this application further provides a communication system. The communication system may include the communication apparatuses provided in the fifth aspect and the sixth aspect, or the communication system may include a communication apparatus configured to perform the methods in the third aspect and the fourth aspect.

BRIEF DESCRIPTION OF DRAWINGS

To describe the technical solutions in embodiments of this application more clearly, the following briefly describes the accompanying drawings used in embodiments.

FIG. 6 is a schematic diagram of a multiplexing timeline relationship of R16 according to an embodiment of this application;

FIG. 7A is a flowchart of a method for reporting a capability by a terminal according to an embodiment of this application;

FIG. 9D is a flowchart of another channel processing method according to an embodiment of this application;

FIG. 9E shows another channel processing method according to an embodiment of this application;

DESCRIPTION OF EMBODIMENTS

Figure 1:
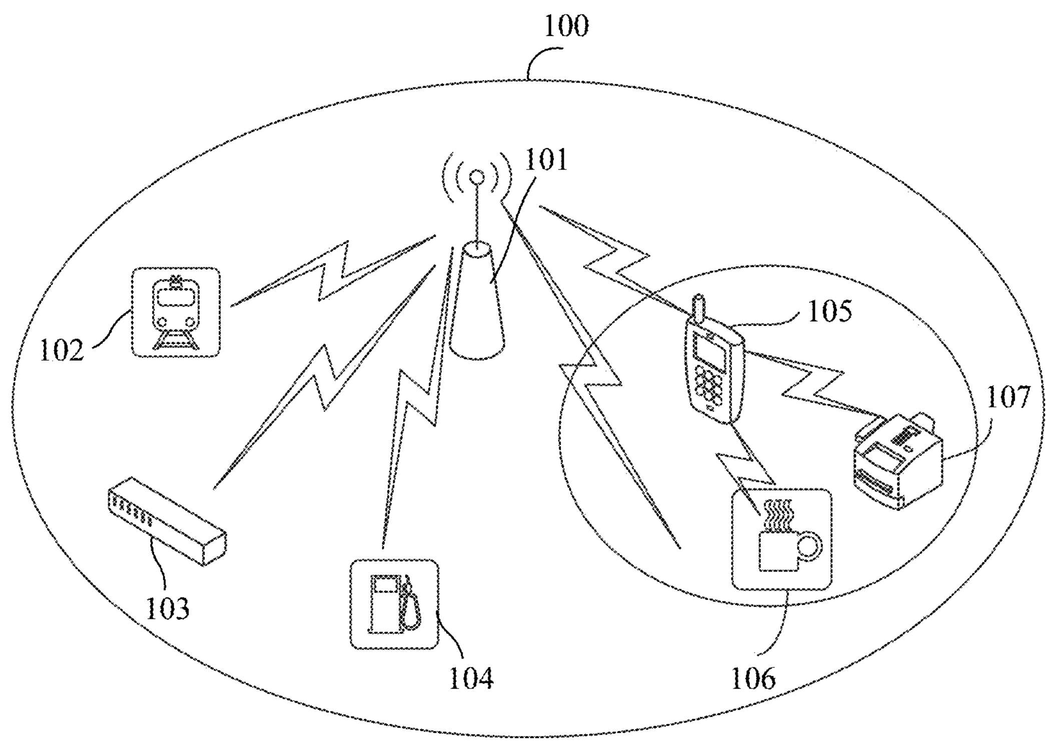
FIG. 1 is a schematic diagram of a structure of a communication system according to an embodiment of this application.

In the specification, claims, and accompanying drawings of this application, the terms "first", "second", "third", "fourth" and so on are intended to distinguish between different objects but do not indicate a particular order. In addition, the terms "include" and "have" and any variations thereof are intended to cover non-exclusive inclusion. For example, a process, a method, a system, a product, or a device that includes a series of steps or modules is not limited to the listed steps or modules, but optionally further includes an unlisted step or module, or optionally further includes another inherent step or module of the process, the method, the product, or the device.

The "embodiment" mentioned in this specification means that specific features, structures, or characteristics described with reference to the embodiment may be included in at least one embodiment of this application. Appearance of the phrase at various locations in the specification does not necessarily refer to a same embodiment, or an independent or alternative embodiment mutually exclusive with another embodiment. A person skilled in the art may explicitly and implicitly understand that the embodiments described in this specification may be combined with other embodiments.

"A plurality of" means two or more than two. The term "and/or" describes an association relationship of associated objects, and indicates that three relationships may exist. For example, A and/or B may indicate the following three cases: Only A exists, both A and B exist, and only B exists. The character "/" usually indicates an "or" relationship between the associated objects.

An application scenario in embodiments of this application is described first.

Embodiments of this application are applicable to a long term evolution (long term evolution, LTE) system and an internet of things (internet of things, IOT) system, and are applicable to another wireless communication system, for example, a global system for mobile communications (global system for mobile communications, GSM), a universal mobile telecommunications system (universal mobile telecommunications system, UMTS), a code division multiple access (code division multiple access, CDMA) system, and a new radio (new radio, NR) system.

A terminal device in embodiments of this application may also be referred to as a terminal, user equipment (user equipment, UE), a mobile station, a mobile terminal, or the like. The terminal may be widely used in various scenarios, for example, device-to-device (device-to-device, D2D), vehicle-to-everything (vehicle-to-everything, V2X) communication, machine-type communication (machine-type communication, MTC), internet of things (internet of things, IOT), virtual reality, augmented reality, industrial control, autonomous driving, telemedicine, smart grid, smart furniture, smart office, smart wearable, smart transportation, and smart city. The terminal may be a mobile phone, a tablet computer, a computer with wireless sending and receiving functions, a wearable device, a vehicle, an uncrewed aerial vehicle, a helicopter, an airplane, a ship, a robot, a robot arm, a smart home device, or the like. Neither of a specific technology and a specific device form used for the terminal is limited in embodiments of this application. A network device in embodiments of this application may also be referred to as a radio access network device. The network device may be a base station (base station), an evolved NodeB (evolved NodeB, eNodeB), a transmission reception point (transmission reception point, TRP), a next generation NodeB (next generation NodeB, gNB) in a 5th generation (5th generation, 5G) mobile communication system, a next generation NodeB in a 6th generation (6th generation, 6G) mobile communication system, a base station in a future mobile communication system, an access node in a Wi-Fi system, or the like, or may be a module or unit that completes some functions of the base station, for example, may be a central unit (central unit, CU), or may be a distributed unit (distributed unit, DU). The CU completes functions of a radio resource control protocol and a packet data convergence protocol (packet data convergence protocol, PDCP) of the base station, and may further complete a function of a service data adaptation protocol (service data adaptation protocol, SDAP). The DU completes functions of a radio link control layer and a medium access control (medium access control, MAC) layer of the base station, and may further complete a function of a part or all of a physical layer. For specific descriptions of the foregoing protocol layers, refer to related technical specifications of the 3rd generation partnership project (3rd generation partnership project, 3GPP). The radio access network device may be a macro base station, may be a micro base station or an indoor base station, or may be a relay node, a donor node, or the like. Neither of a specific technology and a specific device form used for the radio access network device is limited in embodiments of this application.

For a system structure of the terminal device and the network device, refer to FIG. 1. FIG. 1 is a schematic diagram of a structure of a communication system according to an embodiment of this application. As shown in FIG. 1, the system includes one network device 101 and six terminal devices. The six terminal devices are a terminal device 102, a terminal device 103, a terminal device 104, a terminal device 105, a terminal device 106, and a terminal device 107. In the example shown in FIG. 1, the terminal device 102 is a vehicle, the terminal device 103 is a smart air conditioner, the terminal device 104 is a smart tanker, the terminal device 105 is a mobile phone, the terminal device 106 is a smart cup, and the terminal device 107 is a printer.

Figure 2:
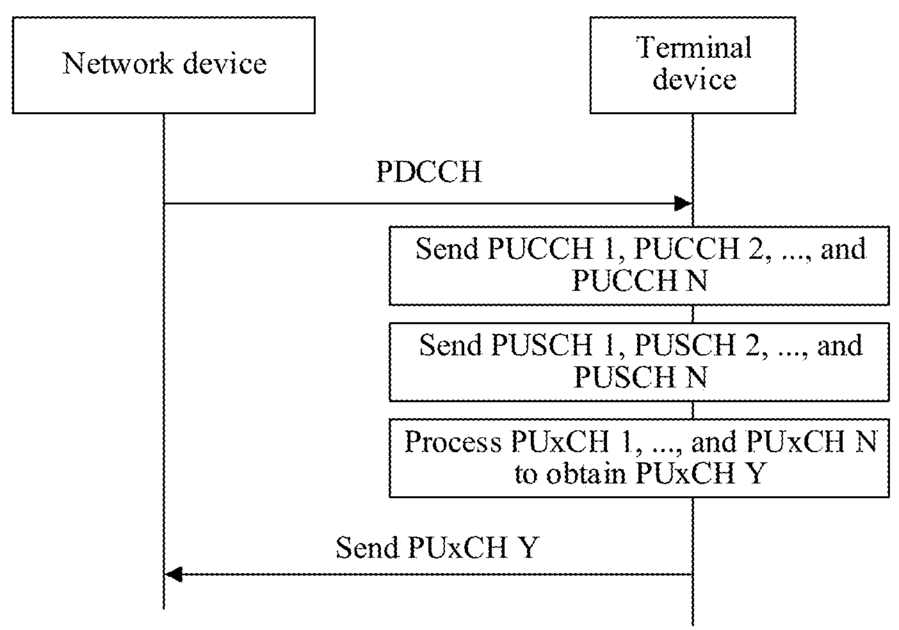
FIG. 2 is a schematic diagram of an information exchange process in a communication system according to an embodiment of this application.

Further, the network device and the terminal device in the system may exchange information, as shown in FIG. 2. FIG. 2 is a schematic diagram of an information exchange process in a communication system according to an embodiment of this application. The network device sends physical downlink control information (downlink control information, DCI) or other configuration information to the terminal device by using a physical downlink control channel (physical downlink control channel, PDCCH), to schedule the terminal device to send uplink control information and/or uplink data. The terminal device sends the uplink control information and/or the uplink data based on the information on the PDCCH. The uplink control information is sent by using an uplink control channel (physical uplink control channel, PUCCH). The uplink data is usually sent by using a physical uplink shared channel (physical uplink shared channel, PUSCH). To be specific, as shown in FIG. 2, the terminal device may send PUCCH 1, PUCCH 2, . . . , and PUCCH N to the network device, and may send PUSCH 1, PUSCH 2, . . . , and PUSCH N to the network device. Because a plurality of PU×CHs (PU×CH refers to PUCCH or PUSCH) may overlap, including time domain overlapping and/or frequency domain overlapping, the terminal device may process the plurality of PU×CHs, to resolve an overlapping problem, so as to obtain PU×CH Y, and send PU×CH Y to the network device. In embodiments of this application, overlapping may include partial overlapping and complete overlapping, and the partial overlapping may also be understood as incomplete overlapping. Unless otherwise specified, overlapping in embodiments of this application refers to overlapping in time domain.

The conventional technology includes a method for processing a plurality of overlapping PU×CHs. For example, 3GPP release 15 (release 15, R15) includes two application scenarios: (1) PUCCH #1 and PUCCH #2 overlap in time domain. Uplink control information (uplink control information, UCI) carried on the two PUCCHs may be multiplexed to PUCCH #3 for transmission. PUCCH #3 herein may be PUCCH #1 or PUCCH #2, or may be another PUCCH different from PUCCH #1 and PUCCH #2. (2) PUCCH #1 and PUSCH #1 overlap in time domain. UCI carried on PUCCH #1 and data carried on PUSCH #1 may be multiplexed for transmission on PUSCH #1 together. When two channels overlap, multiplexing timeline timeline #1 needs to be met, and multiplexing transmission is definitely performed. In 3GPP release 16 (release 16, R16), a concept of a physical layer priority is proposed, and may indicate a priority of information transmitted on a physical channel, or may be understood as indicating whether the information belongs to a URLLC service or an eMBB service. In embodiments of this application, the physical layer priority may include two types of priorities: a low priority (low priority, LP) and a high priority (high priority, HP). For two overlapping uplink channels with a same priority, multiplexing can be performed according to the R15 principle. In addition, for two overlapping uplink channels with different priorities, only "high eliminating low" is supported, that is, a high-priority uplink channel is sent and sending of a low-priority uplink channel is cancelled. Cancelling sending of the low-priority uplink channel includes two meanings: cancelling sending of the low-priority uplink channel, and no longer subsequently sending information carried on the uplink channel; and cancelling sending of the low-priority uplink channel, retaining information on the uplink channel, and sending the information on the uplink channel by using another channel next time. The following describes multiplexing rules of R15 and R16 in detail.

R15 multiplexing timeline timeline #1 is classified into two types: PUCCH and PUSCH (PUCCH vs PUSCH) multiplexing and PUCCH and PUCCH (PUCCH vs PUCCH) multiplexing.

Figure 3:
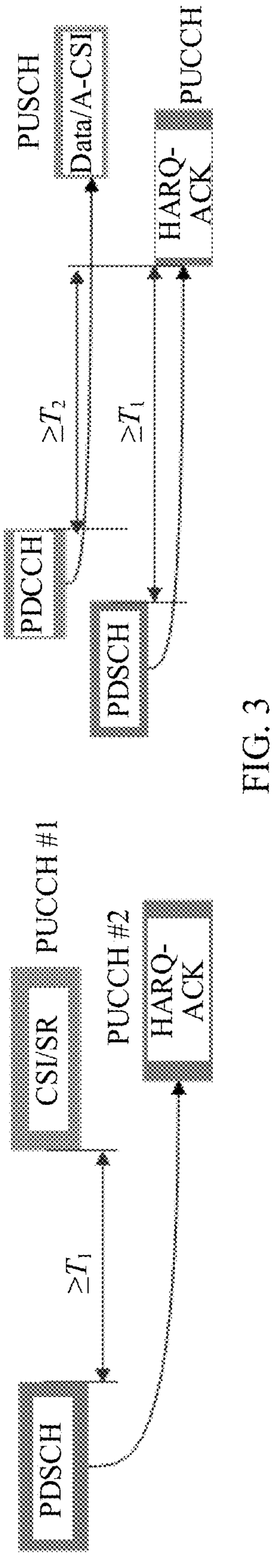
FIG. 3 is a schematic diagram of a multiplexing timeline according to an embodiment of this application.

For PUCCH vs PUCCH: (1) Specifically, refer to FIG. 3. FIG. 3 is a schematic diagram of a multiplexing timeline according to an embodiment of this application. As shown in (a) in FIG. 3, if PUCCH 1 carries a HARQ-ACK, multiplexing timeline #1 is as follows: A distance between the $1^{st}$ symbol of an overlapping PUCCH (an earlier symbol in start symbols on PUCCH 1 or PUCCH 2 that overlaps PUCCH 1) and an end symbol of a downlink shared channel (Physical Downlink Shared Channel, PDSCH) needs to be greater than or equal to $T_1=N_1+d_{1,1}+1$ symbols. $N_1$ is a preset value, and is related to a subcarrier spacing and a UE capability. $d_{1,1}$ is a preset offset, and is related to a time domain length and a type of the PDSCH. $N_1+d_{1,1}$ is used to ensure that after receiving the PDSCH, UE has sufficient time to generate a HARQ-ACK and complete sending preparation. The additional 1 symbol is a processing latency specially introduced for multiplexing of a plurality of PUCCHs. (2) If none of overlapping PUCCHs includes a HARQ-ACK, for example, an SR and CSI, timeline #1 does not exist, in other words, timeline #1 is met by default.

For PUCCH vs PUSCH: As shown in (b) in FIG. 3, if a PUCCH carries a HARQ-ACK, a distance between the 1st symbol (an earlier symbol in two start symbols) of overlapping PUCCH and PUSCH and an end symbol of the PDSCH needs to be greater than or equal to $T_1=N_1+d_{1,1}+1$ symbols. Explanations are the same as the foregoing descriptions. If the PUSCH is a dynamically scheduled PUSCH, or the first transmission activated by DCI in a Type-2 configured grant (Configured grant, GB) PUSCH, a distance between the 1st symbol of the overlapping PUCCH and PUSCH and an end symbol of a PDCCH on which the DCI for uplink scheduling is located is $T_2=N_2+d_{2,1}+1$. $N_2$ is a preset value, and is related to a subcarrier spacing and a UE capability. $d_{2,1}$ is a preset offset, and is related to a type of the PUSCH. $N_2+d_{2,1}$ is used to ensure that after receiving the UL DCI, UE has sufficient time to complete PUSCH sending preparation. The additional 1 symbol is a processing latency specially introduced for PUCCH and PUSCH multiplexing.

In some special cases, for example, a case that a HARQ-ACK is a response message to release of a semi-persistent scheduling (semi-persistent scheduling, SPS) PDSCH, or a case that a PUSCH carries only aperiodic channel state information (aperiodic channel state information, A-CSI), multiplexing timelines are different. The multiplexing timelines in these special cases are not described herein.

In R15, there are two types of multiplexing timelines: multiplexing between a plurality of overlapping PUCCHs and multiplexing between overlapping PUCCH and PUSCH.

The multiplexing between a plurality of overlapping PUCCHs basically includes two steps:

(1) Process multiplexing of a plurality of pieces of CSI. In one slot (slot), only CSI carried on one PUCCH or CSI carried on two PUCCHs (one is long and the other is short) can be sent. A specific manner is not described.

Figure 4:
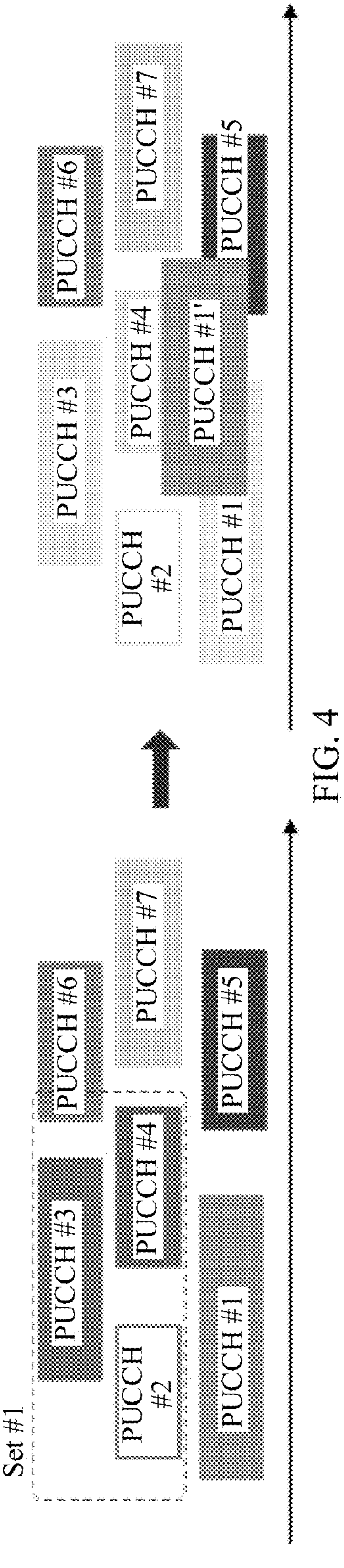
FIG. 4 is a schematic diagram of multiplexing a plurality of PUCCHs according to an embodiment of this application.

(2) Time domain sequential multiplexing: Refer to FIG. 4. FIG. 4 is a schematic diagram of multiplexing a plurality of PUCCHs according to an embodiment of this application. As shown in the figure, UE sorts all PUCCHs (denoted as set #0) that need to be processed (a principle is that a PUCCH with an earlier start symbol is sorted first, and a PUCCH with a same start symbol and a longer length is sorted first). Then, for the $1^{st}$ PUCCH (denoted as PUCCH #1), a set (denoted as set 1) of all PUCCHs that overlap PUCCH #1 is found, and PUCCH #1 and all the PUCCHs in set #1 are multiplexed onto one PUCCH #1' for transmission. Then, PUCCH #1 and the PUCCHs in set #1 are removed from set #0, and PUCCH #1' is added. Then, the foregoing processing is repeated.

Multiplexing between overlapping PUCCH and PUSCH:

(1) Multiplexing for overlapping of one PUCCH and a plurality of PUSCHs: According to a specific principle, one PUSCH is selected to carry uplink control information (uplink control information, UCI) on the overlapping PUCCH. Priorities in the PUSCH selection principle are sorted as follows: (1) PUSCH carrying A-CSI. (2) Earliest PUSCH in a slot in time domain. In multi-carrier (Component Carrier, CC) PUSCH transmission, there may be a plurality of slots corresponding to different carriers. Even if one carrier has only one slot, there may be a plurality of PUSCHs in the slot, and the earliest one in time domain is selected. (3) A priority of a dynamically scheduled (Grant-based, GB)-PUSCH is higher than that of a configured grant (Configured Grant, CG)-PUSCH. (4) A priority of a PUSCH with a smaller CC index (index) is higher than that of a PUSCH with a larger CC index. (5) A priority of a PUSCH with an earlier start symbol is higher than that of a PUSCH with a later start symbol.

(2) Multiplexing for overlapping between one PUSCH and a plurality of PUCCHs: After determining in the foregoing step, if UCI of a plurality of PUCCHs needs to be multiplexed onto one PUSCH, the UCI can be directly multiplexed onto the PUSCH.

The multiplexing rule of R16 includes multiplexing of overlapping channels with a same priority and "high eliminating low" of overlapping channels with different priorities. However, a specific processing sequence needs to be specified.

Uplink transmission classification and a priority indicator in R16 are first described. Uplink transmission is classified into two types: uplink transmission dynamically scheduled or triggered by downlink control information DCI, and uplink transmission statically configured by higher layer signaling.

(1) HARQ-ACK on a PUCCH: hybrid automatic repeat request (Hybrid Automatic Repeat Request, HARQ)-acknowledgment/negative acknowledgment (ACK/NACK) on a PDSCH, which is referred to as HARQ-ACK for short. For a HARQ-ACK on a PDSCH dynamically scheduled by DCI, a priority is indicated by adding a 1-bit (bit) priority indicator (priority indicator) field to the DCI. For a HARQ-ACK on an SPS-PDSCH, a 1-bit priority indicator parameter is added to SPS configuration information (briefly denoted as SPS Config) for indication.

It should be noted that the SPS PDSCH needs to be activated by using DCI. The activation DCI also includes a 1-bit priority indicator field, but the field automatically becomes invalid, that is, the priority indicated in the SPS configuration information is not changed.

(2) SR or BFR on a PUCCH: The scheduling request (scheduling request, SR) is used to request an uplink resource from a base station for uplink transmission, and a beam failure recovery (Beam Failure Recovery, BFR) is used to notify the base station that current beam quality deteriorates and trigger a beam recovery (or update and maintenance) process. A priority is indicated by adding a 1-bit priority indicator parameter to a radio resource control (radio resource control, RRC) parameter of a PUCCH resource corresponding to the SR/BFR.

(3) CSI on a PUCCH: Currently, CSI carried on a PUCCH includes periodic (Periodic, P)-CSI and semi-persistent (Semi-Persistent, SP)-CSI, which are both low-priority by default. If aperiodic (Aperiodic, A)-CSI on PUCCH is triggered by DCI, a priority of the A-CSI on PUCCH is indicated by a 1-bit priority indicator in the triggering DCI.

(4) Data (data) on a PUSCH: includes a case in which data and A-CSI are transmitted on the PUSCH together. (1) For a PUSCH dynamically scheduled by DCI, which is referred to as a GB (Grant-based)-PUSCH for short, a 1-bit priority indicator field is added to the scheduling DCI to indicate a priority. (2) For a CG-PUSCH, a 1-bit priority indicator parameter is added to CG configuration information to indicate a priority. It should be noted that the CG PUSCH is classified into two types: Type-1 CG PUSCH and Type-2 CG PUSCH. The former is completely configured and transmitted by using an RRC parameter, and the latter (that is, Type-2) needs to be activated by using DCI. The activation DCI also has a 1-bit priority indicator field, but the field automatically becomes invalid, that is, a priority indicated in CG configuration information is not changed.

(5) A PUSCH carries only SP-CSI or A-CSI: The PUSCH may carry only the SP-CSI. In this case, once activation is performed by using DCI, the SP-CSI is periodically sent. Alternatively, the PUSCH may carry A-CSI and does not carry data. In this case, once scheduling is performed by using DCI, the A-CSI is sent only once.

In the two cases, a priority is indicated by a 1-bit priority indicator in the DCI.

In embodiments of this application, when a physical channel carries information with only one priority, the priority of the information may also be understood as a priority of the physical channel, and the priority of the information and the priority of the physical channel carrying the information may be used interchangeably.

R16 Uplink Multiplexing Sequence:

Main principle: PUCCH/PUSCH overlapping in a same priority is first processed, and "high eliminating low" between different priorities is processed later. For example, it is assumed that there are three low-priority PUCCHs: PUCCH 1, PUCCH 2, and PUCCH 3. There are two high-priority PUCCHs: PUCCH 4 and PUCCH 5.

(1) That PUCCH overlapping in the same priority is first processed means that overlapping between PUCCH 1, PUCCH 2, and PUCCH 3 and overlapping between PUCCH 4 and PUCCH 5 are first processed. It is assumed that PUCCH 6 is obtained by processing PUCCH 1, PUCCH 2, and PUCCH 3. In addition, PUCCH 7 is obtained by processing PUCCH 4 and PUCCH 5.

(2) That "high priority eliminating low priority" is processed later means that whether PUCCH 6 overlaps PUCCH 4, PUCCH 5, or PUCCH 7 is determined. If PUCCH 6 overlaps any one of PUCCH 4, PUCCH 5, and PUCCH 7, sending of PUCCH 6 is cancelled.

Figure 5:
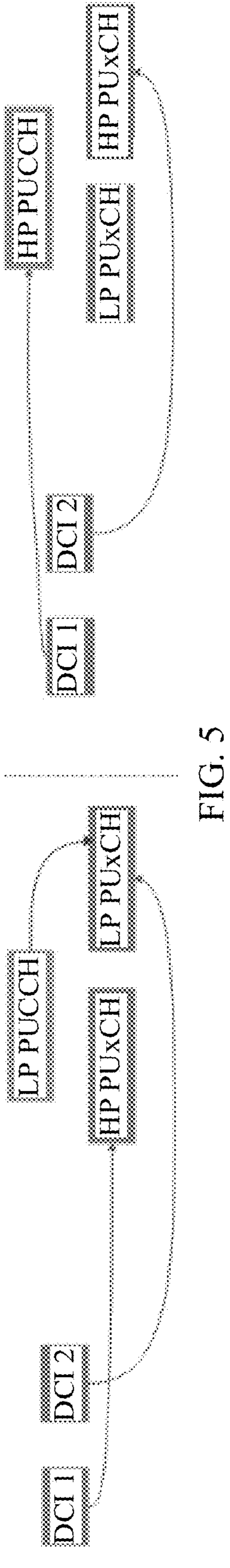
FIG. 5 is a schematic diagram of overlapping processing of a plurality of PU×CHs according to an embodiment of this application.

Special case: Considering that a UE side generally performs sequential processing, there may be two special cases shown in FIG. 5. FIG. 5 is a schematic diagram of overlapping processing of a plurality of PU×CHs according to an embodiment of this application. As shown in (a) in FIG. 5, an LP PUCCH is initially eliminated by an HP PUCCH/PUSCH scheduled by DCI 1. In this case, even if an LP PU×CH scheduled by DCI 2 appears subsequently, and in principle, the LP PUCCH can be multiplexed onto the LP PU×CH to avoid being eliminated by the HP PU×CH, multiplexing is not performed. Alternatively, as shown in (b) in FIG. 5, an LP PU×CH may be initially eliminated by an HP PUCCH scheduled by DCI 1. In this case, even if an HP PU×CH scheduled by DCI 2 appears subsequently, and in principle, the HP PUCCH can be multiplexed onto the HP PU×CH to avoid eliminating the LP PU×CH, multiplexing is not performed.

Multiplexing timeline timeline #2 in R16: Similar to the timeline rule in R15, "high priority eliminating low priority" supported in R16 also needs to meet a specific timeline condition. However, a difference lies in that the timeline described in R15 requires that two multiplexed uplink channels meet a specific relationship. However, for the timeline in R16, only a high-priority uplink channel needs to meet a requirement. The reason is that in the timeline described in R16, a low priority does not need to be considered, and only low-priority transmission needs to be cancelled, and high-priority transmission needs to be performed. Therefore, it is only necessary to specify that a high-priority uplink channel can be processed in a timely manner.

For a timeline relationship in R16, refer to FIG. 6. FIG. 6 is a schematic diagram of a multiplexing timeline relationship in R16 according to an embodiment of this application. As shown in FIG. 6, HP represents a high priority. A high-priority PUCCH/PUSCH needs to be after T symbols after the last symbol of a PDCCH corresponding to the high-priority PUCCH/PUSCH. In other words, a start symbol of the high-priority PUCCH or PUSCH needs to be after a position shown by point A in FIG. 6. T may be a specific value. For example, it is specified in the existing protocol that $T=T_{proc,2}+d_1$. $T_{proc,2}$ indicates preparation time of a PUSCH, and is specifically related to a subcarrier spacing, a processing capability, and the like. Details are not described herein. A specific value of d1 depends on reporting of a terminal device.

According to the foregoing description, it can be learned that existing uplink channel multiplexing in R15 and R16 has disadvantages. For the multiplexing rule in R15, multi-priority multiplexing and cross-priority multiplexing introduced in R16 are not considered. In R16, the multiplexing rule considers only "high eliminating low", but does not consider multiplexing transmission between a high priority and a low priority. As a result, sending of a low-priority uplink channel is directly cancelled, the low-priority uplink channel cannot be fully multiplexed, and sending efficiency of uplink control information and/or uplink data is reduced.

Based on this, first, an embodiment of this application provides a method for reporting a capability by a terminal. Refer to FIG. 7A. FIG. 7A is a flowchart of a method for reporting a capability by a terminal according to an embodiment of this application. As shown in FIG. 7A, the method includes the following steps.

In embodiments of this application, when a physical channel carries information with only one priority, the priority of the information may also be understood as a priority of the physical channel, and the priority of the information and the priority of the physical channel carrying the information may be used interchangeably.

R16 Uplink Multiplexing Sequence:

Overlapping uplink channels with a same priority are first processed, and overlapping uplink channels with different priorities are processed later. When overlapping uplink channels with different priorities are processed, a "high priority eliminating low priority" principle is followed, which may also be referred to as a "high eliminating low" principle for short. That is, an uplink channel with a higher priority is preferentially sent. The following describes the uplink multiplexing sequence in R16 in detail. For ease of description, an example in which there are three low-priority PUCCHs: PUCCH 1, PUCCH 2, and PUCCH 3, and there are two high-priority PUCCHs: PUCCH 4 and PUCCH 5, is used for description.

(1) That overlapping uplink channels with the same priority are first processed may be specifically: Overlapping between PUCCH 1, PUCCH 2, and PUCCH 3 and overlapping between PUCCH 4 and PUCCH 5 are first processed. It is assumed that PUCCH 6 is obtained by processing PUCCH 1, PUCCH 2, and PUCCH 3. In addition, PUCCH 7 is obtained by processing PUCCH 4 and PUCCH 5. That is, PUCCH 6 and PUCCH 7 are first obtained.

(2) That overlapping uplink channels with different priorities are processed later may be specifically: Whether PUCCH 6 overlaps PUCCH 4, PUCCH 5, or PUCCH 7 is determined.

(3) Following the "high eliminating low" principle may be specifically: If PUCCH 6 overlaps any one of PUCCH 4, PUCCH 5, and PUCCH 7, sending of PUCCH 6 is cancelled.

Because an uplink channel may be a PUCCH, or may be a PUSCH, the following uses PU×CH to represent two types of uplink channels: PUCCH and PUSCH. LP is short for low priority and HP is short for high priority.

Special case: Considering that a UE side generally performs sequential processing, when the processing principles in (1) to (3) conflict, the "high eliminating low" processing manner is preferentially used. FIG. 5 is a schematic diagram of overlapping processing of a plurality of PU×CHs according to an embodiment of this application. As shown in (a) in FIG. 5, an LP PUCCH is initially eliminated by an HP PU×CH scheduled by DCI 1. In this case, even if an LP PU×CH scheduled by DCI 2 appears subsequently, and there is the principle of first processing overlapping uplink channels with a same priority, because the HP PU×CH is earlier, and the LP PUCCH is first eliminated according to the "high eliminating low" principle, the LP PUCCH and the LP PU×CH scheduled by DCI 2 are not multiplexed. Alternatively, as shown in (b) in FIG. 5, an LP PU×CH may be initially eliminated by an HP PUCCH scheduled by DCI 1. In this case, even if an HP PU×CH scheduled by DCI 2 appears subsequently, and there is the principle of first processing overlapping uplink channels with a same priority, that is, the HP PUCCH can be multiplexed onto the HP PU×CH to avoid eliminating the LP PU×CH, because the "high eliminating low" principle is followed, the HP PUCCH and the HP PU×CH are not multiplexed.

Multiplexing timeline timeline #2 in R16: Similar to the timeline rule in R15, "high priority eliminating low priority" supported in R16 also needs to meet a specific timeline condition. However, a difference lies in that the timeline described in R15 requires that two multiplexed uplink channels meet a specific relationship. However, for the timeline in R16, only a high-priority uplink channel needs to meet a requirement. The reason is that in the timeline described in R16, a low priority does not need to be considered, and only low-priority transmission needs to be cancelled, and high-priority transmission needs to be performed. Therefore, it is only necessary to specify that a high-priority uplink channel can be processed in a timely manner.

For a timeline relationship in R16, refer to FIG. 6. FIG. 6 is a schematic diagram of a multiplexing timeline relationship in R16 according to an embodiment of this application. As shown in FIG. 6, HP represents a high priority. A high-priority PUCCH/PUSCH needs to be after T symbols after the last symbol of a PDCCH corresponding to the high-priority PUCCH/PUSCH. In other words, a start symbol of the high-priority PUCCH or PUSCH needs to be after a position shown by point A in FIG. 6. T may be a specific value. For example, it is specified in the existing protocol that $T=T_{proc,2}+d_1$. $T_{proc,2}$ indicates preparation time of a PUSCH, and is specifically related to a subcarrier spacing, a processing capability, and the like. Details are not described herein. A specific value of d1 depends on reporting of a terminal device.

According to the foregoing description, it can be learned that existing uplink channel multiplexing in R15 and R16 has disadvantages. For the multiplexing rule in R15, multi-priority multiplexing and cross-priority multiplexing introduced in R16 are not considered. In R16, the multiplexing rule considers only "high eliminating low", but does not consider multiplexing transmission between a high priority and a low priority. As a result, sending of a low-priority uplink channel is directly cancelled, the low-priority uplink channel cannot be fully multiplexed, and sending efficiency of uplink control information and/or uplink data is reduced.

Based on this, first, an embodiment of this application provides a method for reporting, by a terminal, a processing capability supported when uplink channels overlap. Refer to FIG. 7A. FIG. 7A is a flowchart of a method for reporting a capability by a terminal according to an embodiment of this application. The method includes the following steps.

201: A terminal device determines target capability information, where the target capability information includes at least one type of capability information in a first capability information set, and the first capability information set includes at least one type of the following capability information: first capability information, second capability information, and third capability information.

In this embodiment of this application, the terminal device may determine the target capability information that can be supported by the terminal device. The target capability information may be at least one type of information in the first capability information set.

(1) First capability information: The first capability information indicates that the terminal device can perform multiplexing between overlapping uplink channels with a same priority. For multiplexing between the overlapping uplink channels with the same priority, in an optional manner, a multiplexing process corresponding to the first capability information is the foregoing described multiplexing process in R15. In another optional manner, the first capability information indicates that the terminal device can perform multiplexing between overlapping uplink channels with a same priority, does not support cancelling sending of one of the uplink channels and retaining the other uplink channel, and does not support multiplexing between overlapping uplink channels with different priorities. In another optional manner, the first capability information indicates that the terminal device can perform multiplexing between overlapping uplink channels with a same priority, and does not support transmission of uplink channels with different priorities. When the first capability information indicates that the terminal device can perform multiplexing between overlapping uplink channels with a same priority, the same priority has different interpretation manners. In an optional interpretation manner, all uplink channels are low-priority uplink channels or all uplink channels are high-priority uplink channels. In another optional interpretation manner, there is no concept of priorities for uplink channels, and the terminal device does not distinguish between priorities for uplink channels. Alternatively, when scheduling uplink transmission, a network device does not indicate a priority of an uplink channel, or does not distinguish between priorities for uplink channels. For the case that transmission of uplink channels with different priorities is not supported, in an optional interpretation manner, the terminal device does not support the network device in configuring transmission of uplink channels with different priorities. In this case, when scheduling uplink transmission, the network device does not distinguish between priorities for all uplink transmission.

(2) Second capability information: The second capability information indicates that for overlapping uplink channels with different priorities, the terminal device can cancel sending of one of the uplink channels and retain the other uplink channel. When uplink channels with different priorities overlap, sending of one of the uplink channels may be cancelled, and the other uplink channel may be retained. In an optional manner, a processing process corresponding to the second capability information is that sending for a high priority is preferential. For preferential sending for the high priority, refer to the foregoing "high eliminating low" process in R16. Details are not described herein again. In another optional manner, the second capability information indicates that for overlapping uplink channels with different priorities, the terminal device can cancel sending of one of the uplink channels and retain the other uplink channel, and does not support multiplexing when the uplink channels with different priorities overlap.

(3) Third capability information: The third capability information indicates that the terminal device can perform multiplexing between overlapping uplink channels with different priorities. In an optional manner, the third capability information indicates that the terminal device can perform multiplexing between overlapping uplink channels with different priorities, and for the overlapping uplink channels with different priorities, the terminal device does not support cancelling sending of one of the uplink channels and retaining the other uplink channel. Optionally, when uplink channels with different priorities overlap, a processing process corresponding to the third capability information may include the following manners.

Manner 1: When uplink channels with different priorities overlap, if a multiplexing condition is met, the terminal device may multiplex the uplink channels. Optionally, meeting the multiplexing condition may be meeting a condition of the multiplexing timeline timeline #1 described in R15, or may be meeting a condition of another multiplexing timeline. The multiplexing condition is not specifically limited in this application. Optionally, the multiplexing condition may be understood as a condition for multiplexing for different priorities; or the multiplexing condition may be a condition for multiplexing for a same priority.

Manner 2: When uplink channels with different priorities overlap, if a multiplexing condition is not met, but a condition for cancelling one of the uplink channels and retaining the other uplink channel is met, the terminal device may cancel sending of one of the uplink channels and retain the other uplink channel.

When the terminal device supports both Manner 1 and Manner 2, if overlapping uplink channels with different priorities are first multiplexed, and then a multiplexed uplink channel and another overlapping uplink channel meet a condition for cancelling one of the uplink channels and retaining the other uplink channel, overlapping processing may be performed by using a corresponding rule. However, because the multiplexed uplink channel generated by multiplexing the overlapping uplink channels with different priorities may have a "hybrid priority" (that is, include both a high-priority uplink channel and a low-priority uplink channel), the overlapping processing manner for the multiplexed uplink channel and the overlapping uplink channel (which may be an overlapping uplink channel with a low priority or a high priority) cannot completely refer to the foregoing "high eliminating low" rule in R16. Based on this, this application provides an optional solution. For details, refer to the following content. Alternatively, in an optional manner, when uplink channels with different priorities overlap, neither a multiplexing condition is met, nor a condition for sending one of the uplink channels and retaining the other uplink channel is met. The terminal device does not expect this case to occur, that is, the network device does not schedule the uplink channel in this manner.

202: The terminal device reports the target capability information to the network device.

After determining the target capability information, the terminal device may report the target capability information to the network device. The target capability information reported by the terminal device may include only the first capability information, indicating that the terminal device supports only multiplexing between overlapping uplink channels with a same priority. The target capability information reported by the terminal device is {first capability information, third capability information}, indicating that the terminal device supports multiplexing between overlapping uplink channels with a same priority and multiplexing between overlapping uplink channels with different priorities.

Optionally, the first capability information may be supported by the terminal device by default. In an optional manner, it may be understood that the target capability information definitely includes the first capability information. Based on this, the target capability information may further include other capability information in the first capability information set. In another optional manner, the target capability information does not need to include the first capability information, and it is pre-specified in a protocol that the terminal device and the network device need to support a processing capability corresponding to the first capability information. In this case, the first capability information set does not need to include the first capability information, and the target capability information is one or more types of capability information in the first capability information set other than the first capability information. For example, the target capability information reported by the terminal device is the second capability information. In this case, the terminal device supports both a processing capability corresponding to the first capability information and a processing capability corresponding to the second capability information.

Optionally, the terminal device reports one of a plurality of types of capability information, and the terminal device does not support simultaneous reporting of a plurality of pieces of capability information. Further, optionally, the terminal device reports one of the second capability information and the third capability information, and the terminal device does not support simultaneous reporting of the second capability information and the third capability information.

Optionally, the network device may perform communication transmission with the terminal device based on the target capability information reported by the terminal device.

Optionally, when the terminal device supports a plurality of types of capability information, there is a priority difference between the capability information in the first capability information set. The terminal device and the network device preferentially use capability information with a higher priority as a processing capability when uplink channels overlap. For example, the terminal device supports the second capability information and the third capability information, and a priority of the third capability information is higher than that of the second capability information. The terminal device preferentially performs a processing manner corresponding to the third capability information when uplink channels overlap. In other words, the terminal device preferentially performs multiplexing between a high priority and a low priority. Only when multiplexing cannot be performed between a high priority and a low priority, the terminal device performs a function of "cancelling sending of one uplink channel and retaining the other uplink channel".

Optionally, when the target capability information includes at least two types of capability information in the first capability information set, the method in this embodiment of this application may further include the following step.

203: Receive first indication information sent by the network device, where the first indication information indicates first target capability information in the target capability information, and the first target capability information is one of at least two types of capability information included in the target capability information.

When the target capability information reported by the terminal device to the network device is at least two types of capability information in the first capability information set, the network device may indicate the terminal device to perform communication transmission based on only one type of capability information. Alternatively, when the terminal device supports a plurality of types of capabilities for processing uplink channel overlapping, and reports at least two types of capability information in the plurality of types of supported capability information to the network device as the target capability information, the network device may indicate, to the terminal device by using the first indication information, capability information that can be specifically used by the terminal device. In this way, the network device and the terminal device can align processing manners when uplink channels overlap, to avoid a communication exception.

For example, the target capability information reported by the terminal device is the second capability information and the third capability information, that is, the target capability information is the second capability information and the third capability information. After receiving the target capability information, the network device selects, based on a communication status, an uplink channel overlapping processing manner corresponding to the third capability information, to communicate with the terminal device, and the network device sends the first indication information to the terminal device. In this case, the first indication information indicates the third capability information. The terminal device receives the first indication information, and learns that the network device expects to perform communication transmission in the uplink channel overlapping processing manner corresponding to the third capability information.

In this embodiment of this application, the terminal device reports the target capability information to the network device, so that the network device communicates with the terminal device based on the capability information of the terminal device. This avoids a problem that a communication exception is caused when a communication manner actually scheduled by the network device does not match a capability of the terminal device. Therefore, flexibility and diversity of overlapping uplink channel processing are improved, and then uplink channel transmission efficiency is improved.

Based on multiplexing between overlapping uplink channels with different priorities in the foregoing embodiment, this application provides the following several optional manners for multiplexing between overlapping uplink channels.

(1) Multiplexing Between a Low-Priority Uplink Channel and a High-Priority Uplink Channel Uplink channels are classified into a PUCCH and a PUSCH. Overlapping between a low-priority uplink channel and a high-priority uplink channel includes the following cases: A low-priority PUCCH overlaps a high-priority PUCCH, a low-priority PUSCH overlaps a high-priority PUCCH, a low-priority PUSCH overlaps a high-priority PUSCH, and a low-priority PUCCH overlaps a high-priority PUSCH. When the multiplexing condition is met, for different situations of overlapping uplink channels, corresponding processing rules are as follows:

Case A: Multiplexing Between a Low-Priority PUCCH and a High-Priority PUCCH

Figure 7B:
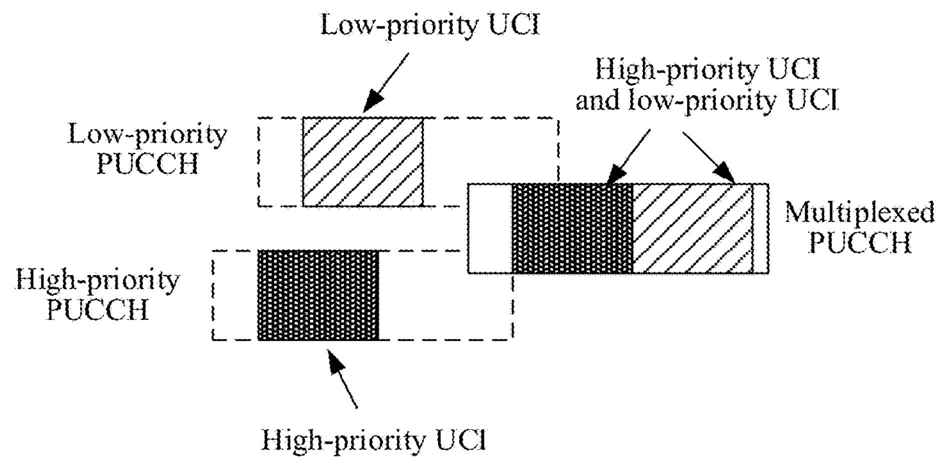
FIG. 7B is a schematic diagram of multiplexing uplink channels with different priorities according to an embodiment of this application.

The low-priority PUCCH carries low-priority UCI, and the high-priority PUCCH carries high-priority UCI. As shown in FIG. 7B, after the low-priority PUCCH and the high-priority PUCCH are multiplexed, a generated multiplexed PUCCH includes the high-priority UCI and the low-priority UCI. A time-frequency resource occupied by the multiplexed PUCCH may be a time-frequency resource originally occupied by the low-priority PUCCH or the high-priority PUCCH, or may be another time-frequency resource different from the time-frequency resource occupied by the low-priority PUCCH or the high-priority PUCCH. Optionally, whether the low-priority PUCCH and the high-priority PUCCH can be multiplexed further needs to be determined with reference to the multiplexing condition. The low-priority PUCCH and the high-priority PUCCH are multiplexed only when the multiplexing condition is met.

Case B: Multiplexing Between a Low-Priority PUSCH and a High-Priority PUCCH

The low-priority PUSCH carries low-priority data, and the high-priority PUCCH carries high-priority UCI. Similar to the foregoing multiplexing between the low-priority PUCCH and the high-priority PUCCH, after the low-priority PUSCH and the high-priority PUCCH are multiplexed, a generated multiplexed uplink channel includes the low-priority data and the high-priority UCI. In addition, the multiplexed uplink channel is a PUSCH. It may be understood that the multiplexed uplink channel PUSCH may be the PUSCH channel before multiplexing, or may be a new PUSCH channel. This is not limited in this application.

Optionally, before the low-priority uplink channel is multiplexed with the overlapping high-priority PUCCH, it may be first determined whether the low-priority uplink channel further overlaps another low-priority uplink channel. If the low-priority uplink channel further overlaps another low-priority uplink channel, multiplexing between the low-priority uplink channel and the another low-priority uplink channel may be first processed.

Case C: Multiplexing Between a Low-Priority PUSCH and a High-Priority PUSCH

The low-priority PUSCH carries low-priority data, and the high-priority PUSCH carries high-priority data. After the low-priority PUSCH and the high-priority PUSCH are multiplexed, a generated multiplexed PUSCH includes the low-priority data and the high-priority data. It may be understood that the multiplexed uplink channel PUSCH may be the PUSCH channel before multiplexing, for example, the high-priority PUSCH channel, or may be a new PUSCH channel. This is not limited in this application.

Case D: Multiplexing Between a Low-Priority PUCCH and a High-Priority PUSCH

The low-priority PUCCH carries low-priority UCI, and the high-priority PUSCH carries high-priority data. After the low-priority PUCCH and the high-priority PUSCH are multiplexed, a generated multiplexed uplink channel includes the low-priority UCI and the high-priority data. In addition, the multiplexed uplink channel is a PUSCH. It may be understood that the multiplexed uplink channel PUSCH may be the PUSCH channel before multiplexing, or may be a new PUSCH channel. This is not limited in this application.

Optionally, before the low-priority uplink channel is multiplexed with the high-priority PUSCH, it may be first determined whether the low-priority uplink channel further overlaps another low-priority uplink channel. If the low-priority uplink channel further overlaps another low-priority uplink channel, multiplexing between the low-priority uplink channel and the another low-priority uplink channel may be first processed.

Optionally, before the low-priority uplink channel is multiplexed with the high-priority PUSCH, it may be first determined whether the low-priority uplink channel further overlaps another PUCCH. If the low-priority uplink channel further overlaps another PUCCH, processing of overlapping between the low-priority uplink channel and the PUCCH is first performed.

Optionally, before the low-priority uplink channel and the high-priority PUSCH are multiplexed, it may be first determined whether the low-priority uplink channel further overlaps another high-priority PUCCH. If the low-priority uplink channel further overlaps another high-priority PUCCH, processing of overlapping between the low-priority uplink channel and the high-priority PUCCH is first performed.

The foregoing listed multiplexing methods may coexist, or may exist independently. To be specific, the terminal device may perform only one of the multiplexing methods, or may support a plurality of multiplexing methods, or may support a combination solution of a plurality of methods. This is not limited in embodiments of this application.

A multiplexed uplink channel generated after a low-priority uplink channel and a high-priority uplink channel are multiplexed may be referred to as a high-priority uplink channel because high-priority UCI and/or data are/is included, but may also be referred to as a "hybrid-priority" uplink channel because low-priority UCI and/or data are/is also included. In embodiments of this application, such an uplink channel is described by using "hybrid priority". However, it should be known that the uplink channel may also be referred to as a high-priority uplink channel.

(2) a "Hybrid-Priority" Uplink Channel May Overlap Another Uplink Channel. When a "Hybrid-Priority" Uplink Channel Overlaps Another Uplink Channel, a Processing Manner for Multiplexing Between the "Hybrid-Priority" Uplink Channel and the Another Uplink Channel is as Follows:

When the "hybrid-priority" uplink channel overlaps another low-priority uplink channel, multiplexing can be directly performed. In this case, it may be considered that the "hybrid-priority" uplink channel is a low-priority uplink channel. Alternatively, when the "hybrid-priority" uplink channel overlaps a low-priority uplink channel, the "hybrid-priority" uplink channel may be used as a high-priority uplink channel, and one or more of the foregoing manners for "multiplexing between a low-priority uplink channel and a high-priority uplink channel" are used to multiplex the "hybrid-priority" uplink channel and the low-priority uplink channel.

"Eliminating one and retaining one" for a "hybrid-priority" uplink channel and another uplink channel is as follows:

Manner F: "eliminating one and retaining one" for a "hybrid-priority" uplink channel and a low-priority uplink channel Specifically, there may be the following several cases.

a. Sending of the "hybrid-priority" uplink channel overlaps sending of the low-priority uplink channel. Because the "hybrid-priority" uplink channel includes high-priority UCI and/or data, sending of the low-priority uplink channel may be cancelled, and the "hybrid-priority" uplink channel is retained.

b. Sending of the "hybrid-priority" uplink channel is cancelled, and the low-priority uplink channel is retained. Because the network device wants to invoke the low-priority uplink channel at a time-frequency position for sending the "hybrid-priority" uplink channel, it may be considered to preferentially ensure sending of the low-priority uplink channel.

Alternatively, the "hybrid-priority" uplink channel continuously overlaps a low-priority uplink channel, and may not be very important. Sending of a low-priority uplink channel normally invoked by the network device may be preferentially considered.

c. Sending of an uplink channel with later sending time in the "hybrid-priority" uplink channel and the low-priority uplink channel may be cancelled, and an uplink channel with earlier sending time is retained. That the sending time is later may be that the 1st symbol is later, or may be that the last symbol is later.

Manner G: "eliminating one and retaining one" for a "hybrid-priority" uplink channel and a high-priority uplink channel a. Sending of the "hybrid-priority" uplink channel is cancelled, and the high-priority uplink channel is retained. Sending of the high-priority uplink channel overlaps sending of the "hybrid priority" uplink channel. A time-frequency position for sending the "hybrid-priority" uplink channel is determined after multiplexing, and the network device originally wants to invoke the high-priority uplink channel at this time-frequency position. In this case, the high-priority uplink channel may carry more important information. Therefore, the high-priority uplink channel may be retained, and sending of the "hybrid-priority" uplink channel may be cancelled.

b. Sending of the high-priority uplink channel is cancelled, and sending of the "hybrid-priority" uplink channel is retained. Because information on the "hybrid-priority" uplink channel is an uplink channel obtained by multiplexing information of a plurality of uplink channels, and may carry more important information than a single high-priority uplink channel, the multiplexed uplink channel may be retained, and sending of the high-priority uplink channel may be cancelled.

c. Sending of an uplink channel with later sending time in the "hybrid-priority" uplink channel and the high-priority uplink channel is cancelled, and an uplink channel with earlier sending time is retained. That the sending time is later may be that the $1^{st}$ symbol is later, or may be that the last symbol is later.

The foregoing two processing manners may be used for a case in which the uplink channel is any type of uplink channel.

Alternatively, for different types of uplink channels, different "eliminating one and retaining one" manners may be used.

d. The high-priority uplink channel is a PUCCH.

In this case, the "hybrid-priority" uplink channel may be a PUCCH or a PUSCH.

Figure 7C:
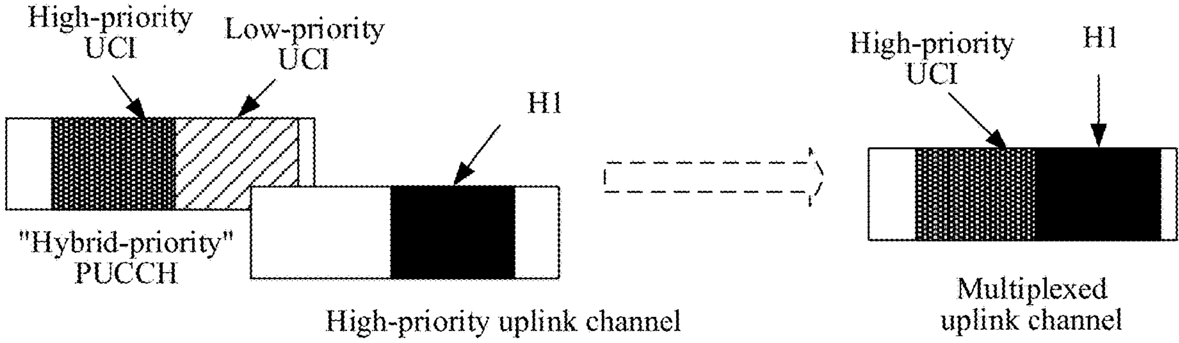
FIG. 7C is a schematic diagram of an overlapping uplink channel processing process according to an embodiment of this application.

When the "hybrid-priority" uplink channel is a PUCCH, the "hybrid-priority" uplink channel may include high-priority UCI and low-priority UCI. Sending of low-priority UCI on the "hybrid-priority" uplink channel may be cancelled, and the high-priority UCI on the "hybrid-priority" uplink channel is multiplexed with a high-priority PUCCH, to obtain a multiplexed uplink channel. Specifically, refer to FIG. 7C. FIG. 7C is a schematic diagram of an overlapping uplink channel processing process according to an embodiment of this application. As shown in FIG. 7C, a "hybrid-priority" PUCCH includes high-priority UCI and low-priority UCI. When the "hybrid-priority" PUCCH overlaps a high-priority uplink channel, the low-priority UCI may be cancelled, and then the high-priority UCI and information H1 carried on the high-priority uplink channel are multiplexed. H1 may be high-priority UCI or may be high-priority uplink data. A multiplexed uplink channel obtained by multiplexing the high-priority UCI and the information H1 includes only high-priority UCI and high-priority data, and is a high-priority uplink channel, which carries the high-priority UCI on the multiplexed PUCCH and H1 on the high-priority uplink channel.

Optionally, before "eliminating one and retaining one" is performed for the "hybrid-priority" uplink channel and the high-priority uplink channel, it may be determined whether the two uplink channels meet a second multiplexing condition (that the two uplink channels meet the multiplexing condition above may be referred to as not meeting a first multiplexing condition or not meeting a first multiplexing timeline). The second multiplexing condition may be a second multiplexing timeline, which indicates that after sending of the low-priority UCI on the "hybrid-priority" uplink channel is cancelled, the high-priority UCI on the "hybrid-priority" uplink channel may be multiplexed with the high-priority uplink channel. In an understandable manner, if there is enough time for multiplexing the high-priority UCI and the high-priority uplink channel, the high-priority UCI and the high-priority uplink channel may be multiplexed. The second multiplexing timeline and the first multiplexing timeline may be different values.

Optionally, the second multiplexing timeline timeline #3 is greater than or equal to the first multiplexing timeline, and the first multiplexing timeline may be, for example, the foregoing timeline #2. Further, optionally, for timeline #3, T3=T2+D. T2 is a parameter of timeline #2 (specifically related to a subcarrier spacing and a capability of the terminal device, where for details, refer to the foregoing descriptions). D may be predefined in a protocol for different scenarios, or may be reported by the terminal device to the network device, or may be related to the subcarrier spacing and the capability of the terminal device. For example, D=0, 1, or 2.

Alternatively, when the "hybrid-priority" uplink channel is a PUCCH, an uplink channel that carries UCI information with a lower priority in the "hybrid-priority" uplink channel and the high-priority uplink channel may be cancelled. UCI carried on the "hybrid-priority" uplink channel is high-priority UCI. UCI information carried on high-priority UCI on the "hybrid-priority" uplink channel is compared with high-priority UCI information. The UCI information includes an ACK, CSI, an SR, and the like, where a priority relationship is ACK>CSI>SR. UCI information indicated by ">" has a higher priority.

When the "hybrid-priority" uplink channel is a PUSCH, the "hybrid-priority" uplink channel includes both UCI and uplink data. Sending of a high-priority PUCCH may be cancelled, and the "hybrid-priority" uplink channel is retained.

e. The high-priority uplink channel is a PUSCH.

Sending of the "hybrid-priority" uplink channel may be cancelled, and the high-priority PUSCH is retained.

In some cases, it is assumed that the "hybrid-priority" uplink channel is obtained by multiplexing a PUCCH and a PUSCH. When the high-priority uplink channel is a PUSCH, sending of the "hybrid-priority" uplink channel is cancelled.

The foregoing enumerated methods for processing overlapping between a "hybrid-priority" uplink channel and another channel may coexist, or may exist independently. To be specific, the terminal device may perform only one of the overlapping processing methods, or may simultaneously support a plurality of overlapping processing methods, or may support a combination solution of a plurality of methods. This is not limited in embodiments of this application.

Similarly, the foregoing method for processing overlapping between a high-priority uplink channel and a low-priority uplink channel and the method for processing overlapping between a "hybrid-priority" uplink channel and another channel may coexist, or may exist independently. This is not limited in embodiments of this application.

In addition, when the foregoing overlap processing method is performed, corresponding condition determining may be further performed.

Optionally, before the high-priority uplink channel and the low-priority uplink channel are multiplexed, it needs to be determined that the two uplink channels meet a multiplexing condition.

Optionally, before the "hybrid-priority" uplink channel and another uplink channel are multiplexed, it needs to be determined that the two uplink channels meet a multiplexing condition.

Optionally, before "eliminating one and retaining one" is performed for the "hybrid-priority" uplink channel and another uplink channel, it needs to be determined that the two uplink channels meet a condition for cancelling sending of one uplink channel and retaining the other uplink channel.

Optionally, before "eliminating one and retaining one" is performed for the "hybrid-priority" uplink channel and another uplink channel, it may be first determined that the "hybrid-priority" uplink channel and the another uplink channel do not meet a multiplexing condition.

In a possible case, multiplexing between the high-priority uplink channel and the low-priority uplink channel, multiplexing between the "hybrid-priority" uplink channel and another uplink channel, and "eliminating one and retaining one" for the "hybrid-priority" uplink channel and another uplink channel may be partially or all used as the third capability information described in the foregoing embodiment. This is not specifically limited in embodiments of this application.

Figure 8A:
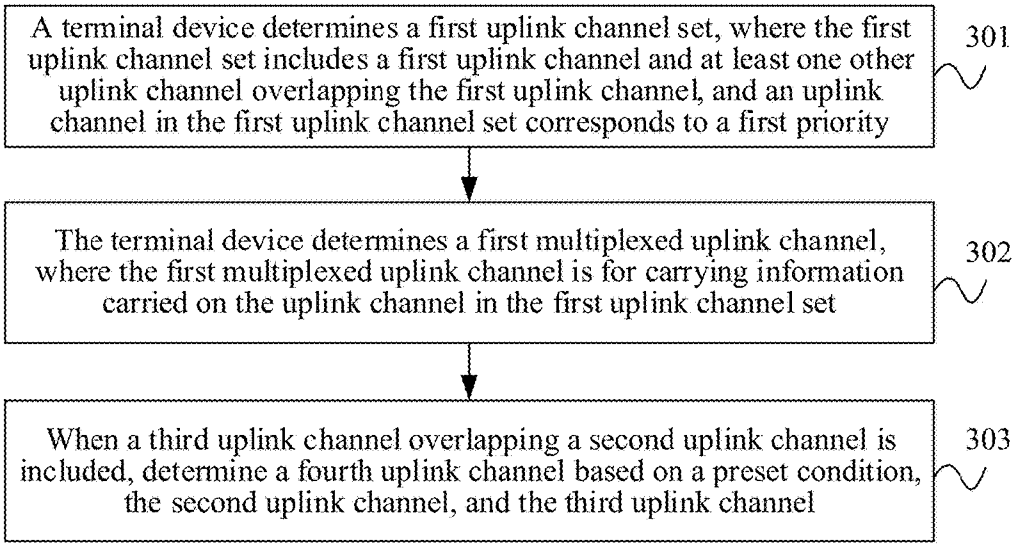
FIG. 8A is a flowchart of a channel processing method according to an embodiment of this application.

The foregoing process describes the multiplexing rule and the "eliminating one and retaining one" rule between uplink channels with different priorities in embodiments of this application. In an actual processing process, different processing sequences may be used. Refer to FIG. 8A. FIG. 8A is a flowchart of a channel processing method according to an embodiment of this application. As shown in FIG. 8A, the method includes the following steps.

301: A terminal device determines a first uplink channel set, where the first uplink channel set includes a first uplink channel and at least one other uplink channel overlapping the first uplink channel, and an uplink channel in the first uplink channel set corresponds to a first priority.

In this embodiment of this application, the first priority and a second priority are used to describe two uplink channels with different priorities. The second priority is higher than the first priority. Therefore, in the following description, a low priority represents the first priority, and a high priority represents the second priority. Therefore, the two description manners may be universal.

In this embodiment of this application, it is assumed that a plurality of overlapping uplink channels are included, and a first-priority (low-priority) uplink channel is first processed. Specifically, overlapping low-priority uplink channels may be grouped into one set, and the low-priority uplink channels in the set are multiplexed. Optionally, uplink channels in the first uplink channel set may be all PUCCHs, or all PUSCHs, or may be a set including a PUCCH and a PUSCH.

Figure 8B:
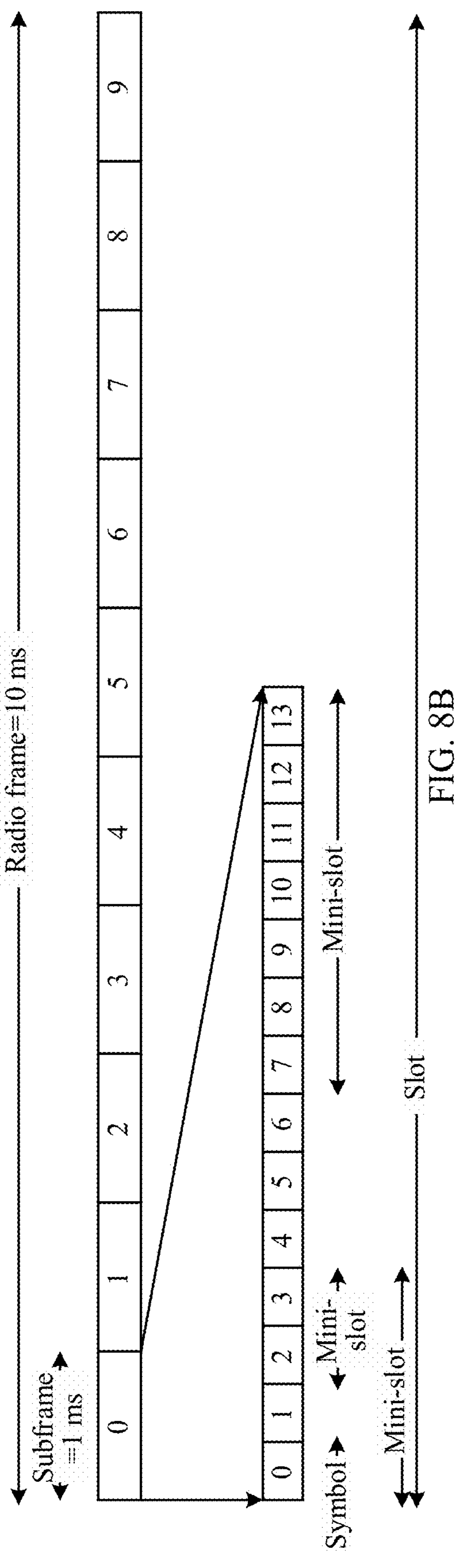
FIG. 8B is a schematic diagram of a time unit according to an embodiment of this application.

A manner for obtaining the first uplink channel set may be: obtaining the first uplink channel from a plurality of low-priority uplink channels in one time unit. The time unit is a time domain unit used for signal transmission, and may include a time domain unit such as a radio frame (radio frame), a subframe (subframe), a slot (slot), a mini-slot (mini-slot), or at least one orthogonal frequency division multiplexing (orthogonal frequency division multiplexing, OFDM) uplink symbol. OFDM may also be referred to as a symbol for short. FIG. 8B is a schematic diagram of a possible time unit relationship according to this application. As shown in FIG. 8B, a time domain length of one radio frame is 10 ms, one radio frame may include 10 radio subframes, and a time domain length of one radio subframe is 1 ms. One radio subframe may include one or more slots. Specifically, a quantity of slots included in one subframe is related to a subcarrier spacing (Subcarrier Space, SCS). In a case in which an SCS is 15 kHz, a time domain length of one slot is 1 ms, and one slot includes 14 symbols.

It should be understood that the foregoing example of the time unit relationship in FIG. 8B is merely an example for description, and should not constitute any limitation on this application.

A plurality of low-priority uplink channels in one time unit may form a target uplink channel set. The first uplink channel may be an uplink channel that is earliest in time domain in the target uplink channel set, and/or a channel that occupies a largest quantity of time domain resources in the target uplink channel set. "Earliest in time domain" means, for example, "in an earliest slot", or "in an earliest OFDM symbol". Similarly, occupying the largest quantity of time domain resources may be that the uplink channel spans a longest slot, occupies a largest quantity of OFDM symbols, or the like. Then, the first uplink channel is used as a reference to determine uplink channel a, uplink channel b, . . . , and uplink channel n that are in the plurality of uplink channels and that overlap the first uplink channel, to form the first uplink channel set. It may be understood that the first uplink channel set is a subset of the target uplink channel set. Optionally, the target uplink channel set may be divided into a plurality of first uplink channel sets, and a first uplink channel in the 2$^{nd}$ first uplink channel set may be an uplink channel that is earliest in time domain in remaining low-priority uplink channels that are not divided into the set, or a channel that occupies a largest quantity of time domain resources in the plurality of uplink channels. This process is repeated, until all low-priority uplink channels are grouped into the set. Alternatively, there may be low-priority uplink channels that are not grouped into the first uplink channel set, that is, these low-priority uplink channels temporarily do not overlap any low-priority uplink channel. However, these uplink channels may overlap a multiplexed uplink channel obtained after multiplexing is completed in another set. Therefore, these low-priority uplink channels may be reserved for subsequent processing.

Optionally, after the 1$^{st}$ first uplink channel is determined and the first uplink channel set is obtained through division, the first uplink channel set is first processed, to obtain a first multiplexed uplink channel. Then, the first multiplexed uplink channel and a remaining target uplink channel set form a new target uplink channel set. Then, a new first uplink channel is selected. A selection manner may be the foregoing described manner, or may be another manner. Then, a new first uplink channel set is formed based on the new first uplink channel, and processing is performed on the set. In this process, the first uplink channel set is a subset iteratively selected from the target uplink channel set.

302: The terminal device determines a second uplink channel, where the second uplink channel is for carrying some or all information carried on the uplink channel in the first channel set.

The second uplink channel may be: (1) for carrying some information carried on the uplink channel in the first channel set; or (2) for carrying all information carried on the uplink channel in the first channel set.

For the first case, the second uplink channel may carry information on a specific uplink channel in the first uplink channel set. Alternatively, the second uplink channel is for carrying information on an intermediate uplink channel obtained by multiplexing the uplink channel in the first uplink channel set. In other words, in this case, partial multiplexing is performed, and multiplexing of all channels in the set is not completed.

For the second case, the second uplink channel is for carrying information on the first multiplexed uplink channel, and the first multiplexed uplink channel is obtained by multiplexing all uplink channels in the first uplink channel set.

After a low-priority uplink channel is grouped into the first uplink channel set, the uplink channel in the first uplink channel set may be multiplexed, to obtain the first multiplexed uplink channel. The first multiplexed uplink channel carries information carried on all the uplink channels in the first uplink channel set. Optionally, each first uplink channel set corresponds to one first multiplexed uplink channel. First multiplexed uplink channels may further overlap, or first multiplexed uplink channels may overlap a low-priority uplink channel that is not grouped into the set, and may continue to be multiplexed to obtain a multiplexed uplink channel, so that the multiplexed uplink channel does not overlap any low-priority uplink channel.

Optionally, the first uplink channel set may be a subset iteratively selected from the target uplink channel set. To be specific, channel multiplexing is performed based on a first uplink channel selected for the first time and a first uplink channel set obtained by using the first uplink channel as a reference, an obtained first multiplexed uplink channel and a remaining uplink channel in the target uplink channel set form a new target uplink channel set, and then a first uplink channel is selected from the new target uplink channel set and is grouped into a first uplink channel set for multiplexing. In this case, one or more first multiplexed uplink channels are finally obtained after iteration processing is completed for all overlapping low-priority uplink channels.

303: When a third uplink channel overlapping a second uplink channel is included, determine a fourth uplink channel, where the fourth uplink channel is for carrying information carried on the second uplink channel and the third uplink channel, or the fourth uplink channel is for carrying some information carried on the second uplink channel and the third uplink channel; the second uplink channel is at least one of the following: the first multiplexed uplink channel, at least one other uplink channel in the first uplink channel set, and an intermediate uplink channel that carries information on some uplink channels in the first uplink channel set; and the third uplink channel corresponds to the second priority, and the second priority is higher than the first priority.

The second uplink channel may be the first multiplexed uplink channel, the at least one other uplink channel in the first uplink channel set, or the intermediate uplink channel that carries the information carried on some uplink channels in the first uplink channel set. When the second uplink channel is the first multiplexed uplink channel, that is, after the first multiplexed uplink channel is obtained by multiplexing a low-priority uplink channel, a high-priority (second-priority) uplink channel (the third uplink channel) may overlap the first multiplexed uplink channel. In this case, the first multiplexed uplink channel and the third uplink channel need to be processed.

When the second uplink channel is the at least one other uplink channel in the first uplink channel set, it indicates that before the at least one other uplink channel is multiplexed with the first uplink channel, a time-frequency position of the at least one other uplink channel may overlap the high-priority third uplink channel, and the high-priority uplink channel (the third uplink channel) is to be sent. In this case, an overlapping problem between the second uplink channel and the third uplink channel may be first processed.

When the second uplink channel is an intermediate uplink channel generated by multiplexing the first uplink channel in the first uplink channel set and some of other uplink channels, it indicates that some uplink channels in the first uplink channel set have been multiplexed, and multiplexing has not been completely finished. In this case, a high-priority uplink channel (the third uplink channel) is to be sent (or is being sent) and overlaps sending of the intermediate uplink channel. Then, overlapping processing between the intermediate uplink channel and the third uplink channel is first performed.

In this embodiment of this application, because a timeline relationship between two overlapping uplink channels is not determined, the timeline relationship between the two uplink channels needs to be determined before processing. For example, determining whether the two uplink channels meet a multiplexing condition may be specifically determining whether the two uplink channels meet a multiplexing timeline. As described above, whether the third uplink channel and the first multiplexed uplink channel meet a multiplexing timeline may be determined based on the multiplexing timeline in R15, or whether the third uplink channel and the first multiplexed uplink channel meet a multiplexing timeline may be determined based on another multiplexing timeline, for example, a timeline that allows multiplexing between channels with different priorities. This is not limited in embodiments of this application.

When the multiplexing condition is met, the second uplink channel and the third uplink channel are multiplexed. The second uplink channel is the first multiplexed uplink channel, the at least one other uplink channel in the first uplink channel set, or the intermediate uplink channel that carries the information carried on some uplink channels in the first uplink channel set. In any one of the three cases, the second uplink channel is a low-priority uplink channel, and the third uplink channel is a high-priority uplink channel. Therefore, when the second uplink channel and the third uplink channel meet a first multiplexing condition, multiplexing may be performed to obtain the fourth uplink channel. The fourth uplink channel carries the information on the second uplink channel and the third uplink channel. For a specific multiplexing rule, refer to "(1) Multiplexing between a low-priority uplink channel and a high-priority uplink channel" described above, and details are not described herein again.

In another possible implementation, if the multiplexing condition is met, it needs to be further determined whether there is a low-priority uplink channel that overlaps the second uplink channel. If there is a low-priority uplink channel that overlaps the second uplink channel, the second uplink channel and the overlapping low-priority uplink channel are multiplexed. In another possible implementation, if the multiplexing condition is met, and the target uplink channel set does not include mutually overlapping uplink channels, the second uplink channel and the third uplink channel are multiplexed. That is, overlapping processing between low-priority uplink channels is first completed, and then overlapping processing between a low-priority uplink channel and a high-priority uplink channel is performed. In this case, the second uplink channel is the first multiplexed uplink channel, but not the at least one other uplink channel in the first uplink channel set, or the intermediate uplink channel that carries the information carried on some uplink channels in the first uplink channel set.

If the second uplink channel and the third uplink channel do not meet the multiplexing condition, and meet a condition for cancelling sending of one uplink channel and retaining the other uplink channel, "eliminating one and retaining one" between the second uplink channel and the third uplink channel may be performed. For a specific rule, refer to "eliminating one and retaining one" between a low-priority uplink channel and a high-priority uplink channel described above. Details are not described herein again.

It should be noted that, that the second uplink channel and the third uplink channel overlap includes two meanings:

(1) All high-priority uplink channels that overlap the second uplink channel are referred to as third uplink channels, and the third uplink channel is one or more uplink channels.

(2) There are a plurality of high-priority uplink channels that overlap the second uplink channel, and the third uplink channel is one uplink channel selected from the plurality of high-priority uplink channels.

For the first meaning, when it is determined that the second uplink channel and the third uplink channel meet the multiplexing condition, it may be considered that the second uplink channel and all the third uplink channels meet the multiplexing condition. That is, if the second uplink channel and one of the plurality of third uplink channels do not meet the multiplexing condition, it is considered that the second uplink channel and the third uplink channels do not meet the multiplexing condition. Correspondingly, when either of the second uplink channel and the third uplink channel meets the condition for cancelling sending of one uplink channel and retaining the other uplink channel, "eliminating one and retaining one" between the second uplink channel and the third uplink channel is performed.

For the second meaning, the third uplink channel may be an uplink channel that is earliest in time domain and/or a channel that occupies a largest quantity of time domain resources in the plurality of high-priority uplink channels that overlap the second uplink channel. Whether the multiplexing condition is met can be separately determined and processed for the two channels.

After obtaining the fourth uplink channel, the terminal device may send the fourth uplink channel to the network device. When generating and sending scheduling information of the terminal device, the network device may also predict an uplink channel to be sent by the terminal device and a time-frequency position corresponding to the uplink channel. In other words, the network device receives the fourth uplink channel at the time-frequency position corresponding to the fourth uplink channel.

It can be learned that, in this embodiment of this application, the first uplink channel set corresponding to the uplink channel that overlaps the first uplink channel with a low priority is generated, the uplink channel in the first uplink channel set is first multiplexed to obtain the first multiplexed uplink channel, and then the problem of overlapping between the second uplink channel and another high-priority uplink channel (the third uplink channel) is processed based on a preset condition. The second uplink channel may be the first multiplexed uplink channel, or may be an uplink channel in the first uplink channel set, or may be an intermediate uplink channel obtained by multiplexing the uplink channel in the first uplink channel set. The fourth uplink channel is obtained, and the fourth uplink channel may be obtained by multiplexing the second uplink channel and the third uplink channel when the preset condition is that the multiplexing condition is met, or may be obtained based on the second uplink channel and the third uplink channel when the preset condition is that the multiplexing condition is not met but “eliminating one and retaining one” is met. In this process, a probability that sending of the low-priority uplink channel is cancelled is reduced, thereby improving transmission efficiency of uplink control information and/or uplink data. In addition, in this process, the multiplexing problem between low-priority uplink channels is first processed, and then the multiplexing problem between the low-priority uplink channel and the high-priority uplink channel is processed, thereby reducing frequency of cross-priority uplink channel processing. Because the cross-priority overlapping processing mechanism is usually more complex than a same-priority overlapping processing mechanism, the process further reduces complexity and time consumption of the channel processing process, and improves uplink channel processing efficiency.

It should be noted that the first uplink channel set may be an empty set, that is, there are no low-priority uplink channels that overlap each other. In this case, a low-priority uplink channel may be separately processed with an overlapping high-priority uplink channel. A specific processing rule is described above.

After the terminal device determines the fourth uplink channel, if there is still a sixth uplink channel that overlaps the fourth uplink channel, the terminal device cannot directly send the fourth uplink channel, but continues to perform overlapping processing on the fourth uplink channel and the sixth uplink channel, to determine a seventh uplink channel.

In this embodiment of this application, the fourth uplink channel is an uplink channel obtained by multiplexing a low-priority uplink channel and a high-priority uplink channel, that is, a “hybrid-priority” uplink channel. The sixth uplink channel may be a high-priority uplink channel, or may be a low-priority uplink channel.

When the sixth uplink channel is a low-priority uplink channel, if the fourth uplink channel and the sixth uplink channel meet the multiplexing condition, the fourth uplink channel and the sixth uplink channel may be multiplexed. Because the fourth uplink channel carries information on a high-priority uplink channel, when the fourth uplink channel is multiplexed with the low-priority sixth uplink channel, the fourth uplink channel may be equivalent to a high-priority uplink channel. For a specific multiplexing rule of the two uplink channels, refer to the foregoing manner of “multiplexing between a low-priority uplink channel and a high-priority uplink channel”. Details are not described herein again.

When the fourth uplink channel and the sixth uplink channel do not meet the multiplexing condition, and meet a condition for cancelling sending of one uplink channel and retaining the other uplink channel, “eliminating one and retaining one” between the two uplink channels may be performed. For a specific rule, refer to “‘eliminating one and retaining one’ between a ‘hybrid-priority’ uplink channel and a low-priority uplink channel” described above. Details are not described herein again.

After determining the seventh uplink channel (or another obtained last uplink channel), the terminal device may send the seventh uplink channel to the network device. The seventh uplink channel may be an uplink channel obtained by multiplexing the fourth uplink channel and the sixth uplink channel, or may be an uplink channel that is not cancelled for sending but is retained for sending in the fourth uplink channel and the sixth uplink channel. The network device receives the seventh uplink channel at a time-frequency position corresponding to the seventh uplink channel.

It can be learned that, in this embodiment of this application, a “hybrid-priority” uplink channel (the fourth uplink channel) obtained through multiplexing may overlap the sixth uplink channel. Similarly, the fourth uplink channel and the sixth uplink channel may be multiplexed, or “eliminating one and retaining one” between the fourth uplink channel and the sixth uplink channel may be performed. This process provides a processing manner for the “hybrid-priority” uplink channel and each of a high-priority uplink channel and a low-priority uplink channel, to ensure sending of more important and more uplink control information and/or uplink data as much as possible, thereby further improving sending efficiency of the uplink control information and/or the uplink data.

It can be learned from the foregoing embodiment that, in a process of processing uplink channels with different priorities, the low-priority uplink channel in the first uplink channel set may include only a PUCCH, or may include both a PUCCH and a PUSCH. After the first multiplexed uplink channel is obtained by multiplexing the uplink channel in the first uplink channel set, in a process of processing the first multiplexed uplink channel and the high-priority third uplink channel, the third uplink channel may be a separate unmultiplexed PUCCH, or may be a separate unmultiplexed PUSCH, and/or the third uplink channel may be a PUCCH or a PUSCH obtained through multiplexing. Different generation processes of the first multiplexed uplink channel and different types of the third uplink channel may cause a change in a specific processing process of uplink channels with different priorities. Embodiments of this application provide detailed descriptions below.

Figure 9A:
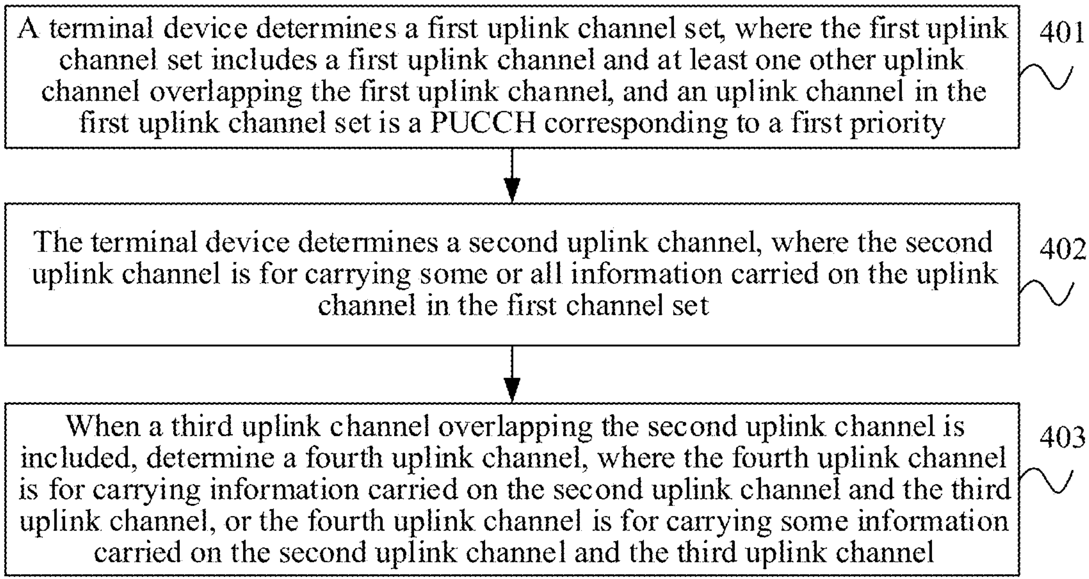
FIG. 9A is a flowchart of a channel processing method according to an embodiment of this application.

Refer to FIG. 9A. FIG. 9A is a flowchart of a channel processing method according to an embodiment of this application.

401: A terminal device determines a first uplink channel set, where the first uplink channel set includes a first uplink channel and at least one other uplink channel overlapping the first uplink channel, and an uplink channel in the first uplink channel set is a PUCCH corresponding to a first priority. In this embodiment of this application, the first uplink channel set includes the first uplink channel, which is a PUCCH corresponding to the first priority (a low priority). The first uplink channel set may further include at least one low-priority PUCCH overlapping the first uplink channel.

Specifically, all uplink channels included in the first uplink channel set are low-priority uplink channels, and all uplink channels other than the first uplink channel in the first uplink channel set overlap the first uplink channel.

In an optional manner, a specific manner in which the terminal device determines the first uplink channel set may be: The terminal device selects a PUCCH channel from a second uplink channel set to form the first uplink channel set. Optionally, an uplink channel included in the second uplink channel set is an uplink channel in one time unit. For example, if one time unit is one slot, the uplink channel included in the second uplink channel set is an uplink channel in one slot. In this case, the uplink channel included in the first uplink channel set is all PUCCHs in uplink channels in one slot.

Figure 9B:
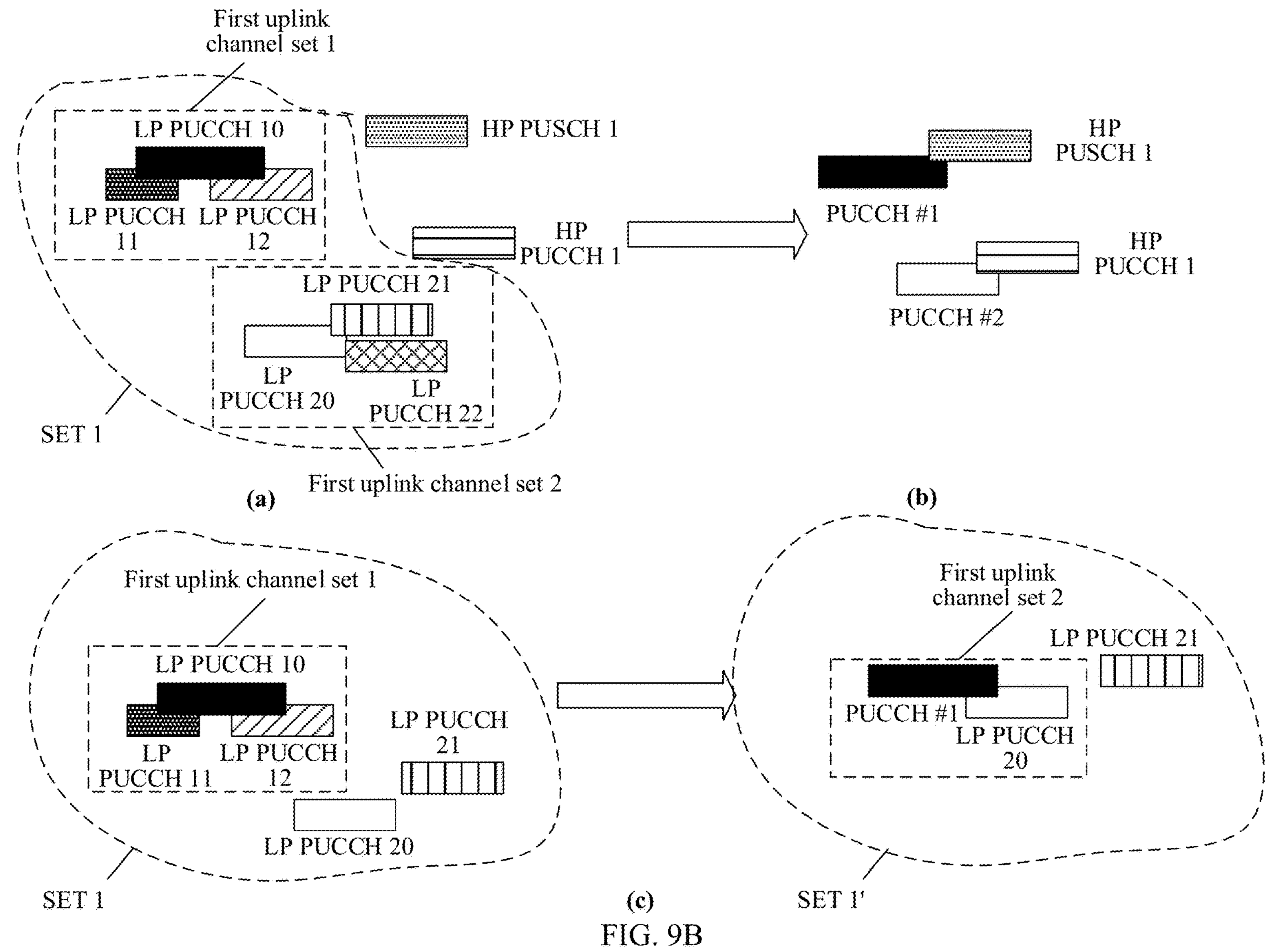
FIG. 9B is a schematic diagram of a first uplink channel set according to an embodiment of this application.

Specifically, refer to FIG. 9B. FIG. 9B is a schematic diagram of a first uplink channel set according to an embodiment of this application. As shown in (a) in FIG. 9B, first uplink channel set 1 includes first uplink channel 1, which is low-priority (LP) PUCCH 10. LP PUCCH 11 and LP PUCCH 12 are further included, where both LP PUCCH 11 and LP PUCCH 12 overlap LP PUCCH 10.

Optionally, the first uplink channel may be selected from a first target uplink channel set that includes all low-priority PUCCHs corresponding to one time unit, for example, may be a channel that is earliest in time domain, or may be a channel that occupies a largest quantity of time domain resources, or may be a channel that is earliest in time domain and that occupies a largest quantity of time domain resources.

For example, LP PUCCH 10 in FIG. 9B is a channel that occupies a largest quantity of time domain resources in SET 1.

Optionally, the first uplink channel set may be a plurality of sets divided from the first target uplink channel set. To be specific, after the $1^{st}$ uplink channel set is obtained through division by using the $1^{st}$ first uplink channel, the $2^{nd}$ first uplink channel is determined from remaining uplink channels in the first target uplink channel set, and the $2^{nd}$ first uplink channel set is obtained through division by using the $2^{nd}$ first uplink channel as a reference. This process is repeated, until there are no low-priority PUCCHs that overlap each other.

For example, in FIG. 9B, after first uplink channel set 1 is determined by using LP PUCCH 10 as a reference, if the first uplink channel set is a plurality of sets divided from the first target uplink channel set, first uplink channel 2, that is, LP PUCCH 20, is determined in SET 1, and is an uplink channel that is earliest in time domain in remaining uplink channels of SET 1. After LP PUCCH 20 is determined, all low-priority PUCCHs that overlap LP PUCCH 20 are obtained, to form first uplink channel set 2, and so on, until there are no low-priority PUCCHs that overlap each other.

Optionally, the first uplink channel set is a plurality of sets iteratively obtained from the first target uplink channel set. To be specific, after the $1^{st}$ first uplink channel set is obtained through division by using the $1^{st}$ first uplink channel, multiplexing is performed to obtain a multiplexed uplink channel. Then, the multiplexed uplink channel and an uplink channel other than the $1^{st}$ first uplink channel set in the first target uplink channel set form a new first target uplink channel set, the $2^{nd}$ first uplink channel is selected from the new first target uplink channel set, and the $2^{nd}$ first uplink channel set is obtained through division by using the $2^{nd}$ first uplink channel as a reference. Iteration is performed until the new first target uplink channel set no longer includes uplink channels that overlap each other.

For example, it is assumed that the first uplink channel set is a plurality of sets iteratively obtained from the first target uplink channel set. As shown in (c) in FIG. 9B, the first multiplexed uplink channel and a remaining LP PUCCH in the first target uplink channel set form a new first target uplink channel set SET 1', and then first uplink channel 2 is selected from the new first target uplink channel set, which is corresponding to PUCCH #1 in the figure. First uplink channel set 2 is obtained through division by using first uplink channel 2 as a reference. Iteration is performed until there are no low-priority PUCCHs that overlap each other.

After the first uplink channel set is determined, all uplink channels in the first uplink channel set are multiplexed, to obtain the first multiplexed uplink channel. Because all uplink channels in the first uplink channel set are low-priority PUCCHs, the first multiplexed uplink channel may also be a low-priority PUCCH. For example, correspondingly, PUCCH #1 is obtained after first uplink channel set 1 in FIG. 9B is multiplexed. Similarly, PUCCH #2 is obtained after first uplink channel set 2 is multiplexed. Both PUCCHs are low-priority PUCCHs.

Then, it is further found whether there is another low-priority PUCCH that overlaps PUCCH #1 or PUCCH #2 in SET 1, and multiplexing processing in the foregoing low-priority PUCCH set is repeatedly performed until it is determined that the time unit no longer includes low-priority PUCCHs that overlap each other.

Alternatively, after first uplink channel set 1 is multiplexed to obtain PUCCH #1, PUCCH #1 and a remaining PUCCH that is not multiplexed in the first target uplink channel set form a new first target uplink channel set SET 1', and it is determined whether there are still mutually overlapping uplink channels in the set. If there are still mutually overlapping uplink channels in the set, first uplink channel 2 is selected, first uplink channel set 2 is obtained through division, and a next round of multiplexing is performed until it is determined that the first target uplink channel set does not include mutually overlapping uplink channel.

402: The terminal device determines a second uplink channel, where the second uplink channel is for carrying some or all information carried on the uplink channel in the first channel set.

The second uplink channel is determined. The second uplink channel may be: (1) for carrying some information carried on the uplink channel in the first channel set; or (2) for carrying all information carried on the uplink channel in the first channel set.

For case (1), the second uplink channel may carry information on a specific uplink channel in the first uplink channel set. Alternatively, the second uplink channel is for carrying information on an intermediate uplink channel obtained by multiplexing the uplink channel in the first uplink channel set. In other words, in this case, partial multiplexing is performed, and multiplexing of all channels in the set is not completed. Alternatively, the second uplink channel is for carrying a channel obtained by multiplexing the uplink channel in the first uplink channel set, but sending of information carried on some channels in the first uplink channel set is cancelled. It may be understood that a reason for cancelling sending may be that a resource is limited or another condition. This is not limited in this embodiment.

For case (2), the second uplink channel is for carrying information on the first multiplexed uplink channel, and the first multiplexed uplink channel is obtained by multiplexing all uplink channels in the first uplink channel set.

The first multiplexed uplink channel is obtained by multiplexing all uplink channels in the first uplink channel set.

This means that the first multiplexed uplink channel may be a multiplexed uplink channel obtained through multiplexing after a plurality of rounds of division into a first uplink channel set, and then division into a first uplink channel set is performed based on the multiplexed uplink channel and a remaining uplink channel to obtain a final multiplexed uplink channel. The first target uplink channel set in the time unit does not include another uplink channel that overlaps the first multiplexed uplink channel. Alternatively, the first multiplexed uplink channel is a channel obtained by processing the first target uplink channel through iteration. A finally obtained first target uplink channel does not include an overlapping uplink channel.

403: When a third uplink channel overlapping the second uplink channel is included, determine a fourth uplink channel, where the fourth uplink channel is for carrying information carried on the second uplink channel and the third uplink channel, or the fourth uplink channel is for carrying some information carried on the second uplink channel and the third uplink channel.

The second uplink channel may be at least one of the following: the first multiplexed uplink channel, at least one other uplink channel in the first uplink channel set, or an intermediate uplink channel that carries information on some uplink channels in the first uplink channel set. The third uplink channel corresponds to a second priority, and the second priority is higher than the first priority.

The second uplink channel may overlap a high-priority uplink channel. Specifically, the obtained first multiplexed uplink channel may overlap a high-priority uplink channel, and the high-priority uplink channel may be an HP PUCCH or an HP PUSCH. Alternatively, the uplink channel in the first uplink channel set has not been completely multiplexed, but an intermediate uplink channel generated by multiplexing the first uplink channel and one or more uplink channels overlaps a high-priority uplink channel, or an uplink channel in the first uplink channel set has not been multiplexed and overlaps a high-priority uplink channel. In this case, processing may be performed based on a timeline relationship between the second uplink channel and the third uplink channel, to determine the fourth uplink channel.

Figure 9C:
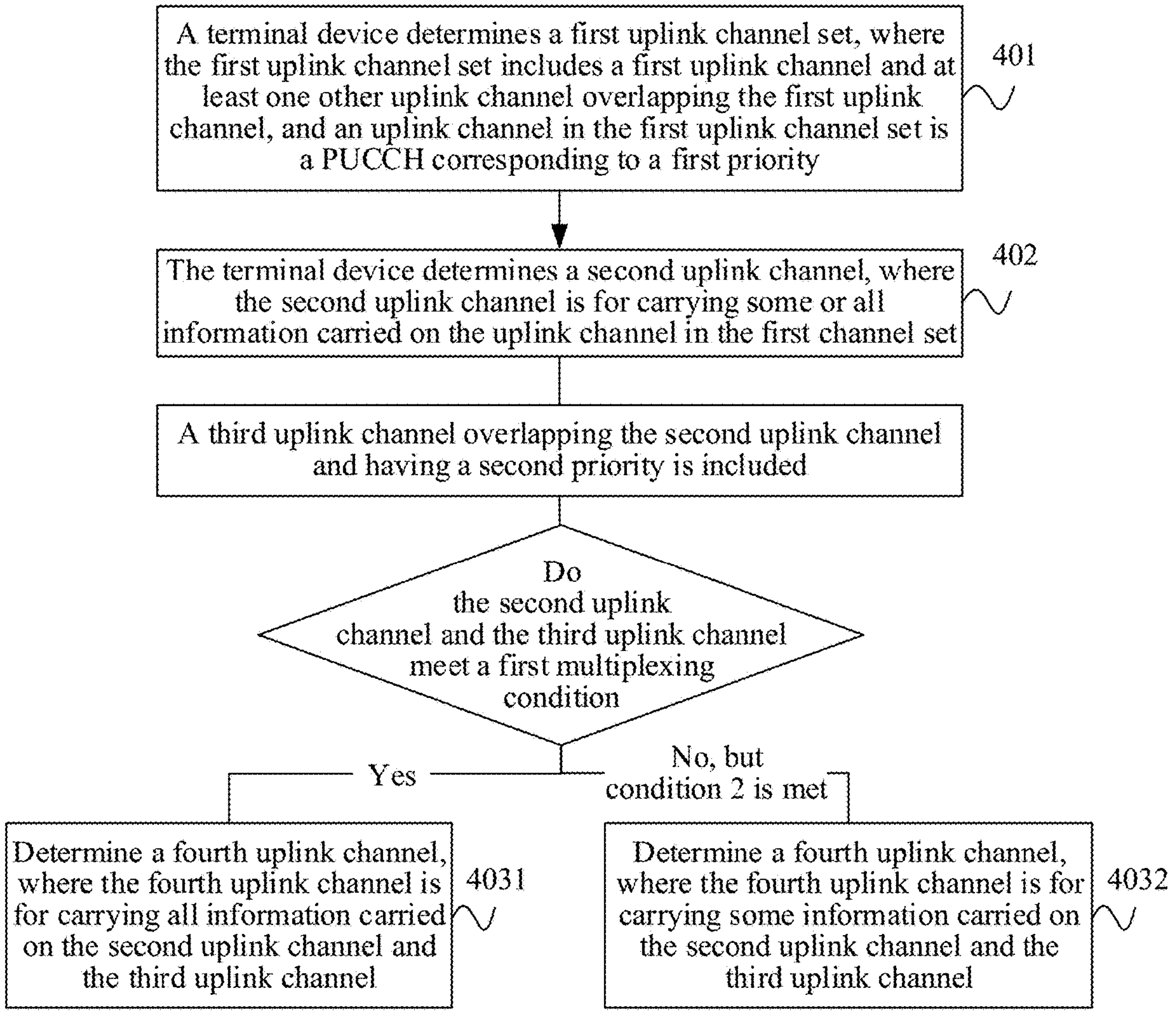
FIG. 9C is a flowchart of a channel processing method according to an embodiment of this application.

The second uplink channel and the third uplink channel overlap. Actually, refer to FIG. 9C. FIG. 9C is a flowchart of a channel processing method according to an embodiment of this application. As shown in FIG. 9C, step 403 may be divided into two cases.

4031: When the third uplink channel that overlaps the second uplink channel and that has the second priority is included, and the second uplink channel and the third uplink channel meet a first multiplexing condition, determine a fourth uplink channel, where the fourth uplink channel is for carrying all information carried on the second uplink channel and the third uplink channel.

When the second uplink channel and the third uplink channel overlap and meet the first multiplexing condition, the second uplink channel and the third uplink channel may be multiplexed to obtain the fourth uplink channel, where the fourth uplink channel is for carrying all the information carried on the second uplink channel and the third uplink channel.

Specifically, refer to FIG. 9B. As shown in (b) in FIG. 9B, the multiplexed uplink channel PUCCH #2 overlaps HP PUCCH 1, and it is determined whether the two channels meet the first multiplexing condition. If the two channels meet the first multiplexing condition, multiplexing is performed. The fourth uplink channel is an uplink channel obtained by multiplexing the second uplink channel and the third uplink channel, and the fourth uplink channel carries information on the second uplink channel and the third uplink channel.

Alternatively, as shown in (b) in FIG. 9B, the multiplexed uplink channel PUCCH #1 may overlap HP PUSCH 1. Similarly, it may also be determined whether the two channels meet the first multiplexing condition, and if the two channels meet the first multiplexing condition, the two channels are multiplexed.

Because the second uplink channel is a low-priority PUCCH, and the third uplink channel is a high-priority PUCCH/PUSCH, for a multiplexing process, refer to the foregoing manner of "multiplexing between a low-priority PUCCH and a high-priority PUCCH" and "multiplexing between a low-priority PUCCH and a high-priority PUSCH". Details are not described herein again.

Alternatively, when the second uplink channel and the third uplink channel overlap and meet the first multiplexing condition, the following condition may be first determined: whether there is an LP PUCCH overlapping the second uplink channel.

If there is no LP PUCCH that overlaps the second uplink channel, multiplexing is performed between the second uplink channel and the third uplink channel.

If there is an LP PUCCH that overlaps the second uplink channel, multiplexing between the second uplink channel and the LP PUCCH is first processed. If an uplink channel obtained through multiplexing still overlaps the third uplink channel and meets the first multiplexing condition, multiplexing between the two channels is performed.

The foregoing condition determining process may also be understood as follows: When the second uplink channel and the third uplink channel meet the first multiplexing condition, if it is determined that the second uplink channel is the final multiplexed uplink channel obtained by multiplexing the LP PUCCH in the first target uplink channel set, the second uplink channel and the third uplink channel are multiplexed.

Alternatively, when the second uplink channel and the third uplink channel overlap and meet the first multiplexing condition, the following condition may be first determined: whether there is an LP PUSCH overlapping the second uplink channel.

If there is no LP PUSCH that overlaps the second uplink channel, multiplexing is performed between the second uplink channel and the third uplink channel.

If there is an LP PUSCH that overlaps the second uplink channel, multiplexing between the second uplink channel and the LP PUSCH is first processed. If an uplink channel obtained through multiplexing still overlaps the third uplink channel and meets the first multiplexing condition, multiplexing between the two channels is performed.

The foregoing condition determining process may also be understood as follows: When the second uplink channel and the third uplink channel meet the first multiplexing condition, if it is determined that the second uplink channel is the final multiplexed uplink channel obtained by multiplexing the uplink channel in the first target uplink channel set, after the multiplexed uplink channel and an overlapping LP PUSCH are multiplexed, the second uplink channel and the third uplink channel are multiplexed.

4032: When the third uplink channel that overlaps the second uplink channel and that has the second priority is included, and the second uplink channel and the third uplink channel do not meet a first multiplexing condition but meet condition 2, determine a fourth uplink channel, where the fourth uplink channel is for carrying some information carried on the second uplink channel and the third uplink channel. Condition 2 is: cancelling sending of one uplink channel and retaining the other uplink channel.

The third uplink channel may be an HP PUCCH and an HP PUSCH.

When the second uplink channel and the third uplink channel do not meet the first multiplexing condition, but meet the condition for cancelling sending of one uplink channel and retaining the other uplink channel, because the second uplink channel is an LP PUCCH, the second uplink channel may be cancelled in this case, and the obtained fourth uplink channel is the third uplink channel, that is, the fourth uplink channel is for carrying information carried on the third uplink channel. When the condition for cancelling sending of one uplink channel and retaining the other uplink channel is met, the second uplink channel is cancelled.

As described in the foregoing embodiment, the third uplink channel may be a plurality of high-priority uplink channels that overlap the second uplink channel. When it is determined that the second uplink channel and the third uplink channel meet the multiplexing condition, it may be considered that the second uplink channel and all the third uplink channels meet the multiplexing condition. That is, if the second uplink channel and one of the plurality of third uplink channels do not meet the multiplexing condition, it is considered that the second uplink channel and the third uplink channels do not meet the multiplexing condition. Correspondingly, when either of the second uplink channel and the third uplink channel meets the condition for cancelling sending of one uplink channel and retaining the other uplink channel, sending on the second uplink channel is cancelled. Optionally, the obtained fourth uplink channel is the third uplink channel.

Alternatively, the third uplink channel may be an uplink channel that is earliest in time domain and/or a channel that occupies a largest quantity of time domain resources in the plurality of high-priority uplink channels that overlap the second uplink channel. Whether the multiplexing condition is met can be separately determined and processed for the two channels.

It can be learned that, in this embodiment of this application, overlapping between low-priority PUCCHs is first processed to obtain the first multiplexed uplink channel, and then overlapping with a high-priority uplink channel is processed. In this process, frequency of overlapping processing between the low-priority PUCCH and the high-priority uplink channel can be reduced, thereby reducing processing complexity and improving processing efficiency.

In the foregoing process, after processing of overlapping low-priority PUCCHs is completed by dividing the first uplink channel set, there may be a case of overlapping a low-priority PUSCH. Therefore, refer to FIG. 9D. FIG. 9D is a flowchart of another channel processing method according to an embodiment of this application. As shown in FIG. 9D, the method further includes the following steps.

404: Multiplex a first multiplexed uplink channel and an overlapping low-priority PUSCH to obtain a new multiplexed uplink channel, where the first multiplexed uplink channel is an uplink channel obtained by multiplexing the uplink channel in the first uplink channel set.

Optionally, the first multiplexed uplink channel may be a multiplexed uplink channel obtained by iteratively processing the first target uplink channel. Details are described in 402, and are not described again.

When the first multiplexed uplink channel is an LP PUCCH, and overlaps an LP PUSCH, the two channels can be multiplexed according to a low-priority uplink channel multiplexing rule, and a low-priority PUSCH is obtained after the low-priority PUCCH and the low-priority PUSCH are multiplexed.

In this case, for step 402, a second uplink channel is determined, where the second uplink channel is for carrying some or all information carried on the uplink channel in the first channel set, or carries information on the low-priority PUSCH.

In other words, the second uplink channel is for carrying information carried on the uplink channel in the first channel set, and further carries information on the low-priority PUSCH. In this case, the second uplink channel is a multiplexed uplink channel obtained by multiplexing the first multiplexed uplink channel and the LP PUSCH.

For step 4031:

4031: When the third uplink channel that overlaps the second uplink channel and that has the second priority is included, and the second uplink channel and the third uplink channel meet a first multiplexing condition, determine a fourth uplink channel, where the fourth uplink channel is for carrying information carried on the second uplink channel and the third uplink channel.

When the second uplink channel is an LP PUSCH, similarly, if the second uplink channel and the third uplink channel overlap and meet the first multiplexing condition, the second uplink channel and the third uplink channel may be multiplexed to obtain the fourth uplink channel, where the fourth uplink channel is for carrying information carried on the second uplink channel and the third uplink channel.

Alternatively, when the second uplink channel and the third uplink channel overlap and meet the first multiplexing condition, the following condition may be first determined: whether there is an LP PUSCH overlapping the second uplink channel.

If there is no LP PUSCH that overlaps the second uplink channel, multiplexing is performed between the second uplink channel and the third uplink channel.

If there is an LP PUSCH that overlaps the second uplink channel, multiplexing between the second uplink channel and the LP PUSCH is first processed. If an uplink channel obtained through multiplexing still overlaps the third uplink channel and meets the first multiplexing condition, multiplexing between the two channels is performed.

The foregoing condition determining process may also be understood as follows: When the second uplink channel and the third uplink channel meet the first multiplexing condition, if it is determined that the second uplink channel is the final multiplexed uplink channel obtained by multiplexing the LP PUCCH and the LP PUSCH in the first target uplink channel set, the second uplink channel and the third uplink channel are multiplexed.

It can be learned that in this embodiment of this application, overlapping between low-priority PUCCHs is first processed to obtain the first multiplexed uplink channel, then overlapping between the first multiplexed uplink channel and the low-priority PUSCH is processed to obtain the final multiplexed uplink channel, and then overlapping between the final multiplexed uplink channel and the high-priority uplink channel is processed. In this process, frequency of overlapping processing between the low-priority uplink channel and the high-priority uplink channel can be reduced, thereby reducing processing complexity and improving processing efficiency.

The third uplink channel is a high-priority PUCCH or a high-priority PUSCH. In a possible case, the third uplink channel is an uplink channel obtained after the high-priority uplink channel is grouped into the second uplink channel set for multiplexing.

Optionally, FIG. 9E shows another channel processing method according to an embodiment of this application. The method may further include the following steps.

405: Determine a second uplink channel set, where the second uplink channel set includes a fifth uplink channel and at least one other uplink channel overlapping the fifth uplink channel, and an uplink channel in the second uplink channel set is a PUCCH corresponding to a second priority.

Optionally, all uplink channels included in the second uplink channel set have a high priority.

Optionally, all uplink channels other than the second uplink channel in the second uplink channel set overlap the second uplink channel.

406: Determine a third uplink channel, where the third uplink channel is for carrying some or all information carried on the uplink channel in the second uplink channel set.

The third channel may be a second multiplexed uplink channel, an uplink channel in the second uplink channel set, or an intermediate uplink channel obtained by multiplexing some uplink channels in the second uplink channel set. The second multiplexed uplink channel is an uplink channel obtained by multiplexing the uplink channel in the second uplink channel set.

The fifth uplink channel is first determined, and then the second uplink channel set is obtained through division based on the fifth uplink channel. All uplink channels other than the fifth uplink channel in the second uplink channel set overlap the fifth uplink channel.

Figure 9F:
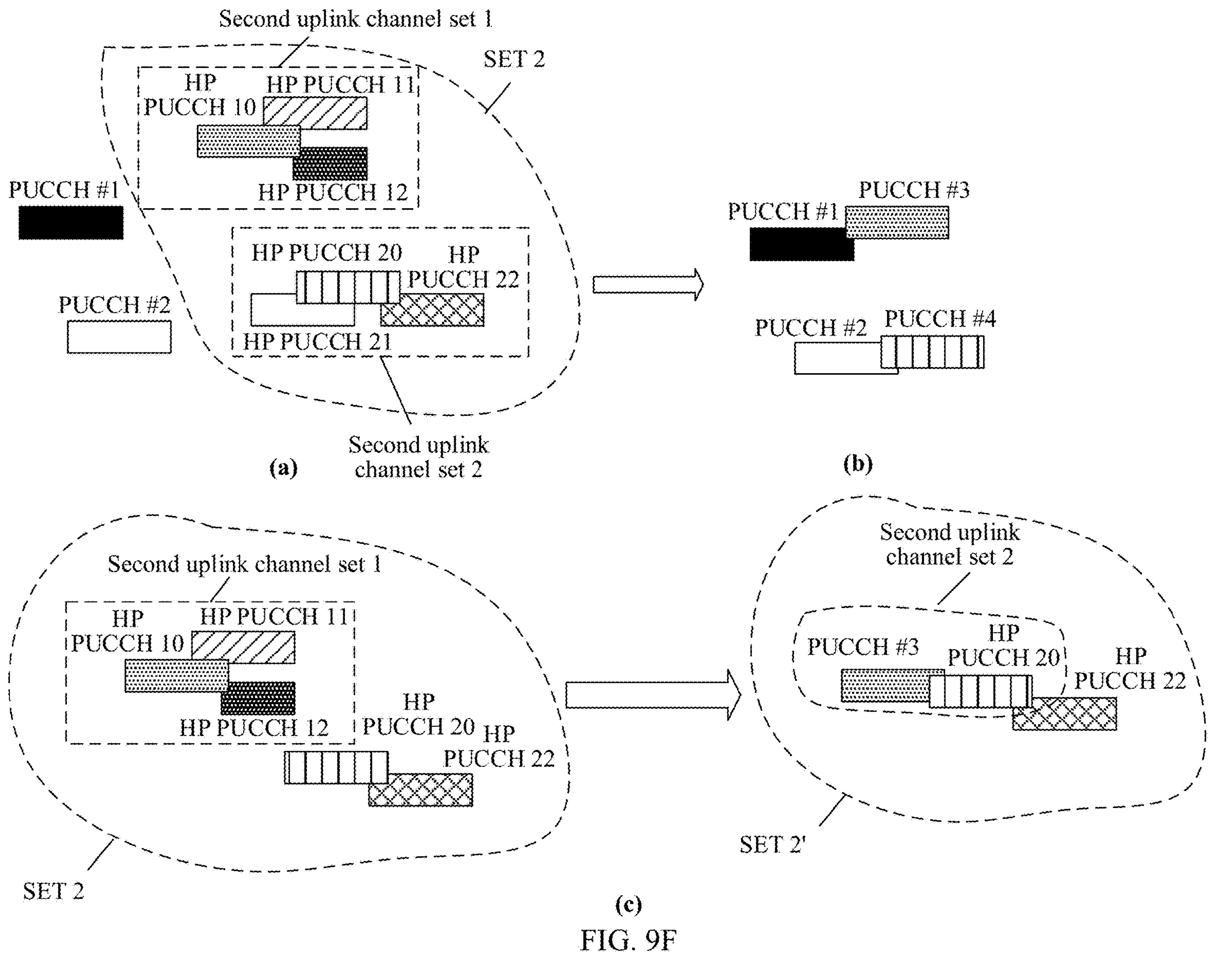
FIG. 9F is a schematic diagram of a second uplink channel set according to an embodiment of this application.

Specifically, refer to FIG. 9F. FIG. 9F is a schematic diagram of a second uplink channel set according to an embodiment of this application. As shown in FIG. 9F, the second uplink channel set is first determined by using the fifth uplink channel as a reference. The fifth uplink channel is a high-priority PUCCH, and corresponds to HP PUCCH 10 in FIG. 9F. The second uplink channel set may further include at least one high-priority PUCCH that overlaps the fifth uplink channel. As shown in FIG. 9F, second uplink channel set 1 further includes HP PUCCH 11 and HP PUCCH 12, and both HP PUCCH 11 and HP PUCCH 12 overlap HP PUCCH 10, and correspond to a high priority.

Optionally, the fifth uplink channel may be selected from a second target uplink channel set that includes all high-priority PUCCHs corresponding to one time unit, for example, may be a channel that is earliest in time domain, or may be a channel that occupies a largest quantity of time domain resources, or may be a channel that is earliest in time domain and that occupies a largest quantity of time domain resources.

For example, HP PUCCH 10 in FIG. 9F is a channel that occupies a largest quantity of time domain resources in SET 2.

Optionally, the second uplink channel set may be a plurality of sets divided from the second target uplink channel set. To be specific, after the 1$^{st}$ uplink channel set is obtained through division by using the 1$^{st}$ fifth uplink channel set, the 2$^{nd}$ fifth uplink channel is determined from remaining uplink channels in the second target uplink channel set, and the 2$^{nd}$ uplink channel set is obtained through division by using the 2$^{nd}$ fifth uplink channel as a reference.

For example, in FIG. 9F, after second uplink channel set 1 is determined by using HP PUCCH 10 as a reference, if the second uplink channel set is a plurality of sets divided from the second target uplink channel set, first uplink channel 2, that is, HP PUCCH 20, is determined in SET 2, and is an uplink channel that is earliest in time domain in remaining uplink channels of SET 2. After HP PUCCH 20 is determined, all high-priority PUCCHs that overlap HP PUCCH 20 are obtained, to form second uplink channel set 2, and so on, until there are no high-priority PUCCHs that overlap each other.

Optionally, the second uplink channel set is a plurality of sets iteratively obtained from the second target uplink channel set. To be specific, after the 1$^{st}$ second uplink channel set is obtained through division by using the 1$^{st}$ fifth uplink channel set, multiplexing is performed to obtain a multiplexed uplink channel. Then, the multiplexed uplink channel and a remaining uplink channel in the second target uplink channel set form a new second target uplink channel set, the 2$^{nd}$ fifth uplink channel is selected from the new second target uplink channel set, and the 2$^{nd}$ second uplink channel set is obtained through division by using the 2$^{nd}$ fifth uplink channel as a reference. Iteration is performed until the new second target uplink channel set no longer includes uplink channels that overlap each other.

Optionally, it is assumed that the second uplink channel set is a plurality of sets iteratively obtained from the second target uplink channel set. Then, the second multiplexed uplink channel and a remaining HP PUCCH in the second target uplink channel set form a new second target uplink channel set SET 2', and then second uplink channel 2 is selected from the new second target uplink channel set. Second uplink channel set 2 is obtained through division by using second uplink channel 2 as a reference. Iteration is performed until a set of high-priority PUCCHs that overlap each other is no longer included.

After the second uplink channel set is determined, all uplink channels in the second uplink channel set are multiplexed, to obtain the second multiplexed uplink channel. Because all uplink channels in the second uplink channel set are high-priority PUCCHs, the second multiplexed uplink channel may also be a high-priority PUCCH. For example, correspondingly, PUCCH #3 is obtained after second uplink channel set 1 in FIG. 9F is multiplexed. Similarly, PUCCH #4 is obtained after second uplink channel set 2 is multiplexed. Both PUCCHs are high-priority PUCCHs.

Alternatively, as shown in (c) in FIG. 9F, PUCCH #3 is obtained after second uplink channel set 1 is multiplexed, and PUCCH #3 and another uplink channel other than second uplink channel set 1 in the second target uplink channel set SET 2 form SET 2'. Fifth uplink channel 2 may be determined from SET 2', that is, PUCCH #3, and second uplink channel set 2 is obtained through division by using PUCCH #3. HP PUCCH 20 is further included. Then, the two uplink channels are multiplexed to obtain a multiplexed uplink channel, and the second target uplink channel set is processed iteratively until the second target uplink channel set no longer includes high-priority PUCCHs that overlap each other.

When step 403 is performed on the third uplink channel obtained in step 406, a specific process may be different.

403: When a third uplink channel overlapping the second uplink channel is included, determine a fourth uplink channel, where the fourth uplink channel is for carrying information carried on the second uplink channel and the third uplink channel, or the fourth uplink channel is for carrying some information carried on the second uplink channel and the third uplink channel.

In this embodiment of this application, when the third uplink channel is an uplink channel obtained in a processing process of the second uplink channel set, the second uplink channel may overlap a high-priority uplink channel. Specifically, the obtained second multiplexed uplink channel may overlap the second uplink channel. Alternatively, the uplink channel in the second uplink channel set has not been completely multiplexed, but an intermediate uplink channel generated by multiplexing the fifth uplink channel and one or more uplink channels overlaps the second uplink channel, or an uplink channel in the second uplink channel set has not been multiplexed and overlaps the second uplink channel. In this case, processing may be performed based on a timeline relationship between the second uplink channel and the third uplink channel, to determine the fourth uplink channel.

The second multiplexed uplink channel is obtained by multiplexing all uplink channels in the second uplink channel set. This means that the second multiplexed uplink channel may be a multiplexed uplink channel obtained through multiplexing after a plurality of rounds of division into a second uplink channel set, and then division into a second uplink channel set is performed based on the multiplexed uplink channel and a remaining uplink channel to obtain a final multiplexed uplink channel. The second target uplink channel set in the time unit does not include another HP PUCCH that overlaps the second multiplexed uplink channel.

As described above, step 403 may be divided into two steps.

4031: When the third uplink channel that overlaps the second uplink channel and that has the second priority is included, and the second uplink channel and the third uplink channel meet a first multiplexing condition, determine a fourth uplink channel, where the fourth uplink channel is for carrying information carried on the second uplink channel and the third uplink channel.

When the second uplink channel and the third uplink channel overlap and meet the first multiplexing condition, the second uplink channel and the third uplink channel may be multiplexed to obtain the fourth uplink channel, where the fourth uplink channel is for carrying all the information carried on the second uplink channel and the third uplink channel.

For example, as shown in (b) in FIG. 9F, PUCCH #1 overlaps PUCCH #3, and PUCCH #2 overlaps PUCCH #4. Similarly, whether the two channels meet the first multiplexing condition may be determined. If the first multiplexing condition is met, multiplexing is performed, to obtain a multiplexed uplink channel as the fourth uplink channel.

Alternatively, when the second uplink channel and the third uplink channel overlap and meet the first multiplexing condition, the following condition may be first determined: whether there is an HP PUCCH overlapping the third uplink channel.

If there is no HP PUCCH that overlaps the third uplink channel, multiplexing is performed between the second uplink channel and the third uplink channel.

If there is an HP PUCCH that overlaps the third uplink channel, multiplexing between the third uplink channel and the HP PUCCH is first processed. If an uplink channel obtained through multiplexing still overlaps the second uplink channel and meets the first multiplexing condition, multiplexing between the two channels is performed.

The foregoing condition determining process may also be understood as follows: When the second uplink channel and the third uplink channel meet the first multiplexing condition, if it is determined that the third uplink channel is the final multiplexed uplink channel obtained by multiplexing the HP PUCCH in the second target uplink channel set, the second uplink channel and the third uplink channel are multiplexed.

4032: When the third uplink channel that overlaps the second uplink channel and that has the second priority is included, and the second uplink channel and the third uplink channel do not meet a first multiplexing condition but meet condition 2, determine a fourth uplink channel, where the fourth uplink channel is for carrying some information carried on the second uplink channel and the third uplink channel. Condition 2 is: cancelling sending of one uplink channel and retaining the other uplink channel.

In this embodiment of this application, the third uplink channel is an HP PUCCH. When the second uplink channel and the third uplink channel do not meet the first multiplexing condition, but meet the condition for cancelling sending of one uplink channel and retaining the other uplink channel, because the second uplink channel is a low-priority uplink channel, the second uplink channel is cancelled in this case. The obtained fourth uplink channel is the third uplink channel, that is, the fourth uplink channel is for carrying information carried on the third uplink channel.

It can be learned that, in this embodiment of this application, after the second uplink channel is obtained by dividing the first uplink channel set for overlapping processing, the third uplink channel is obtained by dividing the set for processing overlapping between high-priority PUCCHs. This process further reduces frequency of cross-priority uplink channel processing, reduces complexity and time consumption of uplink channel processing, and improves processing efficiency.

Figure 9G:
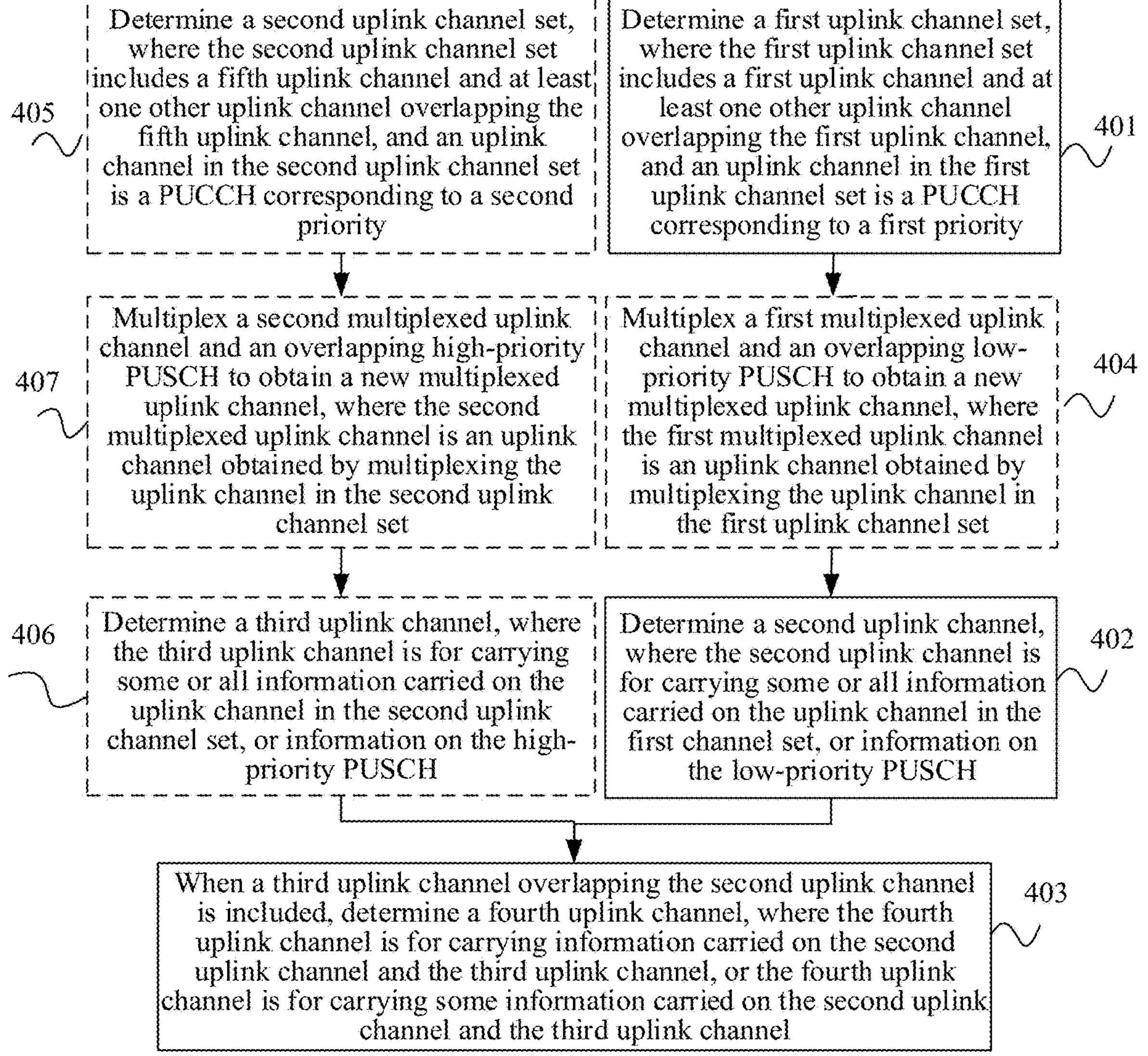
FIG. 9G is a flowchart of another channel processing method according to an embodiment of this application.

In the foregoing process, after processing of overlapping high-priority PUCCHs is completed by dividing the second uplink channel set, there may be a case of overlapping a high-priority PUSCH. Therefore, refer to FIG. 9G. FIG. 9G is a flowchart of another channel processing method according to an embodiment of this application. As shown in FIG. 9G, the method further includes the following steps.

407: Multiplex a second multiplexed uplink channel and an overlapping high-priority PUSCH to obtain a new multiplexed uplink channel, where the second multiplexed uplink channel is an uplink channel obtained by multiplexing the uplink channel in the second uplink channel set.

When the second multiplexed uplink channel is an HP PUCCH, and overlaps an HP PUSCH, the two channels can be multiplexed according to a high-priority uplink channel multiplexing rule, and a high-priority PUSCH is obtained after the high-priority PUCCH and the high-priority PUSCH are multiplexed.

In this case, for step 406, a third uplink channel is determined, where the third uplink channel is for carrying some or all information carried on the uplink channel in the first channel set, or carries information on the low-priority PUSCH.

In other words, the third uplink channel is for carrying information carried on the uplink channel in the second channel set, and further carries information on the high-priority PUSCH. In this case, the third uplink channel is a multiplexed uplink channel obtained by multiplexing the second multiplexed uplink channel and the HP PUSCH.

For step 4031:

4031: When the third uplink channel that overlaps the second uplink channel and that has the second priority is included, and the second uplink channel and the third uplink channel meet a first multiplexing condition, determine a fourth uplink channel, where the fourth uplink channel is for carrying information carried on the second uplink channel and the third uplink channel.

Optionally, when the second uplink channel and the third uplink channel overlap and meet the first multiplexing condition, the following condition may be first determined: whether there is an HP PUSCH overlapping the third uplink channel.

If there is no HP PUSCH that overlaps the third uplink channel, multiplexing is performed between the second uplink channel and the third uplink channel.

If there is an HP PUSCH that overlaps the third uplink channel, multiplexing between the third uplink channel and the HP PUSCH is first processed. If an uplink channel obtained through multiplexing still overlaps the second uplink channel and meets the first multiplexing condition, multiplexing between the two channels is performed.

The foregoing condition determining process may also be understood as follows: When the second uplink channel and the third uplink channel meet the first multiplexing condition, if it is determined that the third uplink channel is the final multiplexed uplink channel obtained by multiplexing the HP PUCCH and the HP PUSCH in the second target uplink channel set, the second uplink channel and the third uplink channel are multiplexed.

It may be understood that, in the steps of the embodiment in FIG. 9E, step 404 may be included or may not be included, that is, a manner of determining the second uplink channel should not limit a manner of determining the third uplink channel.

For step 4032:

4032: When the third uplink channel that overlaps the second uplink channel and that has the second priority is included, and the second uplink channel and the third uplink channel do not meet a first multiplexing condition but meet condition 2, determine a fourth uplink channel, where the fourth uplink channel is for carrying some information carried on the second uplink channel and the third uplink channel. Condition 2 is: cancelling sending of one uplink channel and retaining the other uplink channel.

In this embodiment of this application, the third uplink channel is an HP PUCCH or PUSCH. When the second uplink channel and the third uplink channel do not meet the first multiplexing condition, but meet the condition for cancelling sending of one uplink channel and retaining the other uplink channel, because the second uplink channel is a low-priority uplink channel, the second uplink channel is cancelled in this case. The obtained fourth uplink channel is the third uplink channel, that is, the fourth uplink channel is for carrying information carried on the third uplink channel.

It can be learned that, in this embodiment of this application, after the second uplink channel is obtained by dividing the first uplink channel set for overlapping processing, the third uplink channel is obtained by dividing the set for processing overlapping between high-priority uplink channels. This process further reduces frequency of cross-priority uplink channel processing, reduces complexity and time consumption of uplink channel processing, and improves processing efficiency.

After the fourth uplink channel is determined, the method may further include 408: If there is a sixth uplink channel overlapping the fourth uplink channel, determine a seventh uplink channel, where the seventh uplink channel is for carrying information on the fourth uplink channel and information carried on the sixth uplink channel, or information on the fourth uplink channel and some information carried on the sixth uplink channel.

In this embodiment of this application, the fourth uplink channel is an uplink channel obtained by multiplexing a low-priority uplink channel and a high-priority uplink channel, that is, a "hybrid-priority" uplink channel. The sixth uplink channel may be a high-priority uplink channel, or may be a low-priority uplink channel. When the sixth uplink channel is a low-priority uplink channel, if the fourth uplink channel and the sixth uplink channel meet the multiplexing condition, the fourth uplink channel and the sixth uplink channel may be multiplexed. Because the fourth uplink channel carries information on a high-priority uplink channel, when the fourth uplink channel is multiplexed with the low-priority sixth uplink channel, the fourth uplink channel may be equivalent to a high-priority uplink channel. For a specific multiplexing rule of the two uplink channels, refer to the foregoing manner of "multiplexing between a low-priority uplink channel and a high-priority uplink channel". Details are not described herein again.

When the fourth uplink channel and the sixth uplink channel do not meet the multiplexing condition, and meet a condition for cancelling sending of one uplink channel and retaining the other uplink channel, "eliminating one and retaining one" between the two uplink channels may be performed. For a specific rule, refer to "'eliminating one and retaining one' between a 'hybrid-priority' uplink channel and a low-priority uplink channel" described above. Details are not described herein again.

It can be learned that, in this embodiment of this application, a "hybrid-priority" uplink channel (the fourth uplink channel) obtained through multiplexing may overlap the sixth uplink channel. Similarly, the fourth uplink channel and the sixth uplink channel may be multiplexed, or "eliminating one and retaining one" between the fourth uplink channel and the sixth uplink channel may be performed. This process provides a processing manner for the "hybrid-priority" uplink channel and each of a high-priority uplink channel and a low-priority uplink channel, to ensure sending of more important and more uplink control information and/or uplink data as much as possible, thereby further improving sending efficiency of the uplink control information and/or the uplink data.

It should be noted that, the first uplink channel set may be an empty set, that is, there are no LP PUCCHs that overlap each other. In this case, the LP PUCCH may be separately processed with an overlapping HP PUCCH or HP PUSCH. A specific processing rule is described above.

Figure 10A:
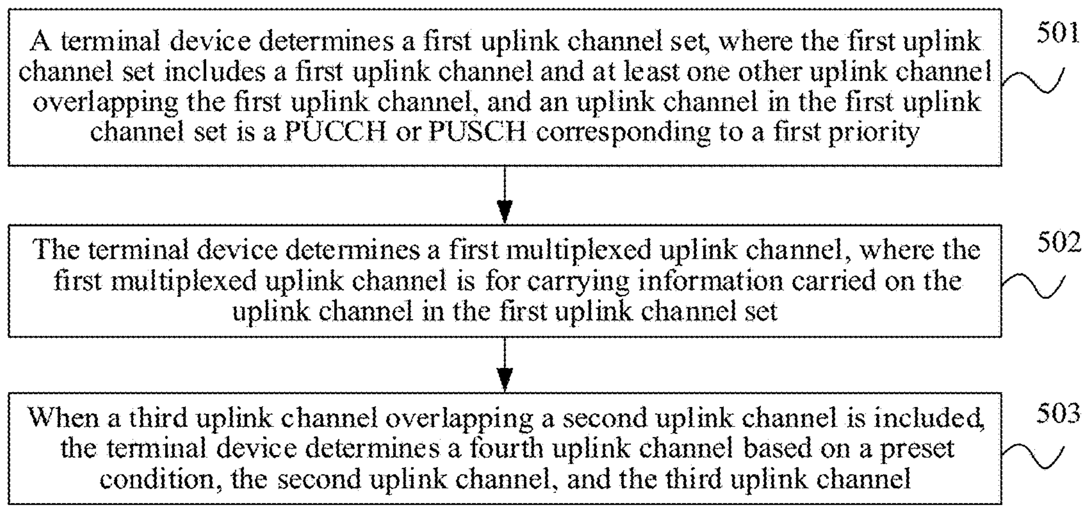
FIG. 10A is a flowchart of another channel processing method according to an embodiment of this application.

Refer to FIG. 10A. FIG. 10A is a flowchart of another channel processing method according to an embodiment of this application. As shown in FIG. 10A, the method includes the following steps.

501: A terminal device determines a first uplink channel set, where the first uplink channel set includes a first uplink channel and at least one other uplink channel overlapping the first uplink channel, and an uplink channel in the first uplink channel set is a PUCCH and/or PUSCH corresponding to a first priority.

502: The terminal device determines a second uplink channel, where the second uplink channel is for carrying some or all information carried on the uplink channel in the first channel set.

503: When a third uplink channel overlapping a second uplink channel is included, determine a fourth uplink channel, where the fourth uplink channel is for carrying information carried on the second uplink channel and the third uplink channel, or the fourth uplink channel is for carrying some information carried on the second uplink channel and the third uplink channel; the second uplink channel is at least one of the following: the first multiplexed uplink channel, at least one other uplink channel in the first uplink channel set, and an intermediate uplink channel that carries information on some uplink channels in the first uplink channel set; and the third uplink channel corresponds to the second priority, and the second priority is higher than the first priority.

In this embodiment of this application, the first uplink channel set may be first determined. The uplink channel in the first uplink channel set corresponds to the first priority (a low priority), and a PUCCH and a PUSCH are not distinguished. In other words, a low-priority uplink channel in the first uplink channel may include only an LP PUCCH, or may include only an LP PUSCH, or may include both an LP PUCCH and an LP PUSCH. Similarly, the uplink channel in the first uplink channel set is grouped by using the first uplink channel as a reference, and the first uplink channel may be an uplink channel that is earliest in time domain in a first target uplink channel set SET 3, or a channel that occupies a largest quantity of time domain resources in the first target uplink channel set, or a channel that is earliest in time domain and that occupies a largest quantity of time domain resources. Alternatively, the first channel may be a PUCCH that is in SET 3 and that is earliest in time domain and occupies a largest quantity of time domain resources, and the first target uplink channel set is a set including all low-priority uplink channels in a unit time.

Figure 10B:
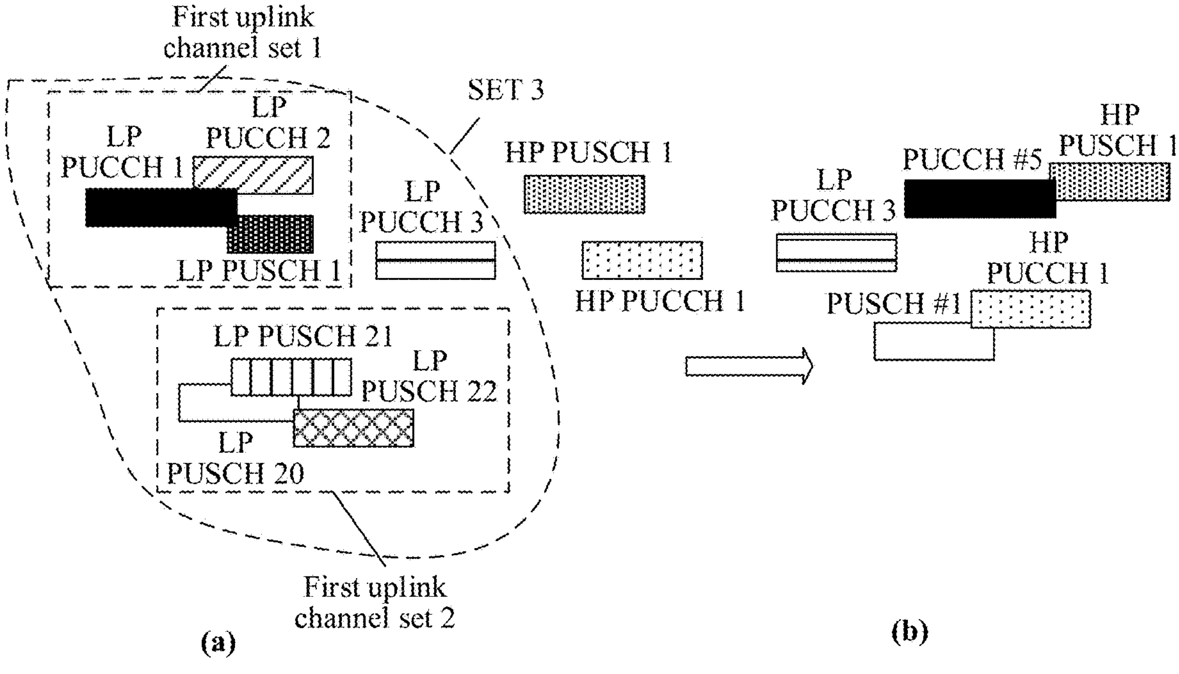
FIG. 10B is a schematic diagram of a first uplink channel set according to an embodiment of this application.

Specifically, refer to FIG. 10B. FIG. 10B is a schematic diagram of a first uplink channel set according to an embodiment of this application. As shown in (a) in FIG. 10B, first uplink channel set 1 includes first uplink channel 1, which is LP PUCCH 1. LP PUCCH 2 and LP PUSCH 1 are further included, where both PUCCH 2 and PUSCH 1 overlap PUCCH 1. There may be more than one first uplink channel set. Optionally, the first uplink channel set may be a plurality of sets divided from the first target uplink channel set. As shown in FIG. 10B, first uplink channel set 2 may be further included. Optionally, the first uplink channel set may be a plurality of sets iteratively obtained from the first target uplink channel set.

All uplink channels in the first uplink channel set are multiplexed, to obtain the first multiplexed uplink channel. In a multiplexing process, the LP PUCCH may be multiplexed first, and then the LP PUSCH is multiplexed. Because all uplink channels in the first uplink channel set are low-priority uplink channels, the first multiplexed uplink channel is also a low-priority uplink channel, and may be a low-priority PUCCH or a low-priority PUSCH. For example, correspondingly, PUCCH #5 is obtained after first uplink channel set 1 in FIG. 10B is multiplexed, and LP PUSCH #1 is obtained after first uplink channel set 2 is multiplexed.

The first multiplexed uplink channel obtained by multiplexing the uplink channel in the first uplink channel set may overlap another uplink channel that is not previously grouped into the first uplink channel set, or multiplexed uplink channels may overlap each other. The first multiplexed uplink channel and another low-priority uplink channel may be multiplexed again. For example, LP PUCCH #1 and LP PUSCH #1 may be multiplexed. For a multiplexing rule between the two channels, refer to the foregoing multiplexing rule between a low-priority PUCCH and a low-priority PUSCH.

Alternatively, after first uplink channel set 1 is multiplexed to obtain PUCCH #5, PUCCH #5 and a remaining PUCCH that is not multiplexed in the first target uplink channel set form a new first target uplink channel set SET 3', and it is determined whether there are still mutually overlapping uplink channels in the set. If there are still mutually overlapping uplink channels in the set, first uplink channel 2 is selected, first uplink channel set 2 is obtained through division, and a next round of multiplexing is performed until it is determined that the first target uplink channel set does not include mutually overlapping uplink channel.

The second uplink channel is determined. The second uplink channel may be: (1) for carrying some information carried on the uplink channel in the first channel set; or (2) for carrying all information carried on the uplink channel in the first channel set.

For the first case, the second uplink channel may carry information on a specific uplink channel in the first uplink channel set. Alternatively, the second uplink channel is for carrying information on an intermediate uplink channel obtained by multiplexing the uplink channel in the first uplink channel set. In other words, in this case, partial multiplexing is performed, and multiplexing of all channels in the set is not completed.

For the second case, the second uplink channel is for carrying information on the first multiplexed uplink channel, and the first multiplexed uplink channel is obtained by multiplexing all uplink channels in the first uplink channel set.

That the second uplink channel may overlap a high-priority uplink channel specifically includes: In a process of multiplexing the low-priority uplink channel, or after multiplexing of all first-priority uplink channels is completed, the high-priority uplink channel may overlap the low-priority uplink channel, that is, the second uplink channel overlaps the third uplink channel, and the third uplink channel is the high-priority uplink channel.

The second uplink channel and the third uplink channel overlap. Actually, when the third uplink channel is a PUCCH, step 503 may be divided into two steps.

5031: When the third uplink channel overlapping the second uplink channel is included, and the third uplink channel is a PUCCH with the second priority, if the second uplink channel and the third uplink channel meet a first multiplexing condition, determine a fourth uplink channel, where the fourth uplink channel is for carrying information carried on the second uplink channel and the third uplink channel, the second uplink channel is the first multiplexed uplink channel, and the second priority is higher than the first priority.

5032: When the third uplink channel overlapping the second uplink channel is included, and the third uplink channel is a PUCCH with the second priority, if the second uplink channel and the third uplink channel do not meet a first multiplexing condition, but meet a condition for cancelling sending of one uplink channel and retaining the other uplink channel, determine a fourth uplink channel, where the fourth uplink channel is for carrying some information carried on the second uplink channel and the third uplink channel, the second uplink channel is the first multiplexed uplink channel, at least one other uplink channel in the first uplink channel set, or an intermediate uplink channel that carries information on some uplink channels in the first uplink channel set, and the second priority is higher than the first priority.

A timeline relationship between the second uplink channel and the third uplink channel may be that the first multiplexing condition is met. In this case, multiplexing may be performed between the second uplink channel and the third uplink channel. Multiplexing when the third uplink channel is a PUCCH may be first processed. As described above, when the second uplink channel and the third uplink channel meet the first multiplexing condition, whether the second uplink channel is a channel obtained after multiplexing of all low-priority uplink channels is completed may be first determined. If the second uplink channel is not a channel obtained after multiplexing of all low-priority uplink channels is completed, the low-priority uplink channel is first multiplexed, to obtain the first multiplexed uplink channel as the second uplink channel, and then the second uplink channel is multiplexed with the third uplink channel.

In some cases, as shown in (b) in FIG. 10B, the multiplexed uplink channel PUSCH #1 overlaps HP PUCCH 1. It may be determined whether the two channels meet the first multiplexing condition, and if the two channels meet the first multiplexing condition, the two channels are multiplexed. If the first multiplexing condition is not met, but the condition for cancelling sending of one uplink channel and retaining the other uplink channel is met, sending of HP PUCCH 1 is cancelled, and sending of LP PUSCH #1 is retained, or sending of LP PUSCH #1 is cancelled, and sending of HP PUCCH 1 is retained.

Optionally, the multiplexed LP PUCCH and HP PUCCH may overlap. Similarly, the two channels are multiplexed when the first multiplexing condition is met. If the first multiplexing condition is not met, but the condition for cancelling sending of one uplink channel and retaining the other uplink channel is met, "eliminating one and retaining one" is performed. For example, sending of the LP PUCCH may be cancelled, and sending of the HP PUCCH may be retained; or sending of the HP PUCCH may be cancelled, and the LP PUCCH may be retained. Alternatively, a channel with later sending time in the LP PUCCH and the HP PUCCH is cancelled.

As described in the foregoing embodiment, the third uplink channel may be a plurality of HP PUCCHs that overlap the second uplink channel. When it is determined that the second uplink channel and the third uplink channel meet the multiplexing condition, it may be considered that the second uplink channel and all the third uplink channels meet the multiplexing condition. That is, if the second uplink channel and one of the plurality of third uplink channels do not meet the multiplexing condition, it is considered that the second uplink channel and the third uplink channels do not meet the multiplexing condition. Correspondingly, when either of the second uplink channel and the third uplink channel meets the condition for cancelling sending of one uplink channel and retaining the other uplink channel, "eliminating one and retaining one" between the second uplink channel and the third uplink channel is performed.

Alternatively, the third uplink channel may be an uplink channel that is earliest in time domain and/or a channel that occupies a largest quantity of time domain resources in the plurality of high-priority uplink channels that overlap the second uplink channel. Whether the multiplexing condition is met can be separately determined and processed for the two channels.

In addition, a problem of overlapping between a high-priority PUSCH and the second uplink channel further needs to be processed. Therefore, step 503 may further include the following steps. 5033: When the third uplink channel is a PUSCH corresponding to the second priority, determine whether there is another PUCCH that has the second priority and that overlaps the second uplink channel.

5034: If there is another PUCCH that has the second priority and that overlaps the second uplink channel, determine a fourth uplink channel, where the fourth uplink channel is for carrying all or some information on the second uplink channel and the another PUCCH with the second priority.

5035: If there is no PUCCH that has the second priority and that overlaps the second uplink channel, determine a fourth uplink channel, where the fourth uplink channel is for carrying all or some information on the second uplink channel and the third uplink channel.

In some cases, as shown in (b) in FIG. 10B, the multiplexed uplink channel LP PUCCH #5 overlaps HP PUSCH 1. It is determined whether the two channels meet the first multiplexing condition, and if the two channels meet the first multiplexing condition, the two channels are multiplexed. If the multiplexing condition is not met, but the condition for cancelling sending of one uplink channel and retaining the other uplink channel is met, sending of LP PUCCH #5 is cancelled, and sending of HP PUSCH 1 is retained.

Optionally, when it is determined that PUCCH #5 overlaps HP PUSCH 1, it may be first determined whether another HP PUCCH overlaps PUCCH #5. If no other PUCCH overlaps PUCCH #5, PUCCH #5 and HP PUSCH 1 are multiplexed when it is determined that the two channels meet the first multiplexing condition. When it is determined that the two channels do not meet the multiplexing condition, but meet the condition for cancelling sending of one uplink channel and retaining the other uplink channel, "eliminating one and retaining one" between the two channels may be performed. For details, refer to "'eliminating one and retaining one' between a low-priority uplink channel and a high-priority uplink channel" described above. If another PUCCH overlaps PUCCH #5, a problem of overlapping between the another HP PUCCH and PUCCH #5 is first processed, to determine the fourth uplink channel. If the fourth uplink channel and HP PUSCH 1 still overlap, overlapping processing between the two channels is performed.

It should be noted that, generally, a case in which LP PUSCH #1 and the HP PUSCH overlap does not occur, and the network device may avoid using this invoking manner.

It can be learned that, in this embodiment of this application, all low-priority uplink channels are grouped into the first uplink channel set for processing, to obtain the first multiplexed uplink channel, and then the first multiplexed uplink channel and the overlapping high-priority uplink channel are processed. In this way, after all low-priority uplink channels are multiplexed, the problem of overlapping with the high-priority uplink channel is processed, thereby reducing a probability of cross-priority processing of the uplink channel overlapping problem, reducing complexity and time consumption of uplink channel processing, and improving processing efficiency.

Consistent with that overlapping uplink channels with a low priority are divided into a set for processing, uplink channels with a high priority may also be divided into a set for overlapping processing, and then an overlapping problem between uplink channels with different priorities is processed. That is, the foregoing high-priority third uplink channel that overlaps the second uplink channel may be an uplink channel generated by multiplexing a plurality of overlapping high-priority uplink channels.

Optionally, before step 503, the method may further include step 504: Determine the third uplink channel, where the third uplink channel is a second multiplexed uplink channel, where the second multiplexed uplink channel is for carrying information on the uplink channel in the second uplink channel set, and/or the third uplink channel is an intermediate uplink channel that carries information carried on some uplink channels in the second uplink channel set, and the uplink channel in the second uplink channel set is an uplink channel corresponding to the second priority.

The second uplink channel set includes a fifth uplink channel and at least one other uplink channel that overlaps the fifth uplink channel, and the uplink channel in the second uplink channel set corresponds to the second priority. The method further includes: determining a second multiplexed uplink channel, where the second multiplexed uplink channel is for carrying information on the uplink channel in the second uplink channel set.

Figures 10C, 11A:
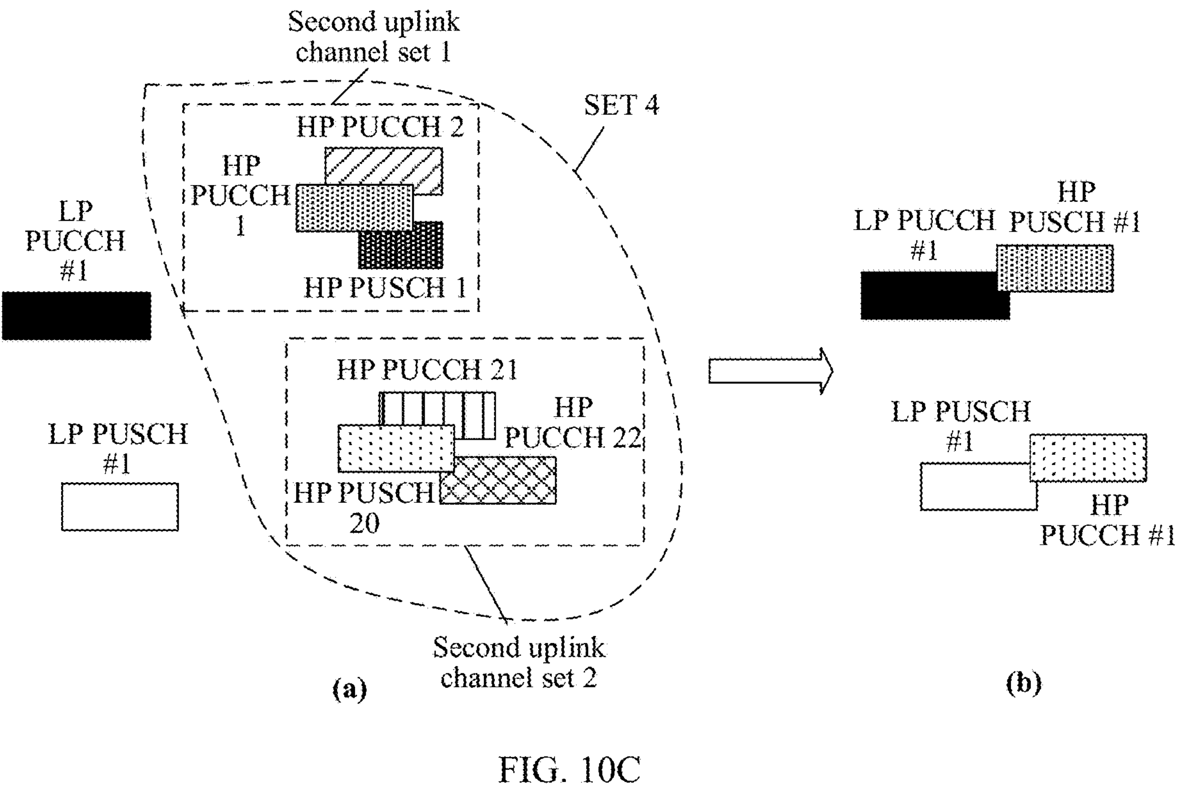
FIG. 10C is a schematic diagram of a second uplink channel set according to an embodiment of this application.
FIG. 11A is a flowchart of a channel processing method according to an embodiment of this application.

Consistent with that overlapping uplink channels with a low priority are divided into a set for processing, overlapping uplink channels with a high priority may also be divided into a set for processing, and then an overlapping problem between different priorities is processed. That is, the foregoing high-priority third uplink channel that overlaps the second uplink channel may be an uplink channel generated by multiplexing a plurality of overlapping high-priority uplink channels. Specifically, refer to FIG. 10C. FIG. 10C is a schematic diagram of a second uplink channel set according to an embodiment of this application. As shown in FIG. 10C, the second uplink channel set is first determined by using the fifth uplink channel as a reference. The fifth uplink channel is a high-priority PUCCH or PUSCH, and the fifth uplink channel may be an uplink channel that is earliest in time domain in a second target uplink channel set SET 4, or a channel that occupies a largest quantity of time domain resources in the second target uplink channel set, or a channel that is earliest in time domain and that occupies a largest quantity of time domain resources. Alternatively, the first channel may be a PUCCH that is in SET 3 and that is earliest in time domain and occupies a largest quantity of time domain resources, and the second target uplink channel set is a set including all high-priority uplink channels in a unit time.

Corresponding to HP PUCCH 1 in FIG. 10C, the second uplink channel set may further include at least one high-priority uplink channel that overlaps the fifth uplink channel. As shown in FIG. 10C, second uplink channel set 1 further includes HP PUCCH 2 and HP PUSCH 1, where both HP PUCCH 2 and HP PUSCH 1 overlap HP PUCCH 1. There may be more than one second uplink channel set. Optionally, the second uplink channel set may be a plurality of sets divided from the second target uplink channel set, for example, second uplink channel set 2 in FIG. 10C. Optionally, the second uplink channel set may be a plurality of sets iteratively obtained from the second target uplink channel set.

Uplink channels in the second uplink channel set are multiplexed, to obtain the second multiplexed uplink channel. Overlapping between HP PUCCHs in the second uplink channel set may be first processed, and then overlapping between the HP PUCCH and the HP PUSCH is processed. The second multiplexed uplink channel may be an HP PUCCH or an HP PUSCH. For example, in FIG. 10C, the second multiplexed uplink channel obtained after the uplink channel in second uplink channel set 1 is multiplexed is HP PUSCH #1, and the second multiplexed uplink channel obtained after the uplink channel in second uplink channel set 2 is multiplexed is HP PUCCH #1.

The third uplink channel overlaps the second uplink channel. The third uplink channel may be the second multiplexed uplink channel, or may be an intermediate uplink channel obtained by multiplexing the fifth uplink channel and some uplink channels in the second uplink channel set. That is, the uplink channel in the second uplink channel set has not been completely multiplexed, and a time-frequency position at which the network device invokes the second uplink channel overlaps a time-frequency position of the intermediate uplink channel. It should be noted that, in this case, the second uplink channel may be determined as the first multiplexed uplink channel. To be specific, if the uplink channel in the first uplink channel set overlaps the third uplink channel, and the first multiplexing condition is met, an overlapping problem between the two channels may not be processed first, but it is first ensured that multiplexing in the first uplink channel set is completed. If multiplexing is not completed, multiplexing is continued until the first multiplexed uplink channel is obtained. An uplink channel that is not multiplexed in the first uplink channel set and an intermediate uplink channel obtained by multiplexing some uplink channels may overlap the third uplink channel. However, after all uplink channels in the first uplink channel set are multiplexed, the channel may no longer overlap the third uplink channel. Therefore, an overlapping problem between the channels may not be processed first.

Similarly, in this case, the third uplink channel may be determined as the second multiplexed uplink channel. To be specific, if the uplink channel in the first uplink channel set overlaps the third uplink channel, and the first multiplexing condition is met, an overlapping problem between the two channels may not be processed first, but it is first ensured that multiplexing in the second uplink channel set is completed. If multiplexing is not completed, multiplexing is continued until the second multiplexed uplink channel is obtained. Then, overlapping processing with the second uplink channel is performed.

The overlapping processing between the second uplink channel and the third uplink channel is overlapping processing between a low-priority uplink channel and a high-priority uplink channel. For details, refer to the foregoing related descriptions. Details are not described herein again.

After the fourth uplink channel is determined, the method may further include 507: If there is a sixth uplink channel overlapping the fourth uplink channel, determine a seventh uplink channel, where the seventh uplink channel is for carrying information on the fourth uplink channel and information carried on the sixth uplink channel, or information on the fourth uplink channel and some information carried on the sixth uplink channel.

In this embodiment of this application, the fourth uplink channel is an uplink channel obtained by multiplexing a low-priority uplink channel and a high-priority uplink channel, that is, a "hybrid-priority" uplink channel. The sixth uplink channel may be a high-priority uplink channel, or may be a low-priority uplink channel. When the sixth uplink channel is a low-priority uplink channel, if the fourth uplink channel and the sixth uplink channel meet the multiplexing condition, the fourth uplink channel and the sixth uplink channel may be multiplexed. Because the fourth uplink channel carries information on a high-priority uplink channel, when the fourth uplink channel is multiplexed with the low-priority sixth uplink channel, the fourth uplink channel may be equivalent to a high-priority uplink channel. For a specific multiplexing rule of the two uplink channels, refer to the foregoing manner of "multiplexing between a low-priority uplink channel and a high-priority uplink channel". Details are not described herein again.

When the fourth uplink channel and the sixth uplink channel do not meet the multiplexing condition, and meet a condition for cancelling sending of one uplink channel and retaining the other uplink channel, "eliminating one and retaining one" between the two uplink channels may be performed. For a specific rule, refer to "eliminating one and retaining one' between a 'hybrid-priority' uplink channel and a low-priority uplink channel" described above. Details are not described herein again.

It can be learned that, in this embodiment of this application, a "hybrid-priority" uplink channel (the fourth uplink channel) obtained through multiplexing may overlap the sixth uplink channel. Similarly, the fourth uplink channel and the sixth uplink channel may be multiplexed, or "eliminating one and retaining one" between the fourth uplink channel and the sixth uplink channel may be performed. This process provides a processing manner for the "hybrid-priority" uplink channel and each of a high-priority uplink channel and a low-priority uplink channel, to ensure sending of more important and more uplink control information and/or uplink data as much as possible, thereby further improving sending efficiency of the uplink control information and/or the uplink data.

It can be learned that in this embodiment of this application, the overlapping low-priority uplink channels are grouped into the first uplink channel set for multiplexing to obtain the first multiplexed uplink channel, the overlapping high-priority uplink channels are grouped into the second uplink channel set for multiplexing to obtain the second multiplexed uplink channel, and then overlapping processing is performed between the first multiplexed uplink channel and the second multiplexed uplink channel. This further reduces frequency of cross-priority uplink channel processing, reduces complexity and time consumption of uplink channel processing, and improves processing efficiency.

After the fourth uplink channel is determined, the method may further include 506: If there is a sixth uplink channel overlapping the fourth uplink channel, determine a seventh uplink channel, where the seventh uplink channel is for carrying information on the fourth uplink channel and information carried on the sixth uplink channel, or information on the fourth uplink channel and some information carried on the sixth uplink channel.

In this embodiment of this application, the fourth uplink channel is an uplink channel obtained by multiplexing a low-priority uplink channel and a high-priority uplink channel, that is, a "hybrid-priority" uplink channel. The sixth uplink channel may be a high-priority uplink channel, or may be a low-priority uplink channel. When the sixth uplink channel is a low-priority uplink channel, if the fourth uplink channel and the sixth uplink channel meet the multiplexing condition, the fourth uplink channel and the sixth uplink channel may be multiplexed. Because the fourth uplink channel carries information on a high-priority uplink channel, when the fourth uplink channel is multiplexed with the low-priority sixth uplink channel, the fourth uplink channel may be equivalent to a high-priority uplink channel. For a specific multiplexing rule of the two uplink channels, refer to the foregoing manner of "multiplexing between a low-priority uplink channel and a high-priority uplink channel". Details are not described herein again.

When the fourth uplink channel and the sixth uplink channel do not meet the multiplexing condition, and meet a condition for cancelling sending of one uplink channel and retaining the other uplink channel, "eliminating one and retaining one" between the two uplink channels may be performed. For a specific rule, refer to "'eliminating one and retaining one' between a 'hybrid-priority' uplink channel and a low-priority uplink channel" described above. Details are not described herein again.

It can be learned that, in this embodiment of this application, a "hybrid-priority" uplink channel (the fourth uplink channel) obtained through multiplexing may overlap the sixth uplink channel. Similarly, the fourth uplink channel and the sixth uplink channel may be multiplexed, or "eliminating one and retaining one" between the fourth uplink channel and the sixth uplink channel may be performed. This process provides a processing manner for the "hybrid-priority" uplink channel and each of a high-priority uplink channel and a low-priority uplink channel, to ensure sending of more important and more uplink control information and/or uplink data as much as possible, thereby further improving sending efficiency of the uplink control information and/or the uplink data.

In a possible case, the first uplink channel set may be an empty set, and the second uplink channel may also be an empty set. In other words, there are no mutually overlapping low-priority uplink channels, and/or there are no mutually overlapping high-priority uplink channels. In this case, overlapping processing is separately performed on the overlapping low-priority uplink channel and the overlapping high-priority uplink channel.

In the foregoing embodiments, the method described is to perform overlapping processing for a same priority first by dividing the set, and then perform cross-priority overlapping processing. Actually, the uplink channels may alternatively be grouped into the set based on types for processing, and then overlapping processing is performed on different types of uplink channels. Specifically, refer to FIG. 11A. FIG. 11A is a flowchart of a channel processing method according to an embodiment of this application. As shown in FIG. 11A, the method includes the following procedure.

601: A terminal device determines a first uplink channel set, where the first uplink channel set includes a first uplink channel and at least one other uplink channel overlapping the first uplink channel, each uplink channel in the first uplink channel set is a PUCCH, an uplink channel in the first uplink channel set corresponds to a first priority and/or a second priority, and the second priority is higher than the first priority.

Optionally, all uplink channels included in the first uplink channel set have a high priority. Optionally, all uplink channels included in the first uplink channel set have a low priority. Optionally, uplink channels included in the first uplink channel set have a high priority and a low priority.

602: The terminal device determines a second uplink channel, where the second uplink channel is for carrying information carried on some uplink channels in the first uplink channel set, or the second uplink channel is for carrying information carried on all uplink channels in the first uplink channel set.

In this embodiment of this application, the first uplink channel set may be first determined. The first uplink channel set includes the first uplink channel and a PUCCH that overlaps the first uplink channel, regardless of whether the PUCCH has the second priority (a high priority) or the first priority (a low priority).

Optionally, all uplink channels other than the first uplink channel included in the first uplink channel set overlap the first uplink channel.

Figure 11B:
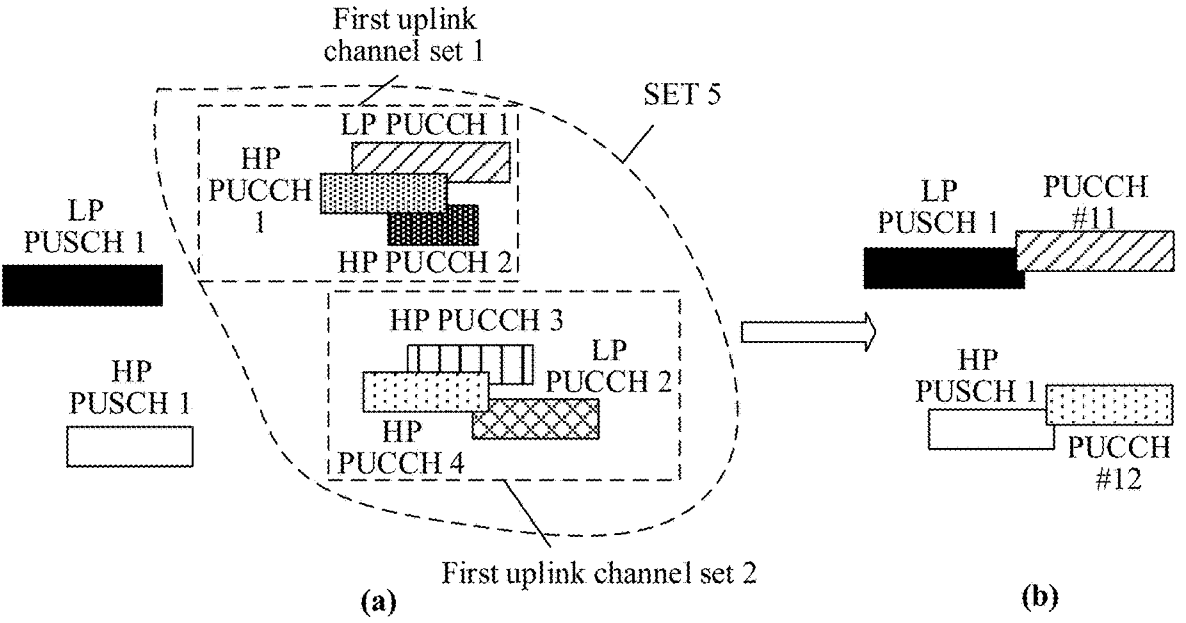
FIG. 11B is a schematic diagram of a first uplink channel set according to an embodiment of this application.

Specifically, refer to FIG. 11B. FIG. 11B is a schematic diagram of a first uplink channel set according to an embodiment of this application. As shown in FIG. 11B, first uplink channel set 1 includes first uplink channel 1, which is corresponding to LP PUCCH 1. The first uplink channel set further includes HP PUCCH 1 and HP PUCCH 2, which are uplink channels overlapping LP PUCCH 1.

Optionally, the method further includes: determining the first uplink channel, where the first uplink channel meets at least one of the following: The first uplink channel is an uplink channel that is earliest in time domain in a target uplink channel set, or the first uplink channel is a channel that occupies a largest quantity of time domain resources in a target uplink channel set, or a second-priority channel. The target uplink channel set is a set including all PUCCHs in one time unit.

In other words, all PUCCHs in one time unit may form a target uplink channel set, and the first uplink channel is determined from the target uplink channel set. The first uplink channel may be an uplink channel that is earliest in time domain, a channel that occupies a largest quantity of time domain resources, or a channel that is earliest in time domain and that occupies a largest quantity of time domain resources in the target uplink channel set. Alternatively, the first uplink channel may be a channel that is earliest in time domain, a channel that occupies a largest quantity of time domain resources, or a channel that is earliest in time domain and that occupies a largest quantity of time domain resources in second-priority PUCCHs.

HP PUCCH 4 in FIG. 11B is an uplink channel that is earliest in time domain, or a channel that occupies a largest quantity of time domain resources. For example, LP PUCCH 1 in FIG. 11B may be used as the first uplink channel.

After the first uplink channel set is determined, the uplink channel in the first uplink channel set is processed. If the uplink channel in the first uplink channel set meets the first multiplexing condition, the uplink channel in the first uplink channel set is multiplexed.

It should be noted that there are two meanings for determining whether the uplink channel in the first uplink channel set meets the multiplexing condition: (1) Determine whether the first uplink channel and all other uplink channels in the first uplink channel set meet the multiplexing condition.

When it is determined that the first uplink channel and another uplink channel in the first uplink channel set meet the multiplexing condition, it may be considered that the first uplink channel and all the other uplink channels meet the multiplexing condition. In other words, if the first uplink channel and one of a plurality of other uplink channels do not meet the multiplexing condition, it is considered that the first uplink channel and the another uplink channel do not meet the multiplexing condition.

When the first uplink channel and the another uplink channel in the first uplink channel set meet the multiplexing condition, all uplink channels in the first uplink channel set are multiplexed. PUCCHs with a same priority may be directly multiplexed. For details about multiplexing between PUCCHs with different priorities, refer to “multiplexing between a low-priority PUCCH and a high-priority PUCCH” described above or another multiplexing method. This is not limited in this application.

In this case, the second uplink channel obtained through multiplexing carries information carried on the uplink channel in the first uplink channel set.

(2) Determine whether the first uplink channel and the $i^{th}$ uplink channel in the first uplink channel set meet the multiplexing condition. The $i^{th}$ channel may be an uplink channel other than the first uplink channel in the first uplink channel set, and may be specifically an uplink channel that is earliest in time domain other than the first uplink channel, a channel that occupies a largest quantity of time domain resources, or a channel that is earliest in time domain and that occupies a largest quantity of time domain resources. Alternatively, the first uplink channel may be a channel that is earliest in time domain, a channel that occupies a largest quantity of time domain resources, or a channel that is earliest in time domain and that occupies a largest quantity of time domain resources in second-priority PUCCHs.

In this case, processing is performed separately according to whether the two channels meet the first multiplexing condition.

Similarly, PUCCHs with a same priority may be directly multiplexed. For multiplexing between PUCCHs with different priorities, refer to “multiplexing between a low-priority PUCCH and a high-priority PUCCH” described above or another multiplexing manner.

In this case, because the two overlapping uplink channels may no longer overlap some uplink channels in the first uplink channel set after multiplexing, the second uplink channel obtained through multiplexing carries information carried on some uplink channels in the first uplink channel set.

Possibly, when the uplink channel in the first uplink channel set does not meet the first multiplexing condition, but meets the condition for cancelling sending of one uplink channel and retaining the other uplink channel, a “high eliminating low” operation may be performed on the uplink channel in the set.

Possibly, when the “high eliminating low” operation is performed, processing is performed between every two overlapping uplink channels. For example, if the first uplink channel and each of the $i^{th}$ uplink channel and the $(i+1)^{th}$ uplink channel in the first uplink channel set do not meet the first multiplexing condition, but meet the condition for cancelling sending of one uplink channel and retaining the other uplink channel, a “high eliminating low” operation on the first uplink channel and one of the uplink channels may be first processed, and then overlapping processing is performed based on a subsequent situation.

In a possible case, after “high eliminating low” is performed on the uplink channel in the first uplink channel set, some uplink channels are retained in the first uplink channel set, and the second uplink channel belongs to the retained uplink channels. In a possible case, the retained uplink channels are one uplink channel, and information carried on some uplink channels in the first uplink channel set that is carried on the second uplink channel is information carried on the uplink channel.

For example, in FIG. 11B, if LP PUCCH 1 and HP PUCCH 1 do not meet a multiplexing timeline, sending of LP PUCCH 1 is cancelled, HP PUCCH 1 is retained, and the second uplink channel is determined as HP PUCCH 1.

In a possible case, after sending of the first uplink channel in the first uplink channel set is cancelled, if remaining uplink channels in the first uplink channel set do not overlap each other, or there is no uplink channel overlapping all other uplink channels, it may be considered that processing of the first uplink channel set is completed. Subsequently, the first uplink channel set is re-determined, and overlapping processing is performed on the PUCCH in the set.

After all overlapping PUCCHs with different priorities are processed, the obtained second uplink channel may be a low-priority PUCCH, a high-priority PUCCH, or a “hybrid-priority” PUCCH that includes both high-priority UCI on a high-priority PUCCH and low-priority UCI on a low-priority PUCCH.

Optionally, the second uplink channel and the fifth uplink channel overlap, and the method further includes: when the second uplink channel and the fifth uplink channel meet a first multiplexing condition, determining that the sixth uplink channel is for carrying information on the second uplink channel and information on the fifth uplink channel.

Optionally, the second uplink channel and the fifth uplink channel overlap, and the method further includes: when the second uplink channel and the fifth uplink channel do not meet the first multiplexing condition, but meet the condition for cancelling sending of one uplink channel and retaining the other uplink channel, determining that the sixth uplink channel is for carrying information on the second uplink channel and some information on the fifth uplink channel.

After the uplink channel in the first uplink channel set is processed to obtain the second uplink channel, the fifth uplink channel may further overlap the second uplink channel. The fifth uplink channel may be a low-priority uplink channel, or may be a high-priority uplink channel. When the second uplink channel is not a "hybrid-priority" PUCCH, there may be the following several cases.

The second uplink channel and the fifth uplink channel are uplink channels with a same priority, and may be directly multiplexed. The sixth uplink channel is for carrying information on the second uplink channel and information on the fifth uplink channel.

When the second uplink channel and the fifth uplink channel are uplink channels with different priorities and meet the first multiplexing condition, the second uplink channel and the fifth uplink channel may be multiplexed. For a specific multiplexing manner, refer to related descriptions of "multiplexing between a low-priority uplink channel and a high-priority uplink channel", and details are not described herein again. The sixth uplink channel is for carrying information on the second uplink channel and information on the fifth uplink channel.

When the second uplink channel and the fifth uplink channel are uplink channels with different priorities, do not meet the first multiplexing condition, and meet the condition for cancelling sending of one uplink channel and retaining the other uplink channel, "high eliminating low" is performed between the two uplink channels. The sixth uplink channel is for carrying information on the second uplink channel and some information on the fifth uplink channel.

When the second uplink channel is a "hybrid-priority" PUCCH, there may be the following several cases.

If the second uplink channel and the fifth uplink channel do not meet the first multiplexing condition, processing may be performed according to any one or more of the following methods.

(1) It is assumed that the fifth uplink channel is a high-priority PUSCH.

The second uplink channel is a "hybrid-priority" PUCCH, that is, the second uplink channel includes both the first UCI with a low priority and second UCI with a high priority. A processing manner includes the following.

a. Cancel sending of the second uplink channel, and retain the fifth uplink channel. The sixth uplink channel is the fifth uplink channel.

b. Cancel sending of the first UCI on the second uplink channel, and multiplex the second UCI and the fifth uplink channel, to obtain a sixth uplink channel, where the sixth uplink channel carries the second UCI and information on the fifth uplink channel.

c. Determine whether the second uplink channel and the fifth uplink channel meet a second multiplexing condition, where the second multiplexing condition may correspond to a second multiplexing timeline, which indicates that after sending of the low-priority UCI on the "hybrid-priority" uplink channel is cancelled, the high-priority UCI on the "hybrid-priority" uplink channel may be multiplexed with the high-priority uplink channel. In an understandable manner, if there is enough time for multiplexing the high-priority UCI and the high-priority uplink channel, the high-priority UCI and the high-priority uplink channel may be multiplexed. The second multiplexing timeline and the first multiplexing timeline may be different values, and the first multiplexing timeline correspondingly meets the first multiplexing condition.

If the second uplink channel and the fifth uplink channel meet the second multiplexing condition, sending of the first UCI on the second uplink channel is cancelled, and the second UCI and the fifth uplink channel are multiplexed, to obtain the sixth uplink channel, where the sixth uplink channel carries the second UCI and information on the fifth uplink channel.

If the second uplink channel and the fifth uplink channel do not meet the second multiplexing condition, sending of the second uplink channel is cancelled, and the fifth uplink channel is retained. The sixth uplink channel is the fifth uplink channel.

(2) It is assumed that the fifth uplink channel is a high-priority PUCCH.

It is assumed that the second uplink channel is a "hybrid-priority" PUCCH, that is, the second uplink channel includes both the first UCI with a low priority and second UCI with a high priority. A processing manner includes one or more of the following.

a. Cancel sending of a channel with a lower information priority in the second UCI and the UCI carried on the fifth uplink channel, where the information priority meets: ACK>CSI>SR, where > indicates that the priority is higher. For example, if the second UCI is an SR, and the UCI carried on the fifth uplink channel is an ACK, sending of the second uplink channel is cancelled, and the fifth uplink channel is retained. The sixth uplink channel is the fifth uplink channel.

b. Cancel sending of a channel with later sending time in the second uplink channel and the fifth uplink channel. For example, if sending time of the second uplink channel is later than sending time of the fifth uplink channel, sending of the second uplink channel is cancelled, and the fifth uplink channel is retained.

c. Cancel sending of the fifth uplink channel, and retain the second uplink channel. It may be considered that the second uplink channel that carries more uplink channel information has a higher priority. The sixth uplink channel is the second uplink channel.

d. Cancel sending of the first UCI, and multiplex the second UCI and the fifth uplink channel, to generate a sixth uplink channel, where the sixth uplink channel carries the second UCI and the fifth uplink channel.

e. Determine whether the second uplink channel and the fifth uplink channel meet the second multiplexing condition, and if the second uplink channel and the fifth uplink channel meet the second multiplexing condition, cancel sending of the first UCI on the second uplink channel, and multiplex the second UCI and the fifth uplink channel, to obtain the sixth uplink channel, where the sixth uplink channel carries the second UCI and information on the fifth uplink channel.

If the second uplink channel and the fifth uplink channel do not meet the second multiplexing condition, sending of the second uplink channel is cancelled, and the fifth uplink channel is retained. The sixth uplink channel is the fifth uplink channel.

(3) It is assumed that the fifth uplink channel is a low-priority uplink channel.

Sending of the fifth uplink channel is cancelled.

It may be understood that the first uplink channel set may be an empty set, that is, there are no overlapping PUCCHs. In this case, processing between the overlapping PUCCH and the overlapping PUSCH may be directly performed.

After obtaining the sixth uplink channel, the terminal device may send the sixth uplink channel to the network device. The network device determines, based on the scheduling information generated and sent to the terminal device, a time-frequency position of the uplink information to be sent by the terminal device, and receives the uplink channel at the corresponding time-frequency position.

It can be learned that, in this embodiment of this application, overlapping between PUCCHs is first processed, including processing of PUCCHs with a same priority or processing of PUCCHs with different priorities. Because information carried on the PUCCH is uplink control information, two channels can be better multiplexed, or priorities of the two channels can be better determined, thereby improving pertinence and effectiveness of uplink channel overlapping processing. In addition, after overlapping processing on all PUCCHs is completed, overlapping processing with the PUSCH is performed. This can reduce unnecessary PUSCH channel processing as much as possible, and improve uplink data transmission efficiency.

701: A terminal device determines target uplink channel set A and target uplink channel set B. An uplink channel in target uplink channel set A corresponds to a first priority. An uplink channel in target uplink channel set B corresponds to a second priority.

A manner of determining target uplink channel set A and target uplink channel set B may also be understood as a manner of obtaining target uplink channel set A and target uplink channel set B. For the obtaining manner, refer to the manner of determining the first uplink channel set in step 301, or the manner of determining the target uplink channel set in step 301. Details are not described herein again.

For example, if there is one first-priority uplink channel in one time unit, the first-priority uplink channel is target uplink channel set A. If there are a plurality of first-priority uplink channels in one time unit, the plurality of first-priority uplink channels form target uplink channel set A. If there is one second-priority uplink channel in one time unit, the second-priority uplink channel is target uplink channel set A. If there are a plurality of second-priority uplink channels in one time unit, the plurality of second-priority uplink channels form target uplink channel set A. In other words, all first-priority uplink channels in one time unit form target uplink channel set A. All second-priority uplink channels in one time unit form target uplink channel set B.

In an optional manner, a first-priority uplink channel in one time unit forms target uplink channel set A. A second-priority uplink channel in one time unit forms target uplink channel set B.

In an optional manner, the uplink channel is a PUCCH, that is, a first-priority PUCCH in one time unit forms target uplink channel set A. A second-priority PUCCH in one time unit forms target uplink channel set B.

In an implementation, the uplink channel included in target uplink channel set A is a PUCCH. Optionally, the uplink channel included in target uplink channel set B is a PUCCH.

702: The terminal device determines at least one uplink channel C and at least one uplink channel D.

For the at least one uplink channel C, the at least one uplink channel C is obtained based on target uplink channel set A. Alternatively, the at least one uplink channel C is an uplink channel obtained by multiplexing target uplink channel set A. The at least one uplink channel C is for carrying some or all information carried on the uplink channel in target uplink channel set A. A process in which the terminal device determines the at least one uplink channel C and the at least one uplink channel D may also be understood as a multiplexing process of uplink channels with a same priority.

In an implementation, the uplink channel in the at least one uplink channel C may be an uplink channel included in target uplink set A.

Optionally, an uplink channel C in the at least one uplink channel C may be an uplink channel other than the uplink channel included in target uplink channel set A. In this case, it may also be understood that the at least one uplink channel C is an uplink channel obtained by multiplexing two or more uplink channels in the uplink channel set.

In an implementation, the at least one uplink channel C is one uplink channel, and the terminal device processes target uplink channel set A to obtain one uplink channel C. In this case, the uplink channel C is a processed uplink channel.

In another implementation, the at least one uplink channel C includes a plurality of channels, and any two of a plurality of uplink channels C do not overlap. In this case, it may also be understood that the terminal device processes target uplink channel set A, to finally obtain a plurality of uplink channels that do not overlap each other, that is, the at least one uplink channel C.

Further, if the uplink channels included in target uplink channel set A do not overlap, the at least one uplink channel C is the uplink channel in target uplink channel set A. Specifically, that the uplink channels do not overlap may be understood as that any two uplink channels do not overlap.

For the at least one uplink channel D, the at least one uplink channel D is obtained based on target uplink channel set B. Alternatively, the at least one uplink channel D is an uplink channel obtained by multiplexing target uplink channel set B. The uplink channel D is for carrying some or all information carried on the uplink channel in target uplink channel set B. For a relationship between the at least one uplink channel D and target uplink channel set B, refer to the relationship between the at least one uplink channel C and target uplink channel set A. Details are not described herein again.

The at least one uplink channel C and the at least one uplink channel D meet a multiplexing condition. The at least one uplink channel C overlaps the at least one uplink channel D.

In an implementation, when the at least one uplink channel C overlaps the at least one uplink channel D, the terminal device determines whether the at least one uplink channel C and the at least one uplink channel D meet a multiplexing condition.

In an implementation, the terminal device does not expect that the at least one uplink channel C and the at least one uplink channel D overlap, and the at least one uplink channel C and the at least one uplink channel D do not meet a multiplexing condition.

Correspondingly, for the network device, it may also be understood that the network device cannot schedule the at least one uplink channel C and the at least one uplink channel D to overlap, and the at least one uplink channel C and the at least one uplink channel D do not meet the multiplexing condition.

The multiplexing condition may be the multiplexing timeline timeline #1, or a multiplexing timeline relationship of uplink channels with different priorities, or a multiplexing timeline relationship of uplink channels with a same priority, or another multiplexing timeline condition. This is not limited in this patent.

It should be noted that, further, if the uplink channel in target uplink channel set A and uplink channels with different priorities in target uplink channel set B overlap, the overlapping uplink channels with different priorities may meet the multiplexing condition, or may not meet the multiplexing condition. Alternatively, the multiplexing condition may take effect for only multiplexed uplink channels with different priorities. For example, when the multiplexing condition may take effect for only multiplexed uplink channels with different priorities, if uplink channel A1 belongs to target uplink channel set A, and uplink channel B1 belongs to target uplink channel set B, before the terminal device determines the at least one uplink channel C and the at least one uplink channel D, if uplink channel A1 and uplink channel B1 overlap, uplink channel A1 and uplink channel B1 may meet the multiplexing condition, or may not meet the multiplexing condition. After the terminal device determines the at least one uplink channel C and the at least one uplink channel D, if the uplink channel C and the uplink channel D overlap, the uplink channel C and the uplink channel D need to meet the multiplexing condition. For another example, if uplink channel A1 belongs to target uplink channel set A, uplink channel B1 belongs to target uplink channel set B, the at least one uplink channel C does not include uplink channel A1, and the at least one uplink channel D does not include uplink channel B1, when uplink channel A1 and uplink channel B1 overlap, the multiplexing condition may be met or the multiplexing condition may not be met. When the uplink channel C and the uplink channel D overlap, the multiplexing condition needs to be met. Based on the foregoing manner, only channels obtained through multiplexing are required to meet the multiplexing condition, thereby reducing a scheduling limitation of the network device on an uplink channel.

Figure 15:
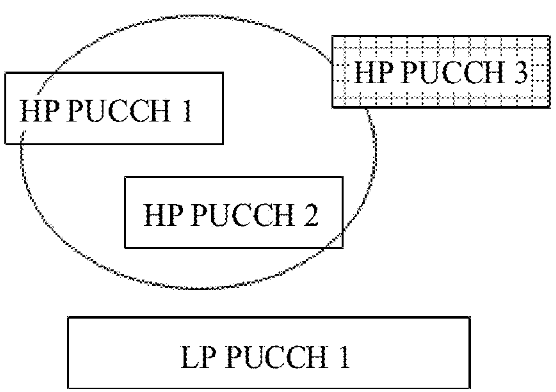
FIG. 15 is a schematic diagram of channel processing according to an embodiment of this application.

As shown in FIG. 15, target uplink channel set A includes a low-priority PUCCH, that is, LP PUCCH 1 shown in the figure. Target uplink channel set B includes high-priority PUCCHs, that is, HP PUCCH 1 and HP PUCCH 2 shown in the figure. The target uplink channel set A includes only one uplink channel LP PUCCH 1. Therefore, the uplink channel C obtained through processing is LP PUCCH 1. The two uplink channels included in target uplink channel set B overlap, and HP PUCCH 1 and HP PUCCH 2 are multiplexed to obtain HP PUCCH 3, that is, HP PUCCH 3 shown in the figure is the uplink channel D.

If HP PUCCH 3 and LP PUCCH 1 overlap, HP PUCCH 3 and LP PUCCH 1 need to meet the timeline relationship. Even if HP PUCCH 1 and/or HP PUCCH 2 and LP PUCCH 1 overlap, the channels may meet the timeline relationship, or may not meet the timeline relationship.

703: The terminal device multiplexes the uplink channel C and the uplink channel D.

Optionally, for a specific multiplexing manner, refer to "multiplexing between a low-priority uplink channel and a high-priority uplink channel" described above.

Figure 12:
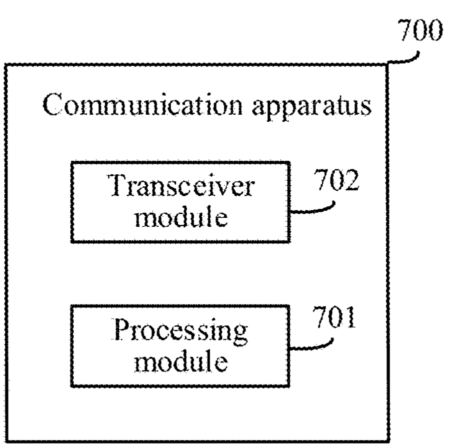
FIG. 12 is a block diagram of a structure of a communication apparatus according to an embodiment of this application.

FIG. 12 shows a communication apparatus 700 according to an embodiment of this application. The communication apparatus 700 may be configured to perform the methods and specific embodiments performed by the terminal device in FIG. 8A and FIG. 8B and FIG. 9A to FIG. 9G. In a possible implementation, as shown in FIG. 12, the apparatus 700 includes a processing module 701.

The processing module 701 is configured to determine a first uplink channel set, where the first uplink channel set includes a first uplink channel and another uplink channel overlapping the first uplink channel, each uplink channel other than the first uplink channel in the first uplink channel set overlaps the first uplink channel, and each uplink channel in the first uplink channel set corresponds to a first priority.

The processing module 701 is configured to determine a second uplink channel, where the second uplink channel is for carrying information to be carried on all or some uplink channels in the first uplink channel set.

The processing module 701 is further configured to: if the second uplink channel overlaps a third uplink channel, when the second uplink channel and the third uplink channel meet a first multiplexing condition, or when the second uplink channel and the third uplink channel do not meet a first multiplexing condition, but a second priority corresponding to the third uplink channel is higher than the first priority, determine, based on the second uplink channel and the third uplink channel, a fourth uplink channel for carrying information to be carried on the second uplink channel and/or some or all information carried on the third uplink channel.

In this embodiment of this application, the first uplink channel set is obtained through division, to process overlapping of low-priority uplink channels, and then process overlapping of a low-priority uplink channel and a high-priority uplink channel, including multiplexing processing of the channels. This improves efficiency of sending uplink control information and/or uplink data on the low-priority uplink channel, reduces a probability of cross-priority overlapping processing, and reduces processing complexity and time consumption.

In an optional example, an uplink channel in the first uplink channel set is a physical uplink control channel PUCCH and/or a physical uplink shared channel PUSCH.

In an optional example, the second uplink channel overlaps a plurality of uplink channels, and the third uplink channel is an uplink channel that is earliest in time domain or an uplink channel that occupies a largest quantity of time-frequency resources in the plurality of uplink channels.

In an optional example, the third uplink channel is a PUCCH; or the third uplink channel is a PUSCH, and there is no PUCCH overlapping the second uplink channel.

In an optional example, when the second uplink channel and the third uplink channel meet the first multiplexing condition, the third uplink channel is a PUSCH, and there is a first PUCCH overlapping the second uplink channel, the fourth uplink channel is for carrying information to be carried on the first PUCCH and information to be carried on the second uplink channel.

In an optional example, when the second uplink channel and the third uplink channel do not meet the first multiplexing condition, but the second priority corresponding to the third uplink channel is higher than the first priority, the determining a fourth uplink channel includes: cancelling sending of the second uplink channel, and determining that the fourth uplink channel is the third uplink channel; cancelling sending of a non-PUSCH channel in the second uplink channel and the third uplink channel, and determining that the fourth uplink channel is a PUSCH in the second uplink channel and the third uplink channel; or cancelling sending of an uplink channel with a later time domain start symbol in the second uplink channel and the third uplink channel, and determining that the fourth uplink channel is an uplink channel with an earlier time domain start symbol in the second uplink channel and the third uplink channel.

In an optional example, the third uplink channel is a second multiplexed uplink channel, the second multiplexed uplink channel is for carrying information to be carried on all or some uplink channels in a second uplink channel set, the second uplink channel set includes a fifth uplink channel and at least one other uplink channel overlapping the fifth uplink channel, each uplink channel other than the fifth uplink channel in the second uplink channel set overlaps the fifth uplink channel, and each uplink channel in the second uplink channel set corresponds to the second priority.

In this embodiment of this application, the third uplink channel is an uplink channel obtained after the second uplink channel set is divided based on the high-priority uplink channel and overlapping processing is performed. In other words, when overlapping between a low-priority uplink channel and a high-priority uplink channel is processed, overlapping between uplink channels with a same priority is first processed. This further reduces a probability of cross-priority overlapping processing, and reduces processing complexity and time consumption.

In an optional example, an uplink channel in the second uplink channel set is a physical uplink control channel PUCCH and/or a physical uplink shared channel PUSCH.

In an optional example, when the fourth uplink channel overlaps a sixth uplink channel, and the fourth uplink channel and the sixth uplink channel meet the first multiplexing condition, the processing module 701 is further configured to determine a seventh uplink channel, where the seventh uplink channel is for carrying information on the fourth uplink channel and information carried on the sixth uplink channel.

In an optional example, the sixth uplink channel is a PUCCH; and/or the sixth uplink channel is a PUSCH, and there is no PUCCH overlapping the fourth uplink channel.

In an optional example, when the fourth uplink channel is for carrying first UCI with the first priority and second UCI with the second priority, the fourth uplink channel overlaps the sixth uplink channel, and the fourth uplink channel and the sixth uplink channel do not meet the first multiplexing condition, the processing module 701 is configured to: cancel sending of the first UCI on the fourth uplink channel; and determine a seventh uplink channel, where the seventh uplink channel is for carrying the second UCI and information to be carried on the sixth uplink channel, where the sixth uplink channel is a PUCCH, and/or the sixth uplink channel is a PUSCH, and there is no other PUCCH overlapping the fourth uplink channel; determine a seventh uplink channel, where the seventh uplink channel is for carrying the second UCI and information to be carried on the sixth uplink channel; or when the sixth uplink channel is a PUSCH, and there is another PUCCH overlapping the fourth uplink channel, determine a seventh uplink channel, where the seventh uplink channel is for carrying the second UCI and information to be carried on the PUCCH, and does not include information to be carried on the sixth uplink channel.

In an optional example, when the fourth uplink channel is for carrying first UCI with the first priority and second UCI with the second priority, the fourth uplink channel overlaps the sixth uplink channel, and the fourth uplink channel and the sixth uplink channel do not meet the first multiplexing condition, and the processing module 701 is configured to: when the fourth uplink channel and the sixth uplink channel meet a second multiplexing condition, cancel sending of the first UCI on the fourth uplink channel, and determine a seventh uplink channel, where the seventh uplink channel is for carrying the second UCI on the fourth channel and the information on the sixth uplink channel; and/or when the fourth uplink channel and the sixth uplink channel meet a second multiplexing condition, cancel sending of the fourth uplink channel.

Optionally, the processing module 701 may be a central processing unit (Central Processing Unit, CPU).

Optionally, the apparatus may further include a transceiver module 702, and the transceiver module 702 may be an interface circuit or a transceiver. The transceiver module is configured to receive or send data or instructions from or to another electronic apparatus.

Optionally, the communication apparatus 700 may further include a storage module (not shown in the figure). The storage module may be configured to store data and/or signaling. The storage module may be coupled to the transceiver module 702 and the processing module 701. For example, the processing module 701 may be configured to read data and/or signaling in the storage module, so that the channel processing process in the foregoing method embodiment is performed.

Optionally, the module of the apparatus 700 is further configured to perform the method and specific embodiment performed by the terminal device in FIG. 10A to FIG. 10C. Details are not described herein again.

Figure 13:
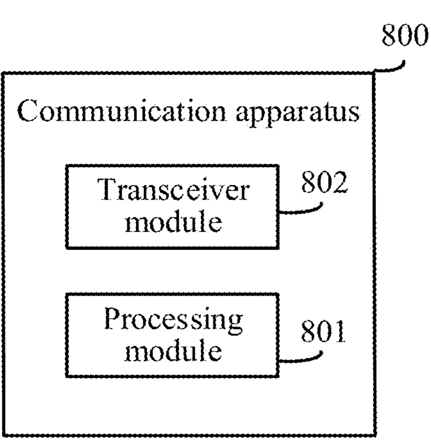
FIG. 13 is a block diagram of a structure of a communication apparatus according to an embodiment of this application.

FIG. 13 shows a communication apparatus 800 according to an embodiment of this application. The communication apparatus 800 may be configured to perform the methods and specific embodiments performed by the network device in FIG. 8A and FIG. 8B and FIG. 9A to FIG. 9G. In a possible implementation, as shown in FIG. 13, the apparatus 800 includes a processing module 801.

The processing module 801 is configured to determine a first uplink channel set, where the first uplink channel set includes a first uplink channel and another uplink channel overlapping the first uplink channel, each uplink channel other than the first uplink channel in the first uplink channel set overlaps the first uplink channel, and each uplink channel in the first uplink channel set corresponds to a first priority.

The processing module 801 is further configured to determine a second uplink channel, where the second uplink channel is for carrying information to be carried on all or some uplink channels in the first uplink channel set.

The processing module 801 is further configured to: if the second uplink channel overlaps a third uplink channel, when the second uplink channel and the third uplink channel meet a first multiplexing condition, or when the second uplink channel and the third uplink channel do not meet a first multiplexing condition, but a second priority corresponding to the third uplink channel is higher than the first priority, determine, based on the second uplink channel and the third uplink channel, a fourth uplink channel for carrying information to be carried on the second uplink channel and/or some or all information carried on the third uplink channel.

In an optional example, an uplink channel in the first uplink channel set is a physical uplink control channel PUCCH and/or a physical uplink shared channel PUSCH.

In an optional example, the second uplink channel overlaps a plurality of uplink channels, and the third uplink channel is an uplink channel that is earliest in time domain or an uplink channel that occupies a largest quantity of time-frequency resources in the plurality of uplink channels.

In an optional example, the third uplink channel is a PUCCH; or the third uplink channel is a PUSCH, and there is no PUCCH overlapping the second uplink channel.

In an optional example, when the second uplink channel and the third uplink channel meet the first multiplexing condition, the third uplink channel is a PUSCH, and there is a first PUCCH overlapping the second uplink channel, the fourth uplink channel is for carrying information to be carried on the first PUCCH and information to be carried on the second uplink channel.

In an optional example, when the second uplink channel and the third uplink channel do not meet the first multiplexing condition, but the second priority corresponding to the third uplink channel is higher than the first priority, the determining a fourth uplink channel includes: skipping receiving sending of the second uplink channel, and determining that the fourth uplink channel is the third uplink channel; skipping receiving sending of a non-PUSCH channel in the second uplink channel and the third uplink channel, and determining that the fourth uplink channel is a PUSCH in the second uplink channel and the third uplink channel; or skipping receiving sending of an uplink channel with a later time domain start symbol in the second uplink channel and the third uplink channel, and determining that the fourth uplink channel is an uplink channel with an earlier time domain start symbol in the second uplink channel and the third uplink channel.

In an optional example, the third uplink channel is a second multiplexed uplink channel, the second multiplexed uplink channel is for carrying information to be carried on all or some uplink channels in a second uplink channel set, the second uplink channel set includes a fifth uplink channel and at least one other uplink channel overlapping the fifth uplink channel, each uplink channel other than the fifth uplink channel in the second uplink channel set overlaps the fifth uplink channel, and each uplink channel in the second uplink channel set corresponds to the second priority.

In an optional example, an uplink channel in the second uplink channel set is a physical uplink control channel PUCCH and/or a physical uplink shared channel PUSCH.

In an optional example, when the fourth uplink channel overlaps a sixth uplink channel, and the fourth uplink channel and the sixth uplink channel meet the first multiplexing condition, the processing module 801 is further configured to determine a seventh uplink channel, where the seventh uplink channel is for carrying information on the fourth uplink channel and information carried on the sixth uplink channel.

In an optional example, the sixth uplink channel is a PUCCH; and/or the sixth uplink channel is a PUSCH, and there is no PUCCH overlapping the fourth uplink channel.

In an optional example, when the fourth uplink channel is for carrying first UCI with the first priority and second UCI with the second priority, the fourth uplink channel overlaps the sixth uplink channel, and the fourth uplink channel and the sixth uplink channel do not meet the first multiplexing condition, the processing module 801 is configured to: skip receiving sending of the first UCI on the fourth uplink channel; and determine a seventh uplink channel, where the seventh uplink channel is for carrying the second UCI and information to be carried on the sixth uplink channel, where the sixth uplink channel is a PUCCH, and/or the sixth uplink channel is a PUSCH, and there is no other PUCCH overlapping the fourth uplink channel; determine a seventh uplink channel, where the seventh uplink channel is for carrying the second UCI and information to be carried on the sixth uplink channel; or when the sixth uplink channel is a PUSCH, and there is another PUCCH overlapping the fourth uplink channel, determine a seventh uplink channel, where the seventh uplink channel is for carrying the second UCI and information to be carried on the PUCCH, and does not include information to be carried on the sixth uplink channel.

In an optional example, when the fourth uplink channel is for carrying first UCI with the first priority and second UCI with the second priority, the fourth uplink channel overlaps the sixth uplink channel, and the fourth uplink channel and the sixth uplink channel do not meet the first multiplexing condition, and the processing module 801 is configured to: when the fourth uplink channel and the sixth uplink channel meet a second multiplexing condition, cancel sending of the first UCI on the fourth uplink channel, and determine a seventh uplink channel, where the seventh uplink channel is for carrying the second UCI on the fourth channel and the information on the sixth uplink channel; and/or when the fourth uplink channel and the sixth uplink channel meet a second multiplexing condition, cancel sending of the fourth uplink channel.

Optionally, the processing module 801 may be a central processing unit (Central Processing Unit, CPU).

Optionally, the apparatus may further include a transceiver module 802, and the transceiver module 802 may be an interface circuit or a transceiver. The transceiver module is configured to receive or send data or instructions from or to another electronic device.

Optionally, the communication apparatus 800 may further include a storage module (not shown in the figure). The storage module may be configured to store data and/or signaling. The storage module may be coupled to the transceiver module 802 and the processing module 801.

Optionally, the module of the apparatus 800 is further configured to perform the method and specific embodiment performed by the network device in FIG. 10A to FIG. 10C. Details are not described herein again.

Figure 14:
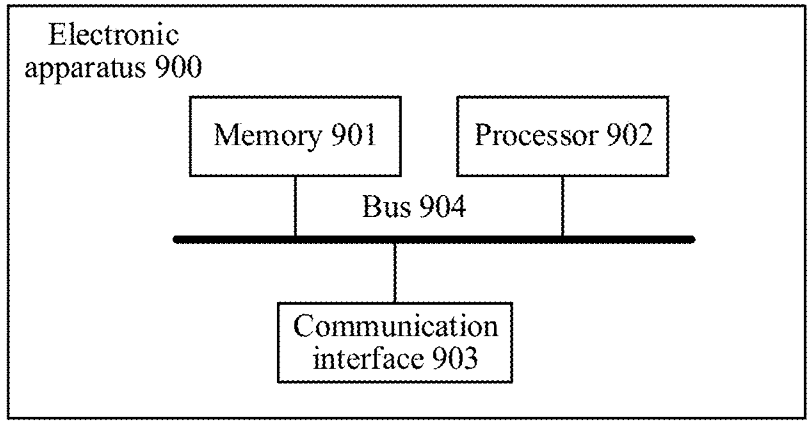
FIG. 14 is a schematic diagram of a structure of an electronic apparatus according to an embodiment of this application.

Refer to FIG. 14. FIG. 14 is a schematic diagram of a hardware structure of an electronic apparatus 900 according to an embodiment of this application. For structures of the communication apparatus 700 and the communication apparatus 800, refer to the structure shown in FIG. 14. The electronic apparatus 900 includes: a memory 901, a processor 902, a communication interface 903, and a bus 904. The memory 901, the processor 902, and the communication interface 903 implement mutual communication connections through the bus 904.

The memory 901 may be a read-only memory (Read-Only Memory, ROM), a static storage device, a dynamic storage device, or a random access memory (Random Access Memory, RAM). The memory 901 may store a program. When the program stored in the memory 901 is executed by the processor 902, the processor 902 and the communication interface 903 are configured to perform the steps of the channel processing method in embodiments of this application.

The processor 902 may be a general-purpose CPU, a microprocessor, an application-specific integrated circuit (Application-Specific Integrated Circuit, ASIC), a GPU, or one or more integrated circuits, and is configured to execute a related program, to implement functions that need to be performed by the transceiver module 702 and the processing module 701 in the communication apparatus 700 in embodiments of this application, or implement functions that need to be performed by the transceiver module 802 and the processing module 801 in the communication apparatus 800, or perform the signal transmission method in the method embodiments of this application.

The processor 902 may alternatively be an integrated circuit chip and has a signal processing capability. In an implementation process, the steps of the distributed rendering method in this application may be completed by using an integrated logic circuit of hardware in the processor 902, or by using an instruction in a form of software. The processor 902 may alternatively be a general-purpose processor, a digital signal processor (Digital Signal Processor, DSP), an application-specific integrated circuit (ASIC), a field programmable gate array (Field Programmable Gate Array, FPGA) or another programmable logical device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed by a hardware decoding processor, or performed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 901. The processor 902 reads information in the memory 901, and completes, in combination with hardware of the processor 902, functions that need to be performed by modules included in the communication apparatus 700 or the communication apparatus 800 in embodiments of this application, or performs the virtual reality video transmission method in the method embodiments of this application.

The communication interface 903 uses a transceiver apparatus, for example but not for limitation, a transceiver, to implement communication between the electronic apparatus 900 and another device or communication network. For example, a determined segmentation target and/or a determined candidate target border box may be obtained by using the communication interface 903. The bus 904 may include a path for transmitting information between the components (for example, the memory 901, the processor 902, and the communication interface 903) of the electronic apparatus 900.

It should be noted that, although the electronic apparatus 900 shown in FIG. 14 shows only the memory, the processor, and the communication interface, in a specific implementation process, a person skilled in the art should understand that the electronic apparatus 900 further includes another component necessary for implementing normal running. In addition, based on a specific requirement, a person skilled in the art should understand that the electronic apparatus 900 may further include hardware components for implementing other additional functions. In addition, a person skilled in the art should understand that the electronic apparatus 900 may include only components necessary for implementing embodiments of this application, and does not need to include all components shown in FIG. 14.

It should be understood that in embodiments of this application, sequence numbers of processes do not mean a sequence of execution. The sequence of execution of the processes should be determined according to functions and internal logic of the processes, and should not constitute any limitation on an implementation process of embodiments of this application.

A person of ordinary skill in the art may be aware that, in combination with the examples described in embodiments disclosed in this specification, modules and algorithm steps can be implemented by electronic hardware or a combination of computer software and electronic hardware. Whether the functions are implemented by hardware or software depends on specific applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing described system, apparatus, and module, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces, and indirect couplings or communication connections between apparatuses or modules may be implemented in an electrical, mechanical, or another form.

The modules described as separate parts may or may not be physically separate, and parts displayed as modules may or may not be physical modules, may be located in one place, or may be distributed on a plurality of network modules. Some or all of the modules may be selected according to an actual requirement to achieve the objectives of the solutions in the embodiments.

In addition, function modules in embodiments of this application may be integrated into one processing module, or each module may exist alone physically, or two or more modules may be integrated into one module.

When the function is implemented in a form of a software function module and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

What is claimed is:

1. A method for reporting a capability, wherein the method comprises:

determining, by a terminal device in a communication system, target capability information supported by the terminal device from a capability information set, wherein the capability information set includes first capability information, second capability information, and third capability information, the first capability information indicates that the terminal device can perform multiplexing between overlapping uplink channels with a same priority, the second capability information indicates that for overlapping uplink channels with different priorities, the terminal device can cancel sending of one of the overlapping uplink channels with a lower priority and retain sending of another of the overlapping uplink channels with a higher priority, and the third capability information indicates that the terminal device can perform multiplexing between the overlapping uplink channels with different priorities; and transmitting, by the terminal device, the target capability information to a network device in the communication system.

2. The method according to claim 1, wherein the target capability information comprises the second capability information.

3. The method according to claim 2, wherein the target capability information comprises the first capability information, and the method further comprises:

receiving a first indication information, wherein the first indication information indicates the first capability information or the second capability information in the target capability information.

4. The method according to claim 1, wherein the multiplexing between overlapping uplink channels with different priorities comprises one or more of the following:

multiplexing a physical uplink control channel (PUCCH) with a lower priority and a PUCCH with a higher priority;

multiplexing a physical uplink shared channel (PUSCH) with a lower priority and the PUCCH with the higher priority; or multiplexing the PUCCH with the lower priority and a PUSCH with a higher priority.

5. The method according to claim 1, wherein the multiplexing between overlapping uplink channels meets a condition of a multiplexing timeline.

6. A method for reporting a capability, wherein the method comprises:

receiving, by a network device and from a terminal device in a communication system, target capability information supported by the terminal device, wherein the target capability information is from a capability information set including first capability information, second capability information, and third capability information, the first capability information indicates that the terminal device can perform multiplexing between overlapping uplink channels with a same priority, the second capability information indicates that for overlapping uplink channels with different priorities, the terminal device can cancel sending of one of the overlapping uplink channels with a lower priority and retain sending of another of the overlapping uplink channels with a higher priority, and the third capability information indicates that the terminal device can perform the multiplexing between overlapping uplink channels with different priorities.

7. The method according to claim 6, wherein the target capability information comprises the second capability information.

8. The method according to claim 7, wherein the target capability information comprises the first capability information, and the method comprises:

sending a first indication information, wherein the first indication information indicates the first capability information or the second capability information in the target capability information.

9. The method according to claim 6, wherein the multiplexing between overlapping uplink channels with different priorities comprises one or more of the following:

multiplexing a physical uplink control channel (PUCCH) with a lower priority and a PUCCH with a higher priority;

multiplexing a physical uplink shared channel (PUSCH) with a lower priority and the PUCCH with the higher priority; or multiplexing the PUCCH with the lower priority and a PUSCH with a higher priority.

10. The method according to claim 6, wherein the multiplexing between overlapping uplink channels meets a condition of a multiplexing timeline.

11. A communications apparatus, comprising:

at least one processor; and at least one memory coupled to the at least one processor and storing programming instructions for execution by the at least one processor to perform operations comprising:

determining, by a terminal device in a communication system, target capability information supported by the terminal device from a capability information set, wherein the capability information set includes first capability information, second capability information, and third capability information, the first capability information indicates that the terminal device can perform multiplexing between overlapping uplink channels with a same priority, the second capability information indicates that for overlapping uplink channels with different priorities, the terminal device can cancel sending of one of the overlapping uplink channels with a lower priority and retain sending of another of the overlapping uplink channels with a higher priority, and the third capability information indicates that the terminal device can perform the multiplexing between overlapping uplink channels with different priorities; and transmitting, by the terminal device, the target capability information to a network device in the communication system.

12. The communications apparatus according to claim 11, wherein the target capability information comprises the second capability information.

13. The communications apparatus according to claim 12, wherein the target capability information comprises the first capability information, and the operations further comprise:

receiving a first indication information, wherein the first indication information indicates the first capability information or the second capability information in the target capability information.

14. The communications apparatus according to claim 11, wherein the multiplexing between overlapping uplink channels with different priorities comprises one or more of the following:

multiplexing a physical uplink control channel (PUCCH) with a lower priority and a PUCCH with a higher priority;

multiplexing a physical uplink shared channel (PUSCH) with a lower priority and the PUCCH with the higher priority; or multiplexing the PUCCH with the lower priority and a PUSCH with a higher priority.

15. The communications apparatus according to claim 11, wherein the multiplexing between overlapping uplink channels meets a condition of a multiplexing timeline.

16. A communications apparatus, comprising:

at least one processor; and at least one memory coupled to the at least one processor and storing programming instructions for execution by the at least one processor to perform operations comprising:

receiving, by a network device and from a terminal device in a communication system, target capability information supported by the terminal device, wherein the target capability information is from a capability information set including first capability information, second capability information, and third capability information, the first capability information indicates that the terminal device can perform multiplexing between overlapping uplink channels with a same priority, the second capability information indicates that for overlapping uplink channels with different priorities, the terminal device can cancel sending of one of the overlapping uplink channels with a lower priority and retain sending of another of the overlapping uplink channels with a higher priority, and the third capability information indicates that the terminal device can perform multiplexing between the overlapping uplink channels with different priorities.

17. The communications apparatus according to claim 16, wherein the target capability information comprises the second capability information.

18. The communications apparatus according to claim 17, wherein the target capability information comprises the first capability information, and the operations further comprise:

sending a first indication information, wherein the first indication information indicates the first capability information or the second capability information in the target capability information.

19. The communications apparatus according to claim 16, wherein the multiplexing between overlapping uplink channels with different priorities comprises one or more of the following:

multiplexing a physical uplink control channel (PUCCH) with a lower priority and a PUCCH with a higher priority;

multiplexing a physical uplink shared channel (PUSCH) with a lower priority and the PUCCH with the higher priority; or multiplexing the PUCCH with the lower priority and a PUSCH with a higher priority.

20. The communications apparatus according to claim 16, wherein the multiplexing between overlapping uplink channels meets a condition of a multiplexing timeline.

* * * * *